(12) United States Patent
D'Souza et al.

(10) Patent No.: US 8,442,950 B2
(45) Date of Patent: *May 14, 2013

(54) DATA SURROGATE GENERATION FOR DATA MANAGEMENT

(75) Inventors: Roy P. D'Souza, Santa Clara, CA (US); Sanjay Mehta, Santa Clara, CA (US); Bhushan Pandit, Santa Clara, CA (US); Thirumalai Muppur Ravi, Santa Clara, CA (US)

(73) Assignee: Mimosa Systems, Inc., Santa Clara, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 12/857,368

(22) Filed: Aug. 16, 2010

(65) Prior Publication Data

US 2011/0225123 A1  Sep. 15, 2011

Related U.S. Application Data

(63) Continuation of application No. 11/211,056, filed on Aug. 23, 2005, now Pat. No. 7,778,976.

(51) Int. Cl.
G06F 17/30 (2006.01)

(52) U.S. Cl.
USPC ........... 707/665; 707/667; 707/672; 707/673; 707/674

(58) Field of Classification Search ........................ None
See application file for complete search history.

(56) References Cited

U.S. PATENT DOCUMENTS

| | | | | |
|---|---|---|---|---|
| 4,759,636 A * | 7/1988 | Ahern et al. | ..................... | 367/21 |
| 5,081,603 A * | 1/1992 | Mikos | ........................... | 708/271 |
| 5,159,512 A * | 10/1992 | Evans et al. | ................... | 345/419 |
| 5,202,971 A * | 4/1993 | Henson et al. | ........................ | 1/1 |
| 5,239,492 A * | 8/1993 | Hartwig et al. | ................. | 702/27 |
| 5,274,815 A * | 12/1993 | Trissel et al. | ................. | 712/226 |
| 5,276,883 A * | 1/1994 | Halliwell | ...................... | 709/203 |
| 5,337,311 A * | 8/1994 | Herzberg et al. | ............. | 370/403 |
| 5,442,562 A * | 8/1995 | Hopkins et al. | ............... | 700/108 |
| 5,448,708 A * | 9/1995 | Ward | ........................... | 709/235 |
| 5,481,708 A * | 1/1996 | Kukol | ........................... | 717/155 |
| 5,487,145 A * | 1/1996 | Marsh et al. | ................... | 345/501 |
| 5,537,526 A * | 7/1996 | Anderson et al. | ............. | 715/209 |
| 5,544,297 A * | 8/1996 | Milne et al. | .................... | 715/201 |
| 5,604,892 A * | 2/1997 | Nuttall et al. | ................... | 703/18 |
| 5,644,768 A * | 7/1997 | Periwal et al. | ................. | 718/102 |
| 5,649,135 A * | 7/1997 | Pechanek et al. | ............. | 712/200 |
| 5,675,555 A * | 10/1997 | Evans et al. | .................... | 367/139 |
| 5,689,080 A * | 11/1997 | Gulick | ............................ | 84/604 |
| 5,689,698 A * | 11/1997 | Jones et al. | ........................... | 1/1 |
| 5,694,563 A * | 12/1997 | Belfiore et al. | ............... | 715/821 |
| 5,754,841 A * | 5/1998 | Carino, Jr. | ............................ | 1/1 |
| 5,758,351 A * | 5/1998 | Gibson et al. | ........................ | 1/1 |
| 6,094,654 A * | 7/2000 | Van Huben et al. | .................. | 1/1 |
| 6,766,326 B1 * | 7/2004 | Cena | ............................. | 707/808 |
| 7,744,540 B2 * | 6/2010 | Rao et al. | ....................... | 600/481 |
| 7,899,915 B2 * | 3/2011 | Reisman | ....................... | 709/228 |

(Continued)

*Primary Examiner* — Farhan Syed

(57) ABSTRACT

Multi-dimensional surrogation systems and methods are provided that generate at least one data surrogate using information of data and numerous data changes received from at least one data source. The multi-dimensional surrogation transforms data of each data surrogate from a format of the data source to at least one alternative format. Original metadata is extracted from each data surrogate. New metadata is generated by combining portions of the original metadata and components of each data surrogate. The multi-dimensional surrogation generates an extended data surrogate comprising the data surrogate and the new metadata.

29 Claims, 49 Drawing Sheets

U.S. PATENT DOCUMENTS

| | | | |
|---|---|---|---|
| 7,987,491 B2 * | 7/2011 | Reisman | 725/112 |
| 8,032,592 B2 * | 10/2011 | Campise et al. | 709/206 |
| 2003/0200272 A1 * | 10/2003 | Campise et al. | 709/206 |
| 2003/0229900 A1 * | 12/2003 | Reisman | 725/87 |
| 2004/0031058 A1 * | 2/2004 | Reisman | 725/112 |
| 2005/0010550 A1 * | 1/2005 | Potter et al. | 707/1 |
| 2006/0179061 A1 * | 8/2006 | D'Souza et al. | 707/10 |
| 2011/0225123 A1 * | 9/2011 | D'Souza et al. | 707/634 |

\* cited by examiner

DATA SURROGATE GENERATION FOR DATA MANAGEMENT

RELATED APPLICATION

This application is a continutation the U.S. patent application Ser. No. 11/211,056, filed Aug. 23, 2005, now U.S. Pat. No. 7,778,976.

TECHNICAL FIELD

The disclosure herein relates generally to data management.

BACKGROUND

Enterprise servers host critical production data in their storage systems and may require this data to be resilient to a variety of failures, which could range from media to data center failures. In addition there may be a need for other enterprise servers to concurrently access this same critical data. These applications might include search, discovery, analysis, monitoring and supervision. The former need may be addressed by a range of data protection schemes that may include tape-based backup and the latter need may be addressed by a range of data management schemes that may include setting up a specialized analysis server with a replica of that critical production data. Typical data protection and management schemes may contain some well known drawbacks. Such drawbacks could include the situation when direct access to the enterprise server could result in instability and performance load on the enterprise servers. Other drawbacks could relate to the serial and offline nature of tape storage.

INCORPORATION BY REFERENCE

Each publication and patent application mentioned in this specification is herein incorporated by reference in its entirety to the same extent as if each individual publication or patent application was specifically and individually indicated to be incorporated by reference.

DETAILED DESCRIPTION

Figure 1:
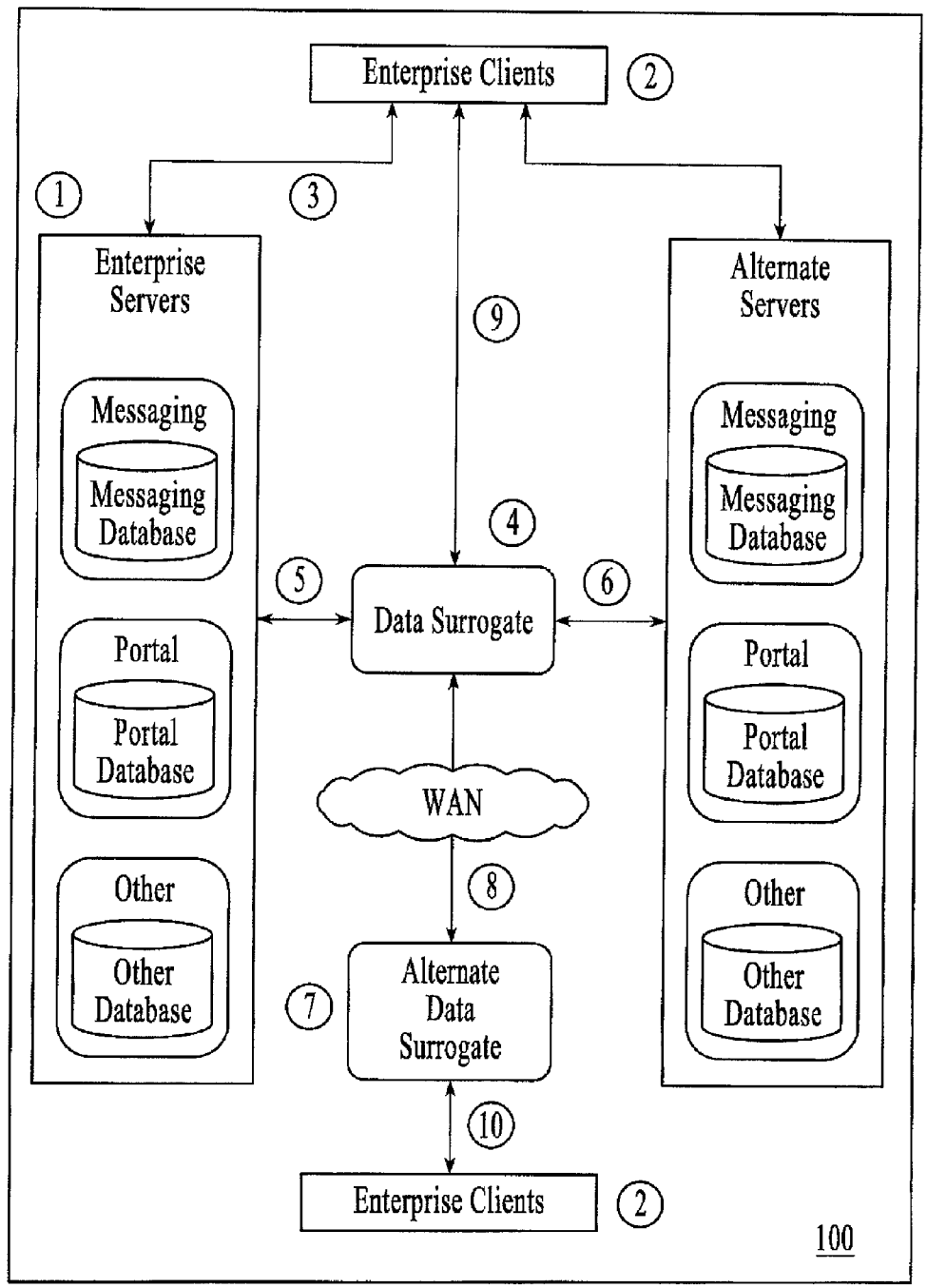
FIG. 1 is a block diagram of a multi-dimensional data surrogation system, under an embodiment.

Multi-dimensional data surrogation and corresponding systems and methods are provided herein that enable a host of open-ended data management applications while minimizing data movement, latencies and post-processing by leveraging one-pass protection. These efficiencies of scale are available to a range of applications that include the following:

Data Protection: Data Surrogates may be aware of application formats and may also optionally implement application data transformation off the production server. This could facilitate dramatically reduced recovery time objectives (RTO) and recovery point objectives (RPO), implemented in a manner that maximizes efficient usage of servers, networking, storage, and other enterprise resources.

Archival: The ability to place and transform data within the surrogate across formats and repositories facilitates the implementation of a range of archiving capabilities that include active, passive and deep archival. Data could be single instanced across multiple tiers, but selective duplicates could be maintained in support of business needs.

Self-service: Data Surrogates can be implemented to integrate with enterprise authentication, authorization, access control and audit capabilities. Hence end-users can be empowered to directly access archived data that they have authorization for, in a trusted manner. This could significantly reduce Help Desk loads and maximize end-user satisfaction through instant gratification.

Life-cycle Management: Data Surrogates can span multiple servers that may be local or remote. Some of these may be the source production servers; others may be nearline servers. Data Surrogates can leverage multiple tiers of storage that include online, midline, nearline and offline. Hence they are able to leverage multiple classes of storage to implement data placement and movement that is optimized to the behavior of the applications and the needs of the enterprise.

Data Extension and HSM: Data Surrogates can facilitate the seamless movement of active production data across tiers, typically online to midline or online to nearline, based on criteria such as age, size or frequency of access, to achieve optimizations such as cost-effective storage utilization, while continuing to provide end-users with seamless access to this data.

Retention and Disposition: One-pass data movement and single-instanced storage can facilitate accurate, timely and efficient implementation of disposition policies since all the data is under the control of the data management application. This promotes confidence within the enterprise and their regulators that retention and disposition policies are being accurately enforced.

Chain of Custody Verification: The one-pass data movement that is leveraged in aggregating data from production into the Data Surrogate simplifies the ability to implement non-repudiation during this data capture. This is optimized due to the presence of a single data management application, a single pass of data movement, and a single unified data repository. Cryptographic mechanisms can be introduced to implement trust.

Policy Manager Roles: Enterprises may be required to designate entities, perhaps Chief Legal Officers, to define policies for the storage and processing of enterprise data in a compliant manner. The existence of one-pass data movement into a unified and single-instanced repository in the Data Surrogate facilitates simplicity and efficiencies in setting policies that are enterprise-wide but selectively specialized to the needs of sub-organizations or individuals.

Auditor Roles: Enterprises may need to designate specific entities to serve as Auditors to monitor and verify that the policies of the organization are being fully implemented during the movement, storage and access to enterprise data. The existence of one-pass data movement, the unified and single-instanced data repository, and the integrated self-service capabilities all facilitate the implementation of non-repudiation and audit trails in order to simplify the audit process.

Monitoring and Supervision: The increasing adoption of and reliance on, collaboration mechanisms such as electronic messaging facilitates business efficiencies but also promotes risks. These risks include dissipation or leakage of enterprise knowledge and intellectual property. In order to protect enterprise assets and to implement regulatory policies it may be necessary for an organization to implement monitoring and supervision mechanisms to regulate collaboration. Data Surrogates by virtue of one-pass data movement into the archive, unified and single-instanced storage, and regulated self-service, facilitate efficiencies in implementing Monitoring and Supervision.

Legal Discovery: The data generated from collaboration and messaging is an important record of business for the enterprise. It may become necessary for an enterprise to produce these records, either in support of internal investigations or for the prosecution of external litigation or defense.

Litigation Support: The ease of access to the aggregate archives of the enterprise that are hosted in the Data Surrogate facilitates easy retrieval of evidence to support litigation or defense. Since Data Surrogates are multi-dimensional, it may be possible for appropriate portions of the constituent data to be primed and maintained in a manner that facilitates preparation for litigation support.

Disaster Protection: Data Surrogates can provide unified and consistent archival storage that straddles multiple systems and sites. As a consequence, it is possible for a Data Surrogate to preserve copy of the archive even in the presence of massive server and site failures, and then make that data available for system or site restoration. Since the Data Surrogates have unified views and integrated implementation, this method for disaster protection is more efficient in storage and promotes data resilience and privacy.

Service Preservation: Since Data Surrogates can preserve enterprise data across server or site failures in an application aware manner, it is relatively straightforward for the Data Surrogate to restore re-directed service when the primary servers or sites experience failures. Subsequent to the restoration of the original sites and servers this service can be failed back.

Business Continuity: By virtue of disaster protection and service preservation, Data Surrogates are able to optimize business continuity in the enterprise since it can preserve relatively seamless access to enterprise production and archived data across massive failures and recoveries.

Heterogeneous Data Sources: Data Surrogates can be multi-dimensional in that they can map data from dense application formats into multiple alternative unified formats. They can do this for a range of input applications that might range from messaging and collaboration systems to portals and document management systems. Since all this data can be normalized and single instanced into a common repository view, this facilitates and simplifies search, audits, and simplifies disposition since there are only a controlled number of copies that need to be disposed.

Enterprise Search Optimization: Due to the Data Surrogates ability to reconcile and aggregate multiple heterogeneous data sources and then proactively add metadata, this facilitates the implementation of more effective and efficient enterprise search capabilities. These searches can be orchestrated across multiple federated Data Surrogates.

FIG. 1 is a block diagram of a multi-dimensional data surrogation system 100 (also referred to herein as a "data surrogation system 100" or "surrogation system 100"), under an embodiment. Data Surrogates implement and maintain application consistent temporal replicas of production data for data management purposes that include data protection, archival, mailbox extension, self-service, policy management and audit roles, compliance, keyword alerts, legal discovery, litigation support, life-cycle management, tiered storage, disaster protection, business continuity, service preservation and service proxies.

The data surrogation system 100 of an embodiment includes one or more of the following components:

1. Enterprise Servers: These are a range of servers that include messaging, collaboration, portals, or database. These host a variety of structured, semi-structured, and unstructured data. These servers may be individual, clustered, replicated, constituents of a grid, virtualized, or any combination or variation. An exemplar is Microsoft Exchange Server but the embodiments described herein are not so limited.
2. Enterprise Clients: These are a range of clients that provide end-user access to enterprise servers. An exemplar is Microsoft Outlook but the embodiments described herein are not so limited.
3. Normal Access: This describes normal interaction between the enterprise clients and servers. In the case of Microsoft Exchange and Outlook, the protocols may be MAPI but the embodiments described herein are not so limited. Other possible protocols include IMAP4 and POP3.
4. Data Surrogate: This is the system and method that is being described that enables a range of data management solutions for Enterprise Servers and enhanced capabilities for Enterprise Clients.
5. Shadowing: This is an operation for maintaining a relatively up-to-date copy of production enterprise data in the Data Surrogate. This data may be optionally translated into multiple alternate formats and augmented with metadata.
6. Redirection: This is the capability for reviving Enterprise Servers after they have incurred any data-related corruptions or loss, using data that is hosted in the Shadow within the Data Surrogate. The term "Redirect" is more specifically used when the target server is different from the original; the common term when the target and original are same is typically "Restore".
7. Alternate Surrogate: This is one of possibly multiple remote copies of any Data Surrogate that are isolated from the source in order to protect production data from catastrophic site disasters.
8. Disaster Protection: This is the ability to restore data or service in order to support business operation if there is a catastrophic site disaster.
9. Self-service and Auditor Access: This is the capability for the Enterprise Clients to have direct but secured access to the Data Surrogate. Typical uses of this might include end-user access to their historical archives, or auditors needing to process historical messaging information.
10. Service Proxies and Preservation: The existence of an application consistent copy of production data at the data surrogate or one of the alternate surrogates facilitates the delivery of the original service or operation of a shadow, proxy or replacement server in order to enhance reliability, scale, or efficiency.

Couplings between various components of the data surrogation system 100 can include wireless couplings, wired couplings, hybrid wired/wireless couplings, and other network coupling types, as appropriate to the host system configuration. The clients (e.g., Enterprise Clients) and servers (e.g., Enterprise Servers and Alternate Servers) can be any type and/or combination of processor-based devices. While the network coupling between components of the data surrogation system 100 is shown as a wide area network (WAN), the network and network components can be any of a type, number, and/or combination of networks and the corresponding network components including, but not limited to, local area networks (LANs), metropolitan area networks (MANs), proprietary networks, backend networks, and the Internet to name a few.

Figure 2:
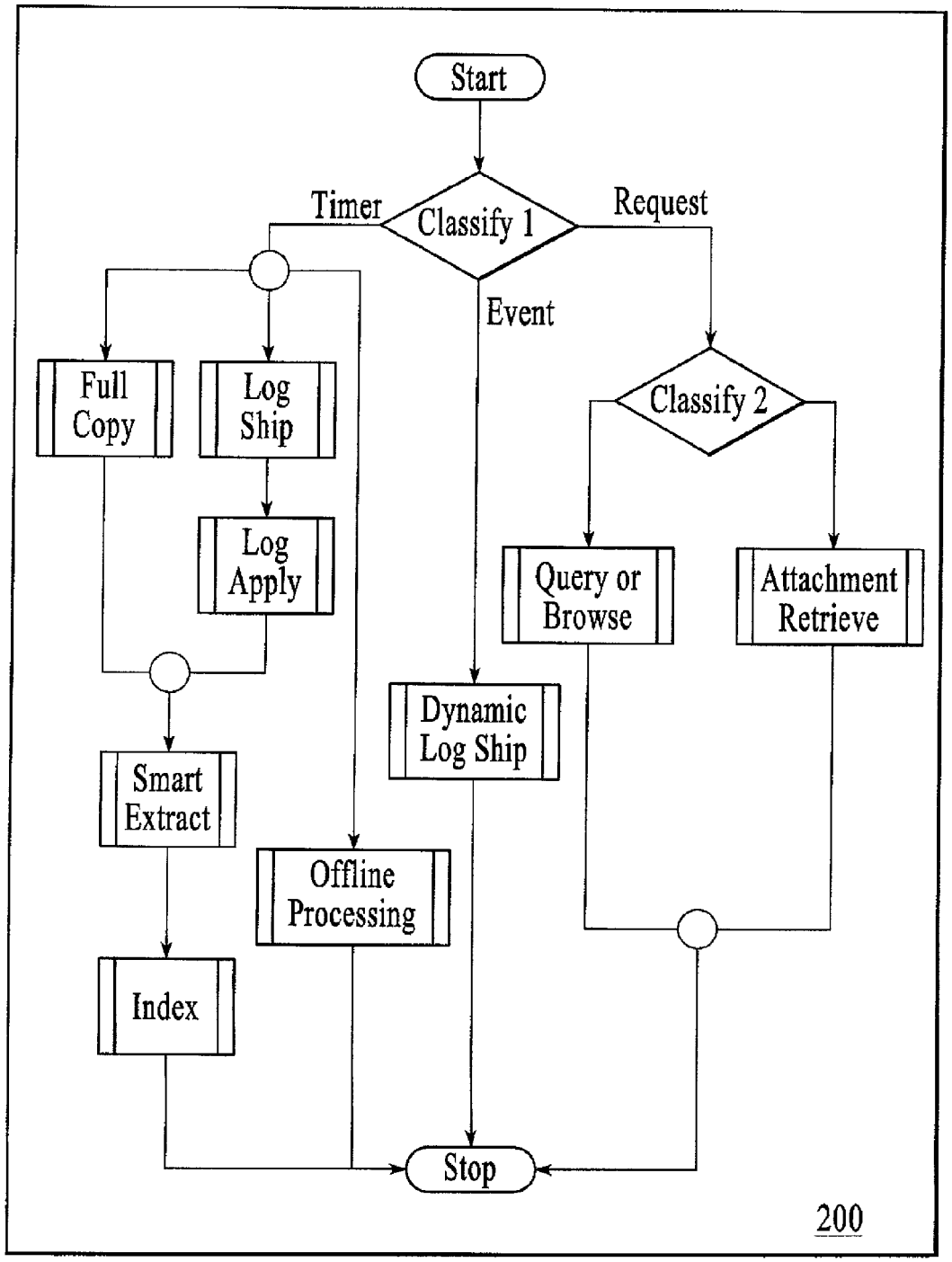
FIG. 2 is a flow diagram for a method of data surrogation, under an embodiment.

FIG. 2 is a flow diagram for a method of data surrogation 200 (also referred to herein as a "data surrogation method 200" or "surrogation method 200"), under an embodiment. An example flow of the method of data surrogation 200 proceeds as follows.

Start: The Data Surrogate is maintained or accessed through operations which are triggered by timers, events, or requests.

Classify1: Determine if handling a timer, an event or a request.

Timer: These are configured for scheduled events and indicate that some maintenance or data population operation is to be performed for the Data Surrogate.

Event: These indicate noteworthy changes on production or near line servers that need to be handled.

Request: These are access or configuration attempts from users or administrators.

Full Copy: This obtains a full baseline copy of all enterprise data on the targeted production servers. There may be multiple such production servers, either local or remote. Full Copy operations run relatively infrequently.

Log Ship: This obtains the changes that have occurred on the production servers since the last Log Ship.

Dynamic log shipping: This is an adjunct operation to Log Ship that dynamically responds to data change notifications on production servers and proactively copies that modified data.

Classify2: This classifies the type of request that is directed at the Data Surrogate.

Query or Browse: This may be an auditor or user who is trying to search or browse archived data.

Attachment Retrieve: This is a request to the Data Surrogate to obtain a data item such as an attachment that is to be spliced in because the user has accessed extended data.

Stop: End of data surrogation method.

The multi-dimensional surrogation of an embodiment can be used to decrease disk storage costs in near line systems by providing enhanced capabilities for data protection and management. In these scenarios the near line server might host a recent or near-real-time copy of the production data. The near line server could optionally serve as an active intermediary in the data protection and management mechanism and process. The near line server could also optionally serve as an active participant in preserving the service provided by the enterprise servers. This data surrogation capability might also be extended in several dimensions in order to provide aggregate views of data that are a superset of that provided by the enterprise servers themselves. One such dimension could be the view across time of an enterprise server's data; another dimension could be a consolidated view of multiple disparate enterprise servers. Yet another dimension might be the addition, aggregation and cascading of metadata that could facilitate efficiencies in subsequent data management applications. Multiple such dimensions and combinations thereof are possible.

Some of the implementations of multi-dimensional surrogation might also facilitate efficiencies in the aggregate by implementing lower layers of data movement and management capabilities in a manner that is re-usable by higher layers. These one pass mechanisms could promote parsimony in the use of enterprise server, networking, and other enterprise resources. A data surrogate might reside on a distinct near line server, or it may be hosted on an online or offline server, or some combination thereof. These servers themselves may be constructed out of any suitable computational devices that may range from ASICs or FPGAs, through microprocessor-based systems, to mainframe servers. The near line and enterprise servers may be single systems or they may be clustered, replicated, virtualized, distributed, part of a grid, peer-to-peer, or some combination thereof. The data surrogate storage may share the same storage devices as the original data, and the data surrogate may also share the same servers as the original enterprise servers.

This solution is described in the context of an electronic messaging server, for example Microsoft Exchange Server. However the ideas recited herein can be easily extended to provide equivalent services to a larger class of messaging, including instant messaging and collaboration. Furthermore, the embodiments described herein are equally relevant to other enterprise servers such as directory servers and document management systems, and in general to any enterprise server that is operating on structured, semi-structured, or un-structured data.

In this document any mention of a transport, interconnect, or network is inclusive of a conventional Ethernet, a Storage Area Network, or other type of network. The protocols may be inclusive of TCP/IP and layered protocols, iSCSI, Fibre-Channel, Infiniband, VI, RDMA, and a range of other protocols. The connectivity may be local within a data center, or distributed across a metropolitan or a wide area network. Also in this document any mention of a system or server in the singular tense may encompass multiple instances of that system or server.

In the following description, numerous specific details are introduced to provide a thorough understanding of, and enabling description for, embodiments of the multi-dimensional surrogation. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Concepts and Terminology

Administrator Role: This is one or more entities that are likely responsible for the planning, installation, maintenance, enhancement, troubleshooting, and other activities related to the servers, the network, the storage, the SANs, and other components of an enterprise, in some combination or variation.

Policy Manager Role: These are one or more entities that are likely responsible for the definition of the policies that are to be implemented in the data center, the desktops, the storage, and other areas of the data center. One of the several responsibilities might include the definition of the data retention and disposition policies for that organization. This may be the Chief Legal Officer, or designate. This responsibility might be delegated to the Administrator role described previously.

Auditor Role: These are one or more entities that are likely responsible for the monitoring of the implementation of the policies defined by the Policy Manager. In some organizations it is possible that the roles of Policy Manager and Auditor are with the same individual, or set of individuals. This may be the Chief Information Officer, or designate. This responsibility might be delegated to the Administrator role described previously.

End User Role: These entities are end users of the servers, desktops, mobile systems, and services provided by the enterprise IT departments. These may include employees, contractors, visitors, and others with legitimate and authorized access to these systems and services.

Near line servers: These are candidate implementation environments for data surrogation. However it may be possible to implement data surrogation without such a server. Alternatives may include co-location with existing servers or storage subsystems or data management mechanisms. If servers are used, these may consist of multiple systems and may be clustered, replicated, distributed, virtualized, or may be part of a grid.

One-pass Data Protection (or just "one pass"): These are mechanisms that leverage data movement and processing in a manner that may eliminate duplicate activities and subsequently may make the results available for one or more consumers or post-processors of this data, probably in a manner that amortizes the cost of the implementation across the multiple consumers, probably implemented in a manner that might achieve efficiencies that may include reduced costs, reduced load, reduced processing time, higher performance, higher scalability, improved security, improved accessibility, and others.

Production, Enterprise or Application Servers: An enterprise or an organization may be used interchangeably in this document and may refer to an individual or a group of individuals, possibly in one location or geographically distributed, who make use of servers that are constructed out of any computationally capable components that are single, multiple, clustered, distributed, replicated, virtualized, or augmented and connected in any other manner, that may be interchangeably referred to as production, enterprise, or application servers in this document.

It is possible for other roles to exist in an enterprise or organization. It is also possible for these roles to be modified, extended or combined in some arbitrary manner.

Mechanisms for Data Management

This section describes the four main categories of data management applications. These are "Backup", "Replication", "Snapshots", and "Archival". The sections that follow describe the manner in which these mechanisms may achieve many of the efficiencies facilitated by data surrogation. In addition these sections will describe new data management applications that are facilitated by data surrogation.

Figure 3:
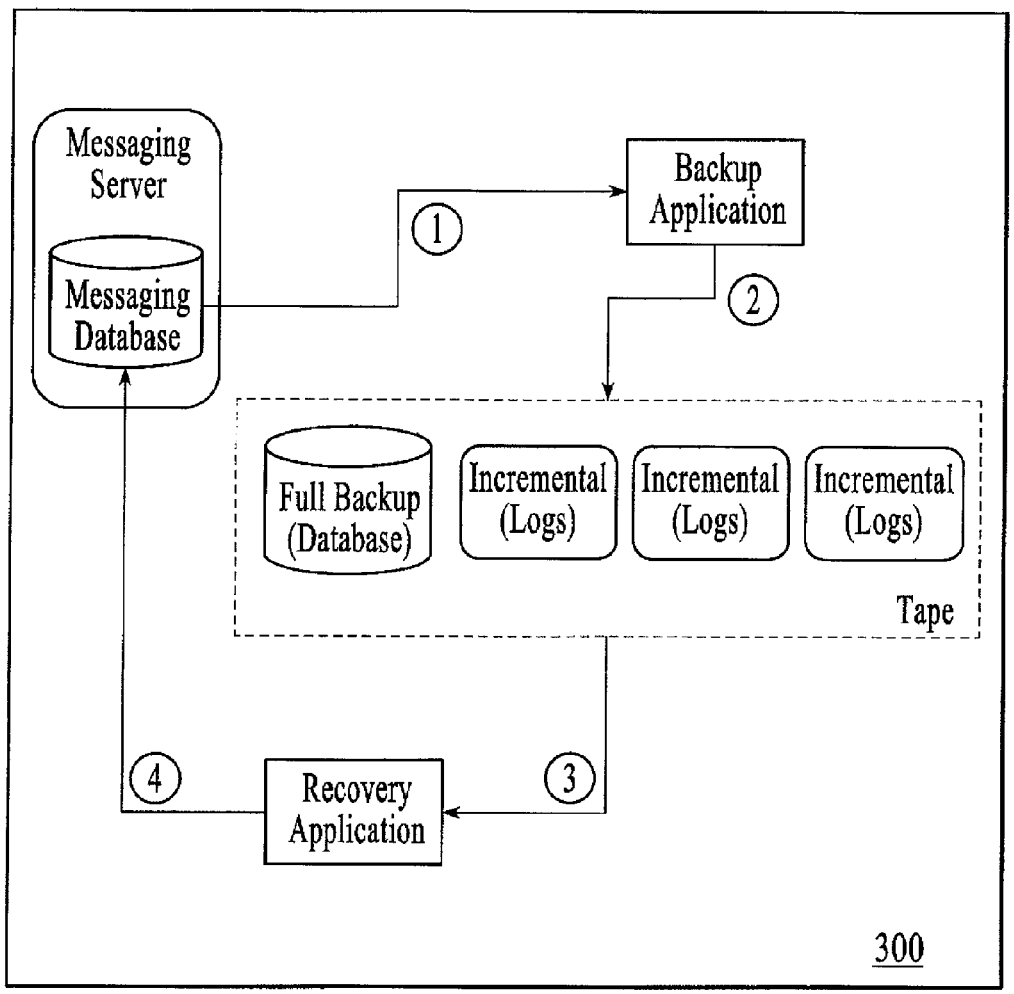
FIG. 3 is a system that includes a messaging server that is protected by a backup application that is using tape or disk to store full and incremental backups.

Backup:

FIG. 3 is a system 300 that includes a messaging server that is protected by a backup application that is using tape or disk to store full and incremental backups. There is a dual recovery application which reads from the tape or disk to reconstitute the messaging store when there is a need to recover from tape or disk, perhaps due to human errors, operational errors or messaging server failures.

The components of a backup and recovery solution may include the following:
1. An API or equivalent mechanism for capturing a full copy of the data or incremental changes in the data from the messaging server
2. A persistent medium such as tape to store the full and incremental backups
3. Access to this persistent medium when there are server failures
4. An API or equivalent mechanism to restore data back onto the messaging server by restoring the last full backup and applying all the subsequent incremental backups to it.

Backup may suffer from several deficiencies that render its capabilities limited for data resilience and analysis. These include the following:

There may be a long backup window when the backup application is running, which could load the messaging server and the network. This would be due to the slow and serial nature of the tape and the need to do frequent full backups because of the need to minimize the time and improve the reliability of restoration.

As a consequence of this backup window enterprise administrators perform backup on servers relatively infrequently. Also as a consequence, if there is loss of data on the enterprise server the window of data loss may extend back to the last backup instance. This recovery point objective (RPO) of one day would generally be considered as poor.

Due to the offline and serial nature of tape, it could be cumbersome, time consuming, expensive and slow to reconstitute the data in order to support applications such as data access and analysis. If there were a need to reconstitute views in multiple dimensions such as across time or space, then this burden could be significantly higher.

Due to the offline and serial nature of tape and the time it may take to apply incremental backups to the last full backup, it may be cumbersome and slow to restore data back onto the enterprise server after a failure. This window of service loss or recovery time objective (RTO) may also be poor.

If there is corruption or loss of data or any other kind of failure on the tape medium, this may not be discovered until an attempt is made to restore the data onto the enterprise server.

In many cases where disk is used instead of tape, the full and incremental sets are laid out on disk without being "consumed". While this may eliminate the complexities and latencies associated with tape it may still have the limitation of requiring incremental backups to be applied to the last full backup during restoration. This may also result in inefficient use of disk space thus limiting the backups across time that can be stored on disk and recovered.

Another challenge with tape and tape/disk backup is that in order to restore data at a granular item or object level (without restoring the entire data store) multiple backup passes are likely used. The second pass (also commonly known as brick backup in the messaging and e-mail data protection community) is at the item level which may be very slow and cause significant enterprise server load probably making it an unattractive option.

The physical management of tapes, both in-house and the sending/fetching of tapes from offsite storage could add significant overhead to the recovery process as well.

Tape media may be prone to failures. These failures are usually detected only when an attempt is made to restore the data. Such a failure could potentially degrade the Recovery Point Objective significantly.

Replication:

Replication is a mechanism for making a copy of the enterprise server data to an alternate location. This is occurring during the normal operation of that enterprise server. This replication can be either synchronous, or asynchronous. In the former case the replicated copy is committed to disk on the alternate media before the originating write is acknowledged. This could be more resilient to failures but considerably more expensive in terms of latency impact on the enterprise server. Asynchronous replication would leverage optimizations such as batching and caching that could potentially reduce cost and complexity.

Figure 4:
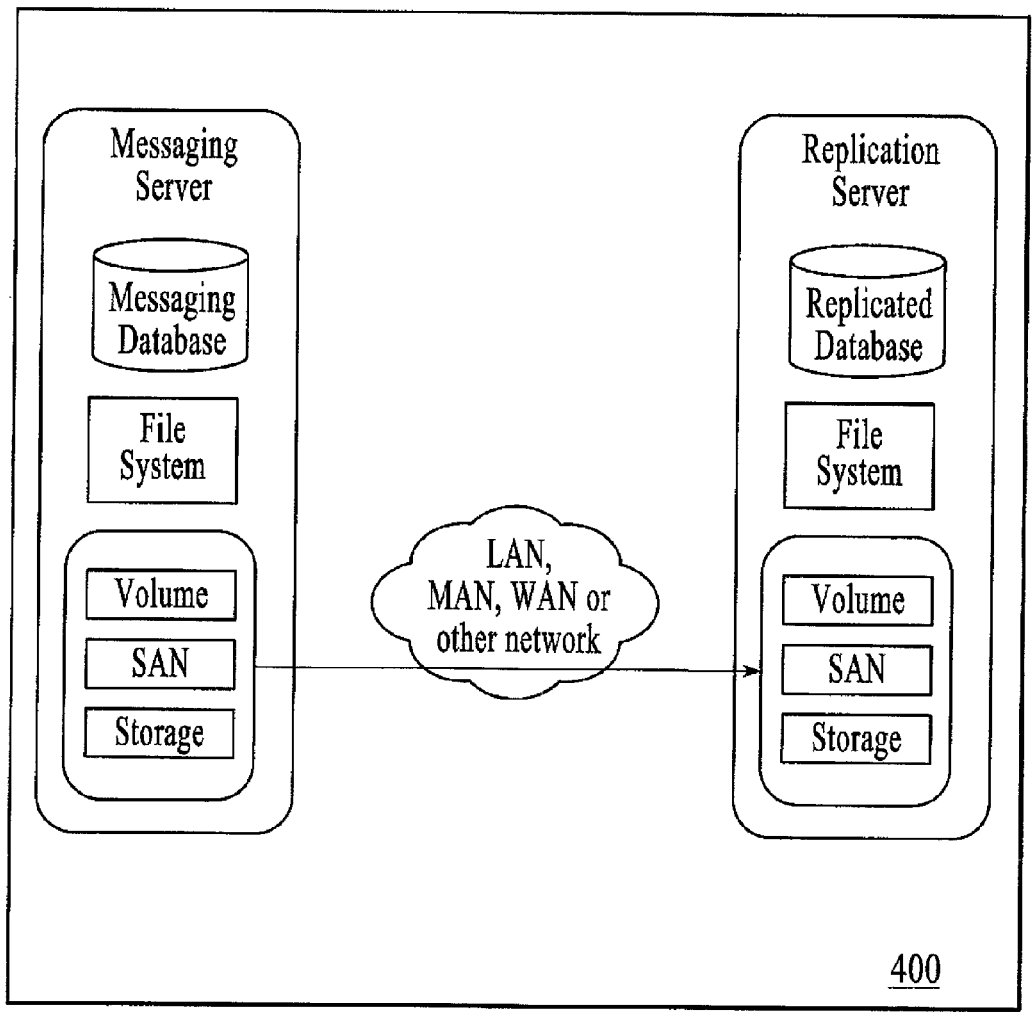
FIG. 4 is a system that includes a messaging server that is protected using replication.

FIG. 4 is a system 400 that includes a messaging server that is protected using replication. Replication might be implemented at several levels in the I/O stack, including the volume level, as is illustrated in this diagram. Volume-level replication can be implemented on the host, in the SAN, in the back-end RAID storage, or some variation or combination thereof.

A possible limitation of replication is that the remote copy being generated does not have a consistent image. In other words, it is only "crash consistent". Therefore the replicated copy may not necessarily be usable without additional mechanisms and processing for implementing application consistency. Because of the complexity of applications, this type of replication addresses limited failure and recovery scenarios.

Snapshots:

This mechanism captures a point-in-time view of the enterprise server data and optionally capturing it to alternate media, perhaps on a different server. This mechanism could leverage mechanisms in the volume manager, the Storage Area Network (SAN) or the storage to generate the point-in-time snapshot, which can be subsequently copied to an alternate server, or to persistent backup media. The snapshot mechanism could involve optional participation by the systems software or the applications or both in order to create a consistent point in time view of the data. An example of such a mechanism is the Volume Shadow Copy Service (VSS)

from Microsoft which may leverage compliant applications in order to provide application consistent snapshots for the use of data management applications.

Figure 5:
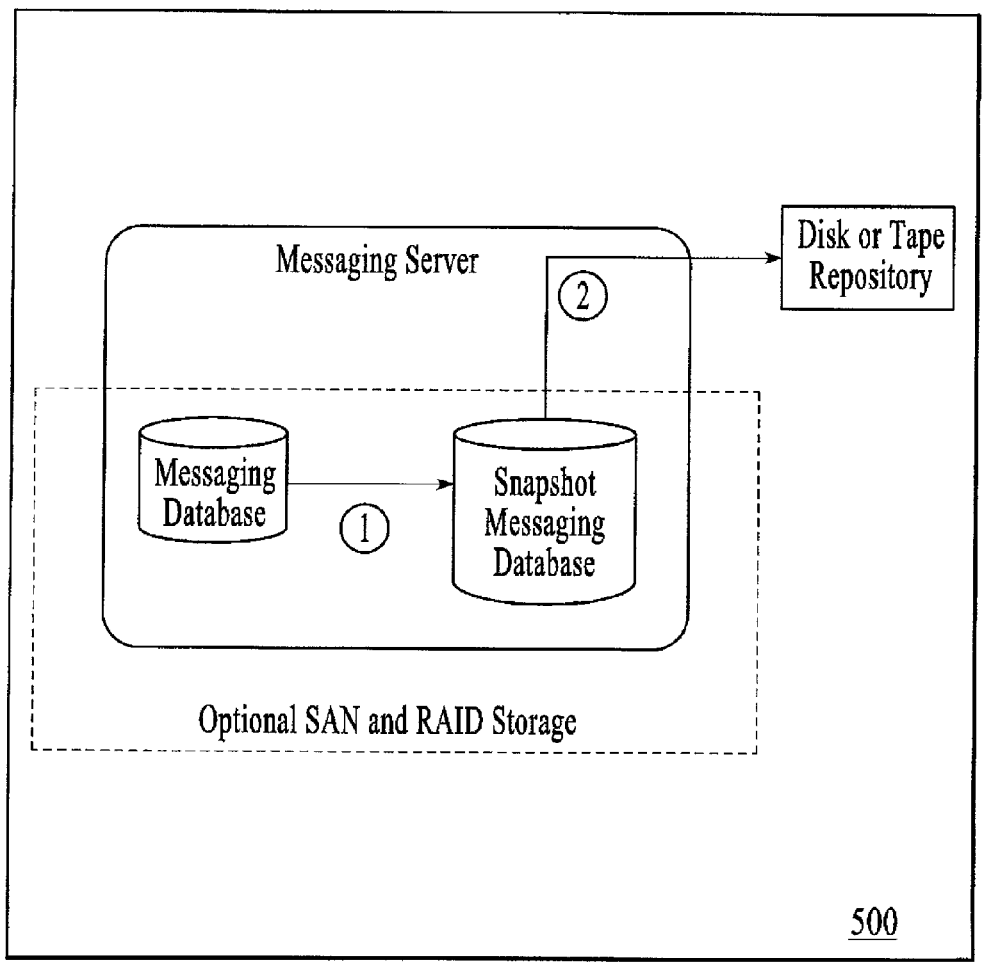
FIG. 5 is a system that includes a snapshot mechanism.

FIG. 5 is a system 500 that includes a snapshot mechanism. This snapshot can be either implemented directly on the host by leveraging a host-based volume manager, or using specialized SAN or RAID storage hardware. The difference between snapshots and replication is that snapshots are usually consistent from the application's perspective.

There are known to be several challenges to Snapshots which include:

1. These snapshots are discrete point-in-time images of data—not continuous.
2. There may be a finite and possibly disruptive load impact on the production servers (due to the underlying copy-on-write operations)
3. Incremental snapshots that improve efficiency of full snapshots may have the same problem as incremental backups.
4. No granular access to data. A snapshot of dense application data may require the consumer of the snapshot to have detailed knowledge of these formats in order to obtain granular access.
5. These snapshots may not always be consistent depending upon the availability of compliant "writers" and "providers". In other words, the ability to get an "application consistent" snapshot is likely to require the participation of that application to properly quiesce before the snapshot is taken.
6. As a consequence of the previous issue, it may be necessary to make design modifications to existing applications to make them snapshot-aware for application consistency.
7. To capture the modification of data on the enterprise server over time it may become necessary to create multiple snapshots. Even though optional mechanisms for efficient storage of these multiple snapshots might exist, there may be an upper limit on the number of snapshots that can be preserved.

Archival:

The archiving attempts to create a copy of all message items that are generated on, or arrive at a messaging server. Similar mechanisms exist for other types of servers. For a messaging server an archival operation could be triggered by an event such as the arrival, creation, or modification of a message item. It could also be triggered by a pre-configured schedule, or by user request. Depending on the need and the user configuration, the original data may be copied, or drained into the archive.

A common objective of archiving is to create a record of all transactions, usually for monitoring and compliance. Messaging servers have at least three common mechanisms for implementing archival. These hook into either SMTP, impersonate an e-mail client in order to get to message items from using a client communication protocol such as MAPI, or leverage a capability called "Journaling". This mechanism for extracting items is also known as "brick" extraction. This mechanism may have several challenges and limitation that may include lack of efficiency, and lack of fidelity of data captured.

Figure 6:
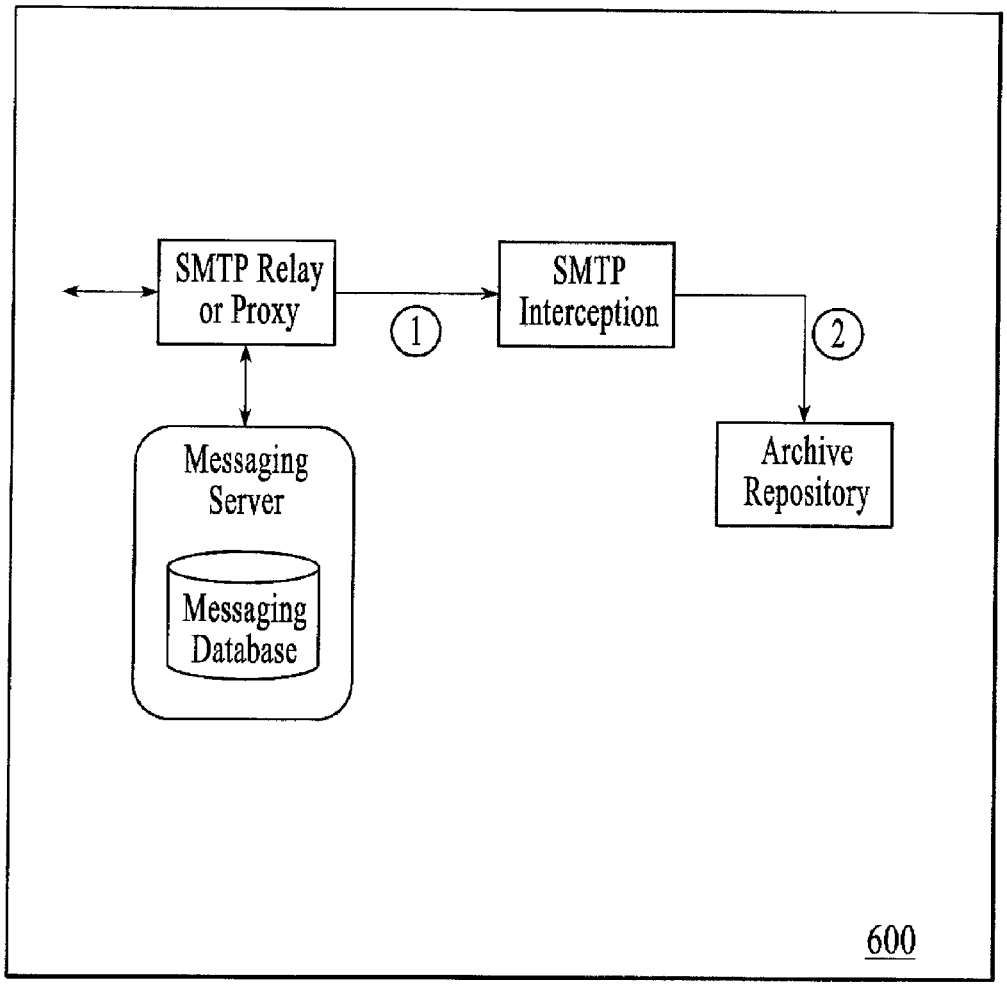
FIG. 6 shows archival, which includes intercepting e-mail being transmitted via SMTP.

FIG. 6 shows archival 600, which includes intercepting e-mail being transmitted via SMTP. The diagram shows the use of an explicit SMTP proxy, but it is also possible to directly access and receive a callback from an SMTP server to accomplish the same objective, which is to duplicate and capture e-mail messages. This example is specific to messaging servers, and equivalent and/or alternative mechanisms may exist for other types of enterprise servers.

Figure 7:
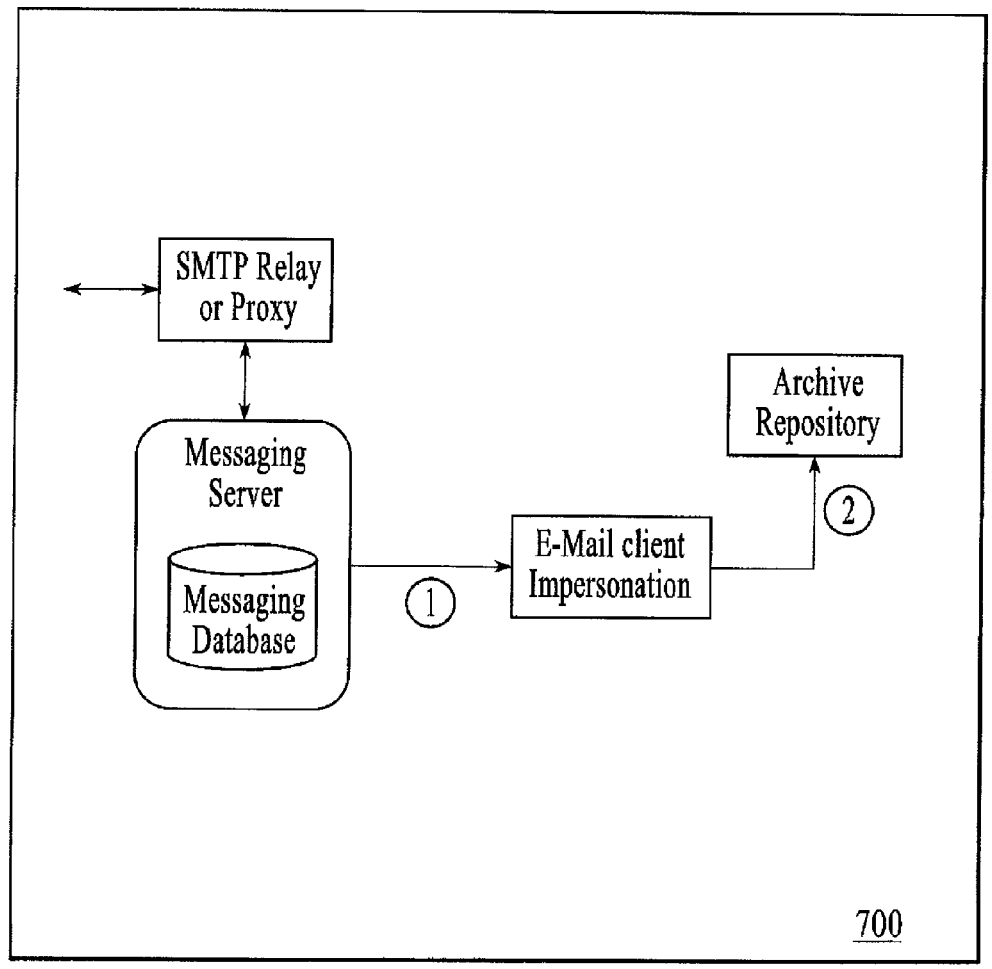
FIG. 7 shows archival in which email is captured via a mechanism that uses impersonation where all the e-mail that arrives in, or originates at, specified mailboxes is accessed and duplicated by the e-mail client impersonation proxy.

The previous diagram describes one of several possible variations of archival where the e-mail is being duplicated and captured by having the archival system impersonate an E-Mail client in order to get access to all messaging data for archival purposes. The following components are described:

1. The inbound or outbound Email may be intercepted at the SMTP Relay or Proxy. All e-mail within the Messaging Server that originates and terminates within that server is also forwarded to the SMTP Relay or Proxy
2. The intercepted Email may be copied and transferred into the Archive Repository FIG. 7 shows archival 700 in which email is captured via a mechanism that uses impersonation where all the e-mail that arrives in, or originates at, specified mailboxes is accessed and duplicated by the e-mail client impersonation proxy.

Figure 8:
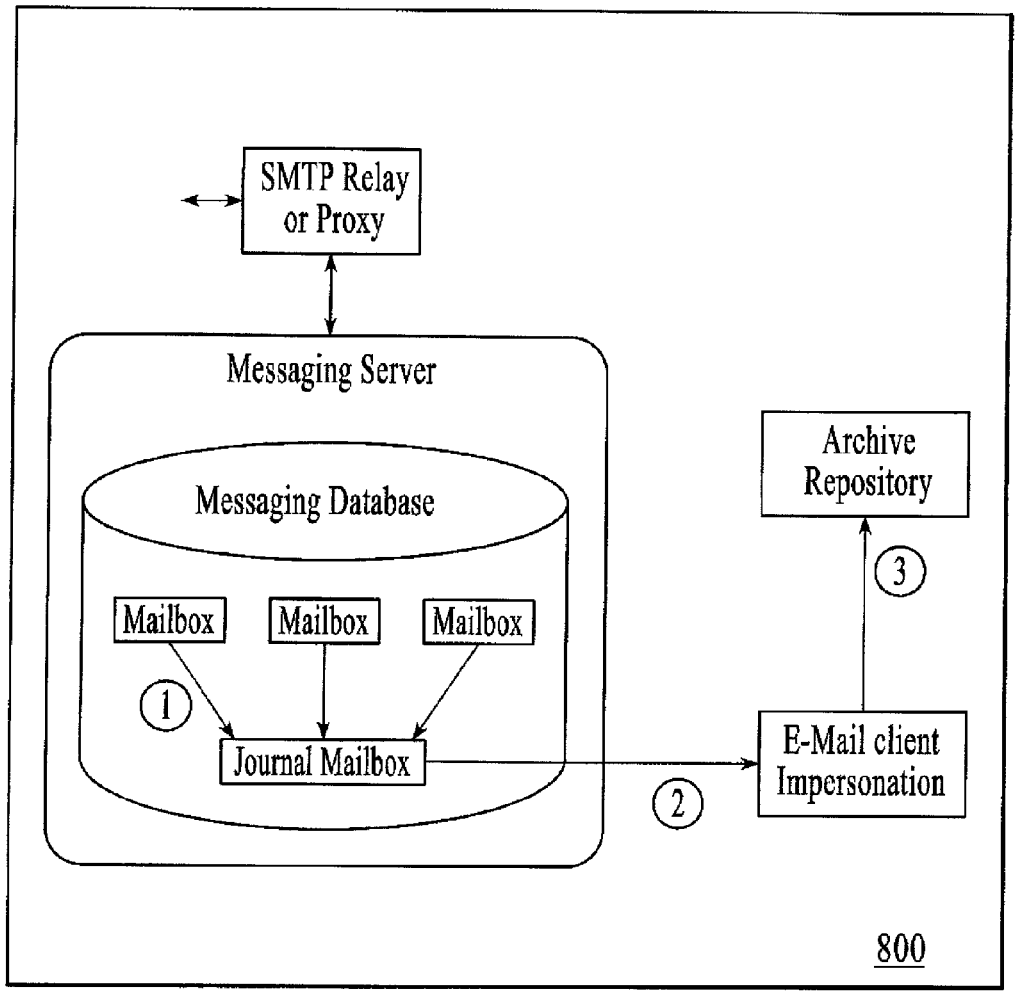
FIG. 8 shows archival using Microsoft Exchange Server journaling.

1. An application may impersonate an Email client and access the Messaging Server. This application would have sufficient privileges to have access to all the mailboxes that are to be archived
2. The Application may then clone and transfer messages to be archived into the Archive Repository FIG. 8 shows archival 800 using Microsoft Exchange Server journaling. However other systems may provide equivalent capabilities, either intrinsic to the system, or introduced by an add-on capability, that can be used in a similar fashion. In this diagram the following phases are illustrated. Other alternatives are possible in order to accomplish similar objectives:

1. Capture to Journal Mailbox: A specific mailbox in Exchange is specially configured as the "Journal Mailbox." This is a sink of all e-mail that originates at, or is delivered to, other specified mailboxes.
2. Optional Extraction by Email Impersonation: The Email that arrives at the Journal Mailbox can be optionally extracted or duplicated by an Email impersonation client with access permissions to the Journal Mailbox.
3. Optional storage in Archive: The Email Impersonation can optionally store all the messages from the Journal Mailbox into the Archive and optionally purge the Journal Mailbox.

These archival mechanisms may have well-known limitations that may include the following:

The methods of capturing message items may be intrinsically slow since it is impersonating an Email client or an SMTP server/relay. This could result in an unacceptably long "Archival Window" that may become an obstacle to normal operation probably due to its use of production servers and networking resources.

If the SMTP server/relay impersonation mechanism is used, this could slow down the ingress and egress of Email probably due to the need to access and duplicate all items.

IF SMTP impersonation is used, this could necessitate all e-mail to be re-directed through the SMTP relay (even internal messages between mailboxes on the same messaging server.)

If Journal Archiving or Client Impersonation mechanism is used (this is also known as "Brick Extraction") this could result in excessive loads being placed on the production servers.

For any form of Archival there could be a significant load on the enterprise network as the items are transferred.

The SMTP impersonation mechanism could preclude the ability to capture non-email items such as calendar items, appointments, contacts, journal entries, notes, tasks, rules and other custom types of messaging items.

The SMTP impersonation mechanism could place restrictions on the use of some messaging server features (such as rich text formatting of messages) in order to allow capture of message content in an archive friendly SMTP format.

The degree of data content fidelity could be variable (from low for SMTP impersonation where the focus is on capture of the essential content such as the subject, body and attachments of email messages only, to varied for Client impersonation using protocols such as MAPI where compromises may be made about data fidelity due to the server performance load it places on the production messaging servers.)

The degree of mailbox mapping fidelity could be variable (it is usually low for SMTP impersonation and journaling based systems where a single copy of a message that was sent or received by multiple mailboxes is captured, but may make it difficult to reliably identify all the mailboxes involved in sending or receiving these messages; this could get even further complicated due to the use of features such as BCC and distribution lists.)

Archival would demand additional security infrastructure since SMTP or Journaling or Email impersonation extraction usually requires additional security due to the flow of brick level information for all mailboxes through a common archiving channel that may flow through existing and additionally deployed systems where the data may exist in the clear before it reaches the archive.

Trend Toward Lower Cost Disks (and Near Line Servers):

Disks are steadily becoming a cheaper alternative to tape, which may facilitate adoption in the form of near line servers as described in this section. A sample range of data management applications is described that increasingly leverage near line storage and/or servers but are discrete and hence may not necessarily leverage all possible efficiencies that are available.

Figure 9:
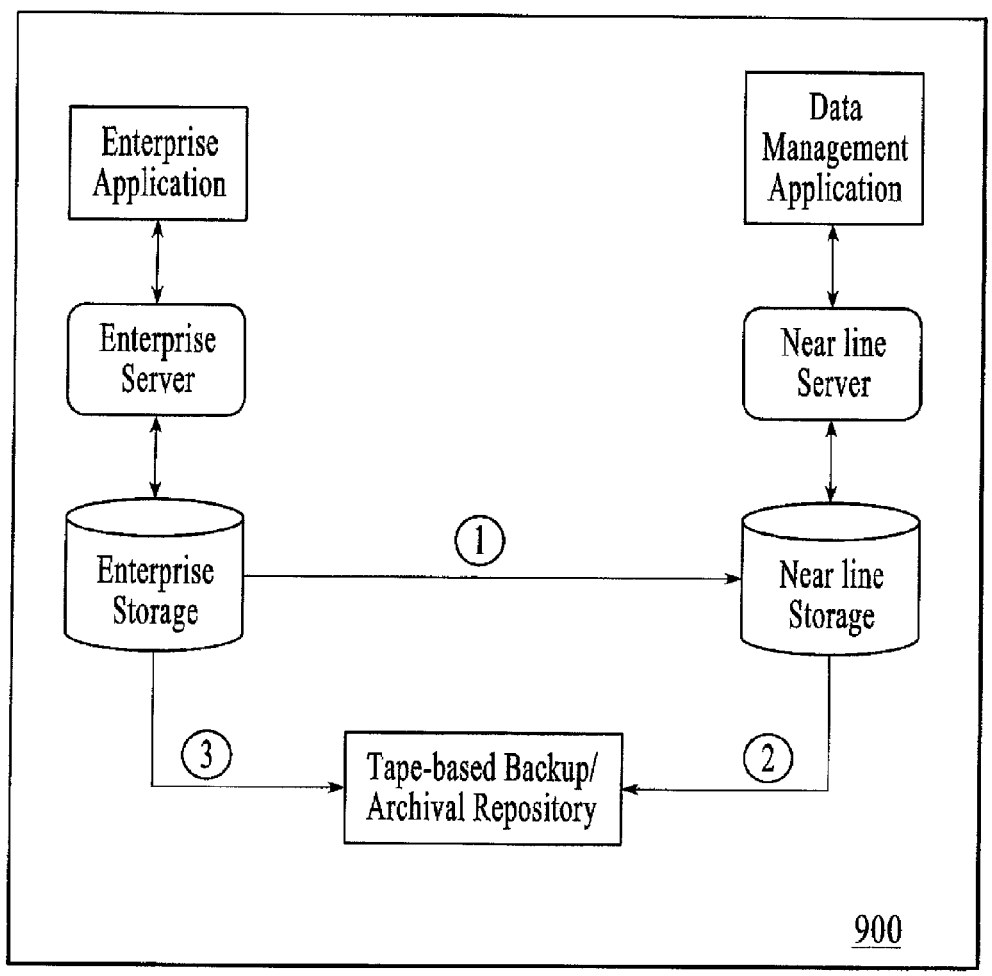
FIG. 9 is a system that includes a near line server providing data management capabilities.

FIG. 9 is a system 900 that includes a near line server providing data management capabilities. It may be working in parallel with, in place of, or in the path of, a tape-based backup/archival mechanism.

In the previous diagram the following data paths are described:
1. Production to near line server: Data is being captured on the enterprise production server and transferred to the near line server for purposes of data management.
2. Near line Server to Tape Storage: Data from the near line server is optionally being duplicated to the tape-based repository for protecting the near line server from catastrophic errors such as media failures or data corruptions.
3. Production Server to Tape Storage: The production server may optionally continue to be protected using traditional tape based backup/archival, this mechanism optionally co-existing with the near line server-based data management capabilities.

Near Line Servers: Disk Caches

Figure 10:
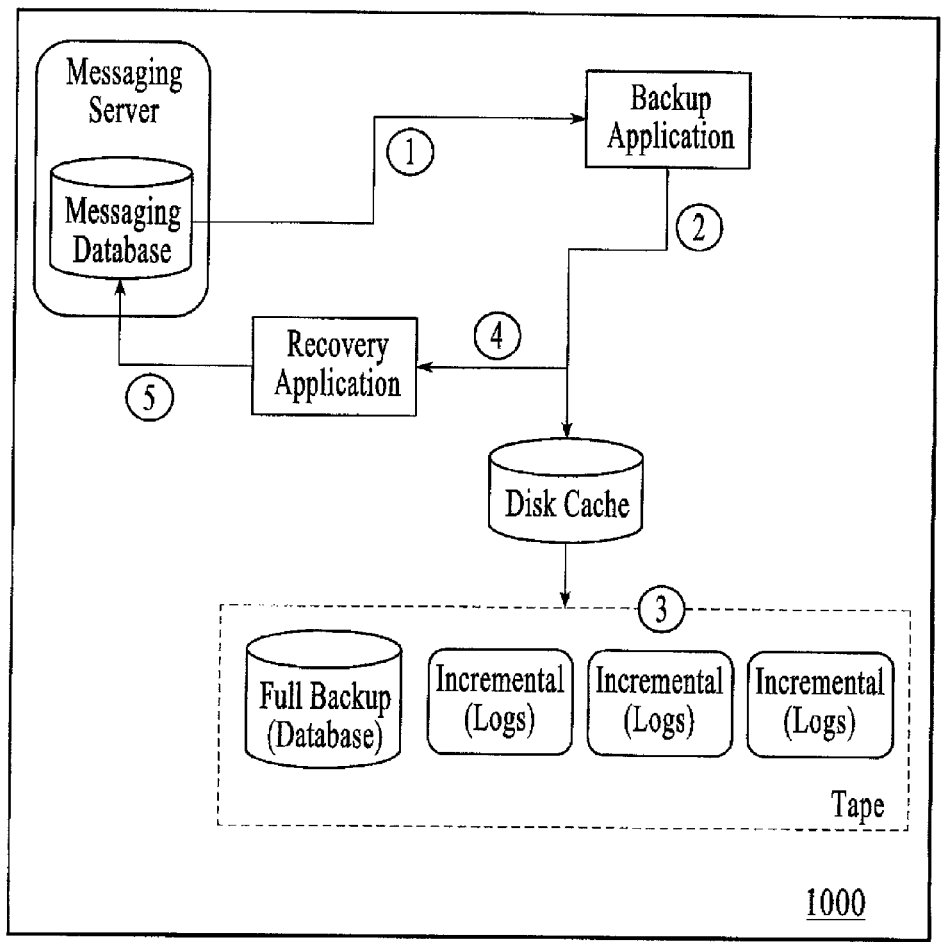
FIG. 10 is a system that includes near line servers as disk caches for tape.

One of the various possible deployments of near line storage is to introduce the near line server as a "disk cache" in the data path of the traditional tape-based backup or archival mechanisms. This could provide several benefits that include the ability to speed up the transfer to tape, and the optional ability to bypass tape when accessing items that are still in the disk cache. FIG. 10 is a system 1000 that includes near line servers as disk caches for tape.

In the previous diagram the following data paths are illustrated for the purpose of socializing the concepts, but other implementations are possible:
1. Transfer to Backup Application: Data is captured from the enterprise server and transferred by the backup application
2. Backup Application access to Disk Cache: The backup application is streaming the data to the near line server that is serving as a disk cache.
3. Disk Cache integration with back-end Tape storage: The data that is staged in the disk cache is being transferred to tape.
4. Recovery Application access to Disk Cache: When the recovery application needs data it access the tape through the disk cache, therefore in some cases it will find the data it needs in the disk cache without needing to go to tape.
5. Recovery Application transfer to Enterprise Server: The recovery application provides the requested data back to the enterprise server.

Near Line Servers: Virtual Tape Libraries

Another mechanism that may be available for introducing lower-cost disk storage, perhaps in the form of a near line server, for enhancing traditional tape-based data management is the Virtual Tape Library. In this scheme the near line server impersonates a tape library. The interface that it provides facilitates the re-use of enterprise software and mechanisms that are designed to work with tape, except that the underlying near line storage provides more capabilities and performance that the disks have over tape.

Figure 11:
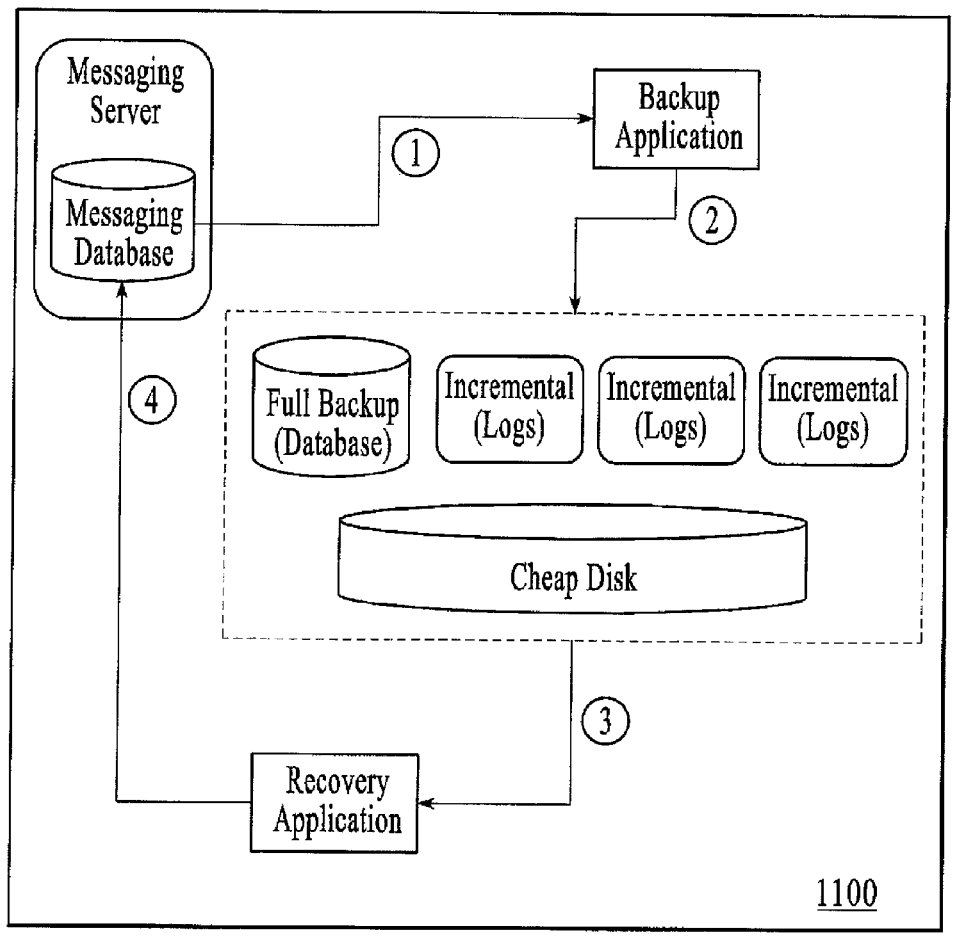
FIG. 11 is a system that includes a virtual tape library using near line storage.

FIG. 11 is a system 1100 that includes a virtual tape library using near line storage. Other variations are possible, including the use of storage area networks and more complex topologies. In this example a single messaging server is showcased as representative of enterprise servers; it may be possible to provide equivalent functionality for any number of servers of different types.

In the previous diagram, the following data paths are illustrated as examples.
1. Transfer to backup application: The backup application extracts a copy of the data to be backed up from the enterprise server.
2. Transfer to near line impersonating tape: The backup application stores the data to a disk that may be impersonating a tape or a tape library.
3. Access by recovery application: The recovery application accesses data on the disk that is impersonating a tape or a tape library.
4. Transfer to enterprise messaging server: The recovery application transfers the data to the enterprise server.

Log Shipping:

This capability that is usually limited to higher-end database management systems facilitates the low-cost propagation of changes from a database that is in use, to another hot stand-by database. The logs are applied on this target database.

This capability is usually restricted to database systems, and in certain cases may preclude the hot stand-by database from being accessed and used concurrently. The target database may be local to the data center, or it may be remote.

Figure 12:
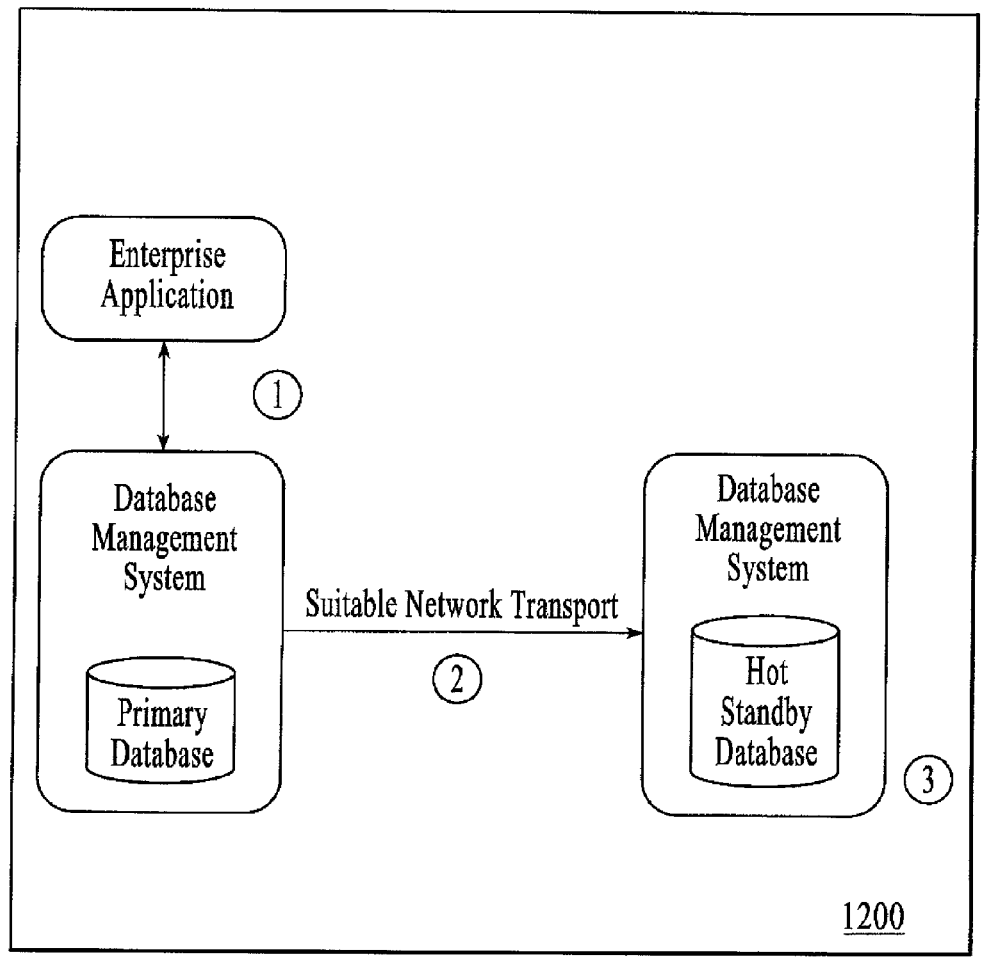
FIG. 12 is a system that includes log shipping.

FIG. 12 is a system 1200 that includes log shipping. In this example the enterprise application on the left is making changes to the primary database. The database management system is periodically transferring these logs to the target database management server, where the logs are applied to the hot stand by replica in order to bring it up-to-date.

In the previous diagram the following data paths are illustrated:
1. Changes are occurring on the production system, perhaps due to application or client writes. These changes are resulting in write-ahead logging, or similar schemes
2. These changes, perhaps in the form of write-ahead logs, are transferred over to a hot standby database server
3. These changes are applied to the hot stand-by databases to bring them up-to-date with the production servers Server Clustering:

Server clustering is a mechanism for multiple computing systems to collaborate to provide fault-tolerance or scalability (or both). Two or more compute nodes will appear as a single entity to remote network accessible entities. These compute nodes will be in combination of active (processing) or stand-by (waiting for a failure to occur in an active).

Figure 13:
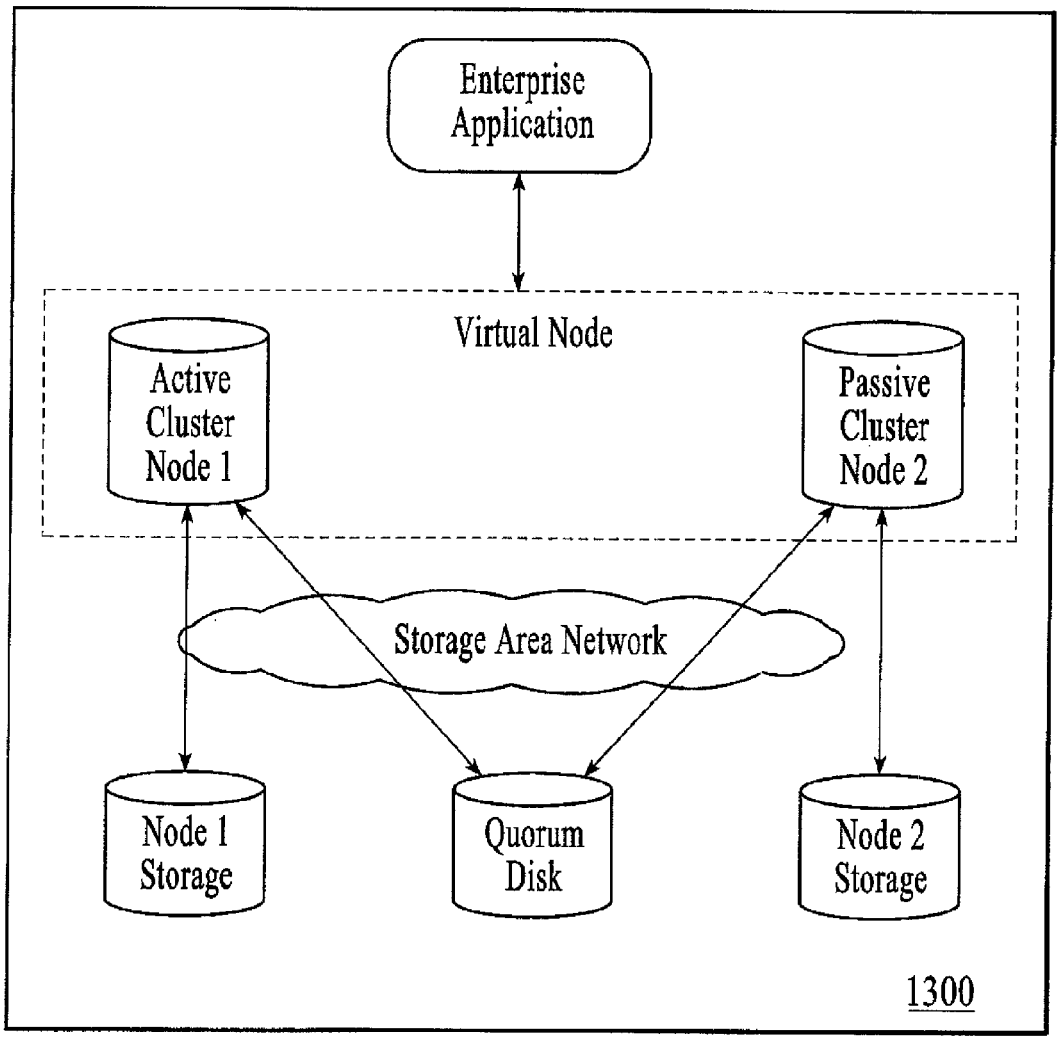
FIG. 13 is a system that includes server clustering.

FIG. 13 is a system 1300 that includes server clustering. Other types of clustering exist, such as load balancing. This particular example is of a 2-way cluster "shared nothing" active/passive cluster that is using a storage area network and a shared quorum disk for co-ordination.

Server clusters are an effective mechanism for scaling computational systems and rendering them resilient to limited failures. However these have their limitations, hence tend to have limited applicability for data management applications.

Clusters render the system tolerant to system failures, but do not contain data corruptions. As a result when there is a data corruption this can be propagated to other nodes, and the failure cannot be mitigated by the cluster.

Clusters do not easily allow targeting individual nodes in the cluster for different purposes such as production messaging on one and data management and analysis applications on another.

The previous diagram makes a reference to "Storage Area Networking." This is a network that would use combinations of technologies such as Fibrechannel, iSCSI, Infiniband, or a range of other technologies. This network may be optionally be bridged by intermediate mechanisms to provide connectivity between geographically disparate locations. In this document all references to Storage Area Networking (or "SANs") is intended to encompass all variations and combinations of protocols, technologies, and implementations.

Figure 14:
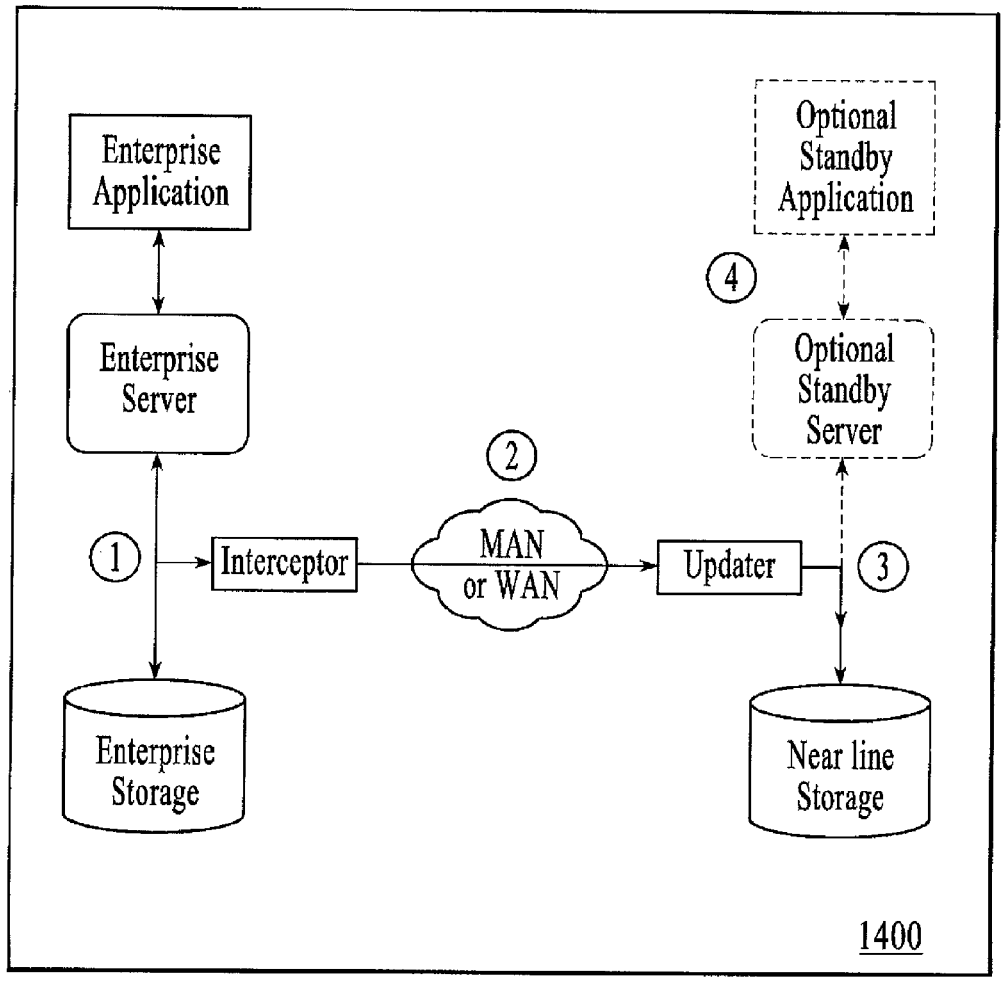
FIG. 14 is a system that includes geo-clustering.

Geo-Clustering:

This is a scheme for almost continuously creating a remote hot stand-by replica of a local server over a distance network such as a MAN or a WAN or any other type of network. When there is a catastrophic site failure the remote replica is able to take over and restore data access and service. FIG. 14 is a system 1400 that includes geo-clustering.

In the following example the following paths are illustrated:
1. Interceptor: This is a mechanism for capturing all changes that are occurring to the data on the production server side. This production server itself may be clustered conventionally. The interception mechanism is similar to that in replication that was described previously.
2. Transfer: The changes that are captured are shipped over a MAN or a WAN or equivalent network that might use technologies ranging from ATM to SONET. The changes might be transferred asynchronously probably due to the long network latencies, but it is technically possible to make these synchronous.
3. Updater: At the remote site the changes are applied to a copy of the data to keep it up-to-date. If the updates are asynchronous then there will be some finite data loss under certain circumstances. This link is also a mechanism for the remote stand-by site to detect any failures in the primary site. Other mechanisms are possible.
4. Fail-over: When a failure in the production site is detected, the stand-by servers are able to start and provide service and data access restoration. In some scenarios, the original application can be failed over to access the remote service that has been restored. There is usually a complementary fail-back mechanism to return data and service to the original or replacement server.

Figure 15:
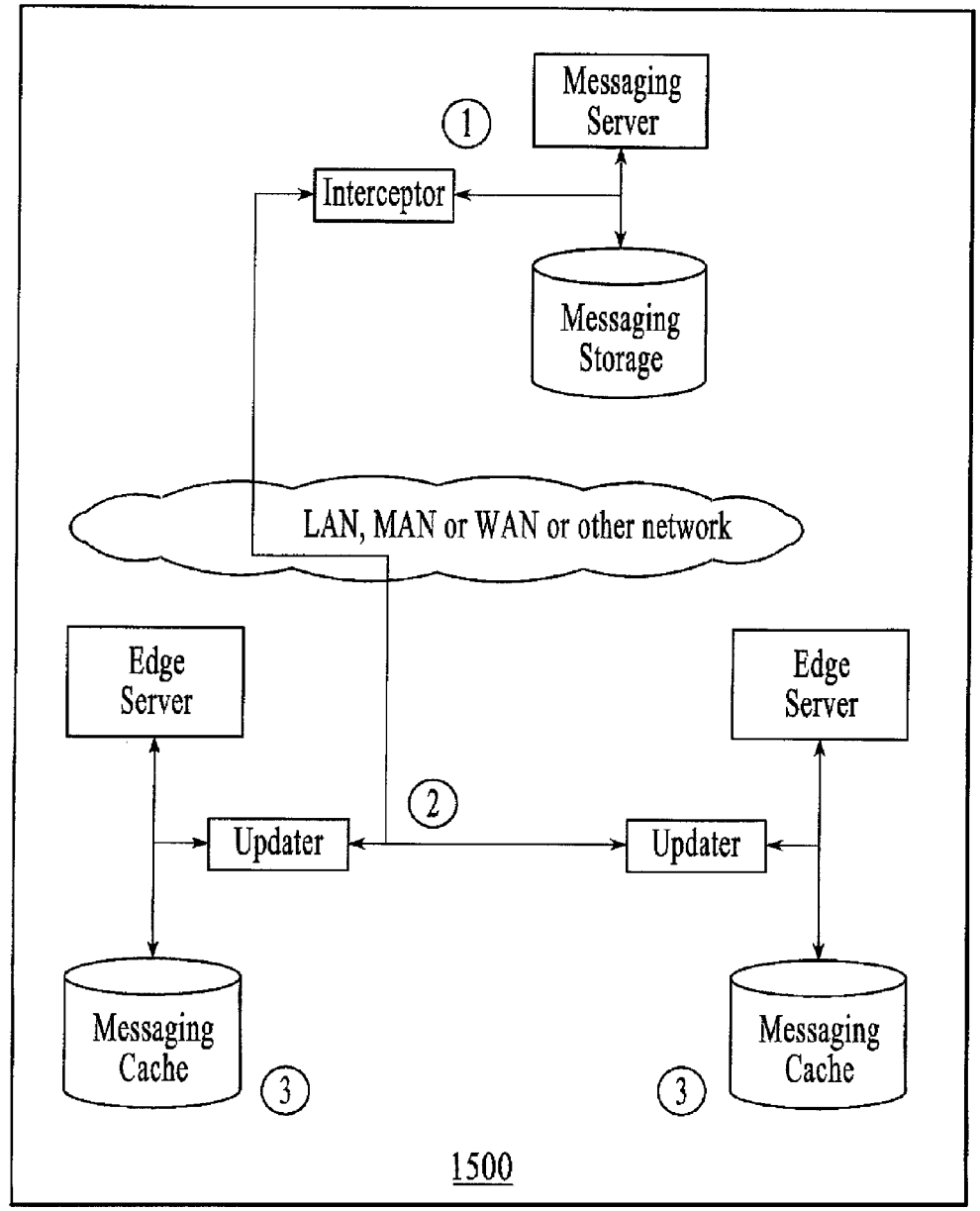
FIG. 15 is a system that includes caching messaging servers that are providing service optimization and service continuity to remote sites.

Data and Service Proxies:

Similar to the caching of data on the edge, it is also possible to cache service on the edge. This mechanism may optionally leverage near line servers and data management techniques. FIG. 15 is a system 1500 that includes caching messaging servers that are providing service optimization and service continuity to remote sites.

Service proxying is different from geo-clustering in that the primary site and all remote sites are concurrently operational. The following components of Data and Service proxies are outlined in the previous diagram.
1. Interceptor: This mechanism is noting changes to data in the primary server and propagating them to the remote server. It is also receiving changes to the data in the remote server that are propagated back and reconciling them to the data in the primary server.
2. Transport: This mechanism may use a LAN, MAN, WAN or other network that is leveraging a suitable transport and protocol to provide sufficient latency, bandwidth, security and any other requirements that are necessary for maintaining a sufficiently reliable link between the Interceptor and the Updater.
3. Updater: This mechanism is noting changes to data in the edge server it is associated with and propagating these back to the primary server. It is also receiving changes to the data in the primary server from the Interceptor and reconciling these to the data in the edge server.

The previous diagram describes a Data and Service Proxy for messaging servers; other servers can also benefit from this mechanism. Only two remote servers and a single centralized server are shown, but other combinations are possible. The local and remote servers may be clustered and otherwise configured specially for reasons of availability or scalability. Though the connectivity is shown generically, such connectivity may include a MAN or WAN, LAN-based configuration, or any combination thereto. Additionally other schemes are also possible.

Multi-Dimensional Data Surrogation

Figure 16:
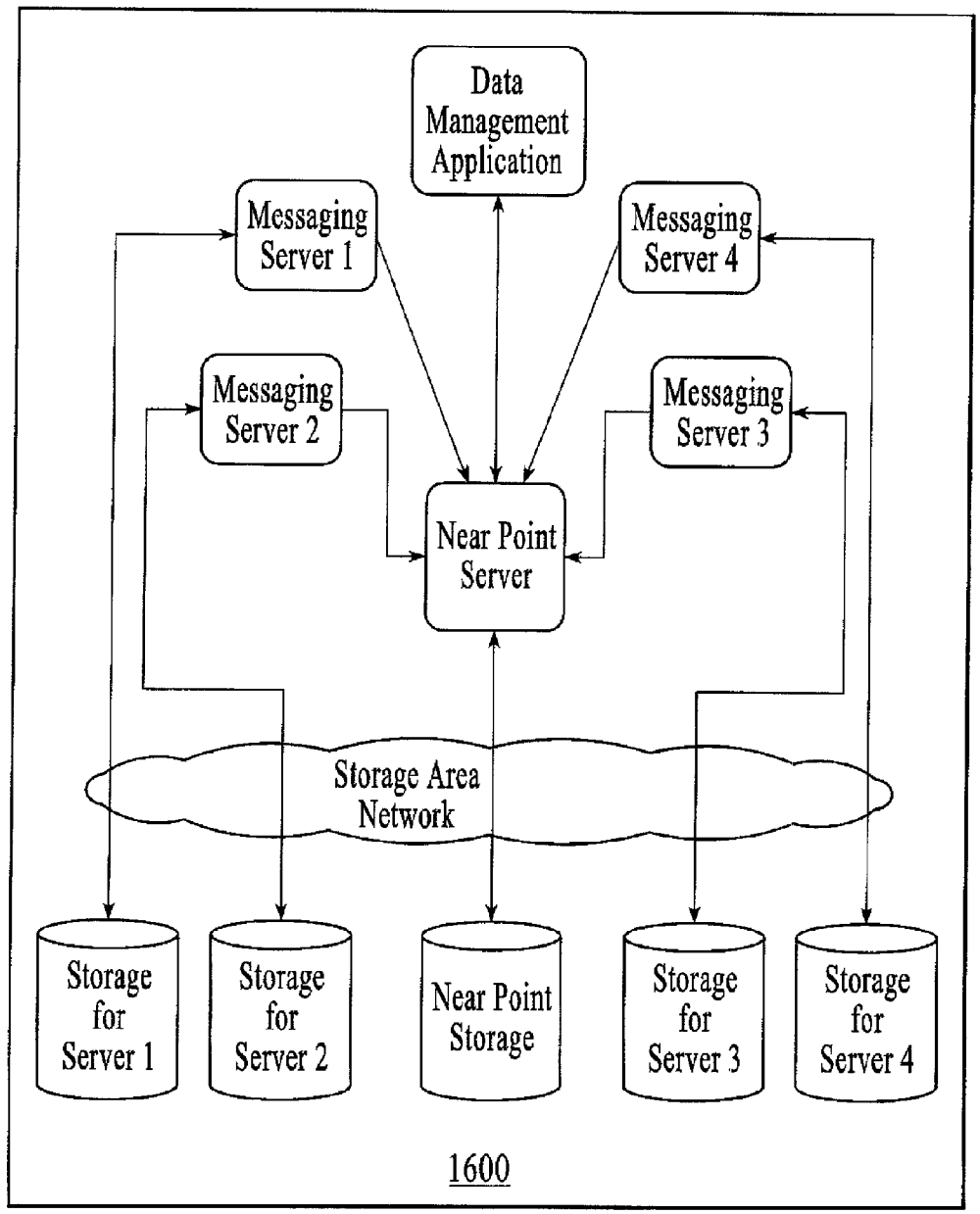
FIG. 16 is a system that includes data surrogation, under an embodiment.

A Data Surrogation Platform:

FIG. 16 is a system 1600 that includes data surrogation, under an embodiment. Multiple alternatives and/or variations may exist. These alternatives may provide equivalent functionality or a superset or a subset. The following diagram (FIG. 0) shows data surrogation for four enterprise messaging servers. The exact number of messaging servers is dependent upon appropriate capacity planning and on the RTO and RPO objectives of the customer. The Storage Area Network is optional.

Figure 17:
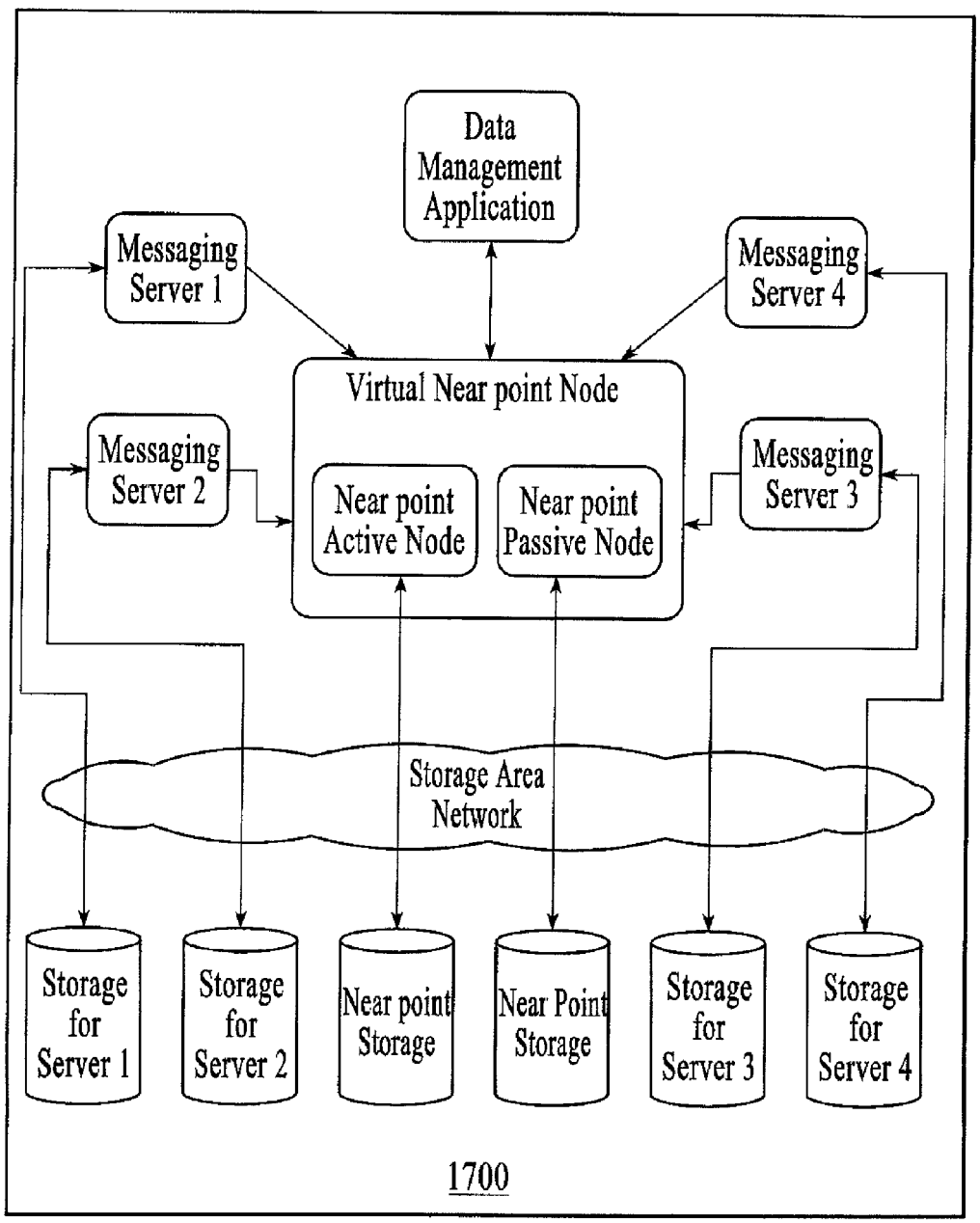
FIG. 17 is a system that includes data surrogation, under an alternative embodiment.

FIG. 17 is a system 1700 that includes data surrogation, under an alternative embodiment. This one incorporates clustering for the purpose of either server availability, server scalability, or both. There is a range of clustering implementations, from traditional server clustering to specialized application-aware clustering. Variations of this example that add or remove capabilities are possible; one such variation might omit the SAN.

In the previous diagram the following phases are described. Please note that this is an example; other variations are possible in order to accomplish similar objectives.

In the previous example the server implementing data surrogation is illustrated as a simple 2-way active/passive cluster that is SAN-enabled. Other variations of cluster-based implementations are possible. In general, if data surrogation is implemented using a near line server, then that near line server may not necessarily be a single machine, but can consist of a distributed system involving multiple machines offering various combinations of specialization of function and load balancing for scalability and fault tolerance. Furthermore, the storage for a near line system may not necessarily be a single storage system, but can be consisting of a collection of storage devices, perhaps using a SAN, for homogeneous and heterogeneous functions (such as data management, data analysis, brick extraction, indexed object repository, full text indexing, data mining, etc.)

In addition to clustering, the near line server can be locally replicated in order to facilitate the resiliency of the near line server and the availability of the data that it is hosting. This is a looser coupling of servers than clustering and could facilitate higher efficiency of data preservation. This local replication can be also combined with clustering. For example, the following diagram that describes local replicated near line servers may actually represent two clustered near line servers that are also replicating locally. This clustering and replication can be naturally orthogonal and complementary.

The remaining components of this diagram have been described previously in this document.

Figure 18:
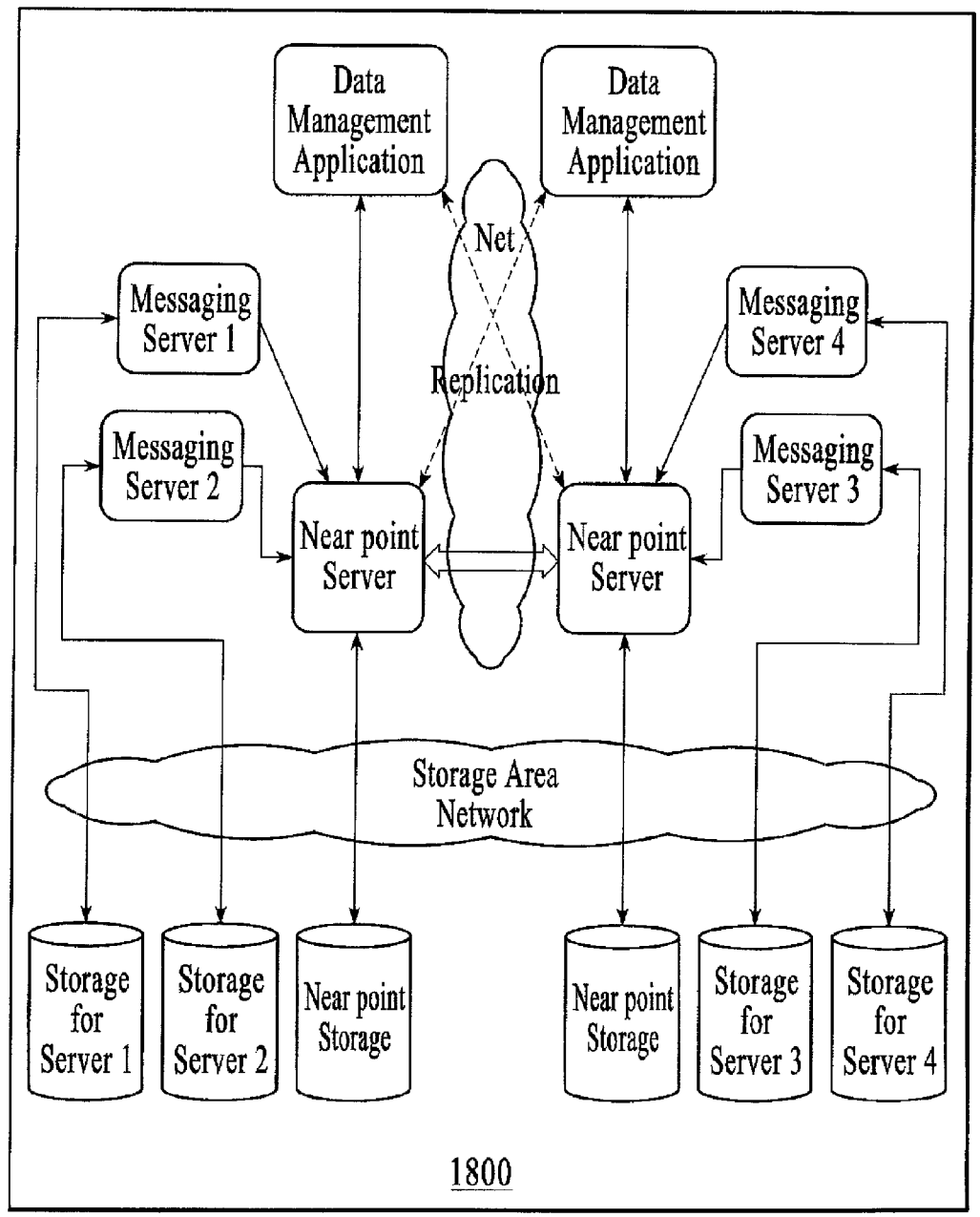
FIG. 18 is a system that includes locally replicated data surrogation, under an embodiment.

FIG. 18 is a system 1800 that includes locally replicated data surrogation, under an embodiment. The replication may be one-way or two-way. The transport may be either a conventional Ethernet, or a SAN. The SAN may be FibreChannel, iSCSI, or other. It may also be any alternate viable transport such as Infiniband or Hypertransport. It may also use a range of optimizations including VI and RDMA.

In the previous diagram if there is a failure of one of the near line servers then the other one that is shadowing it can be accessed by the Data Management applications. The example describes a simple 1:1 replication; other complex ones are possible where one near line may be replicating itself to more than one near line servers, and these servers may all be organized in some arbitrary topology.

Figure 19:
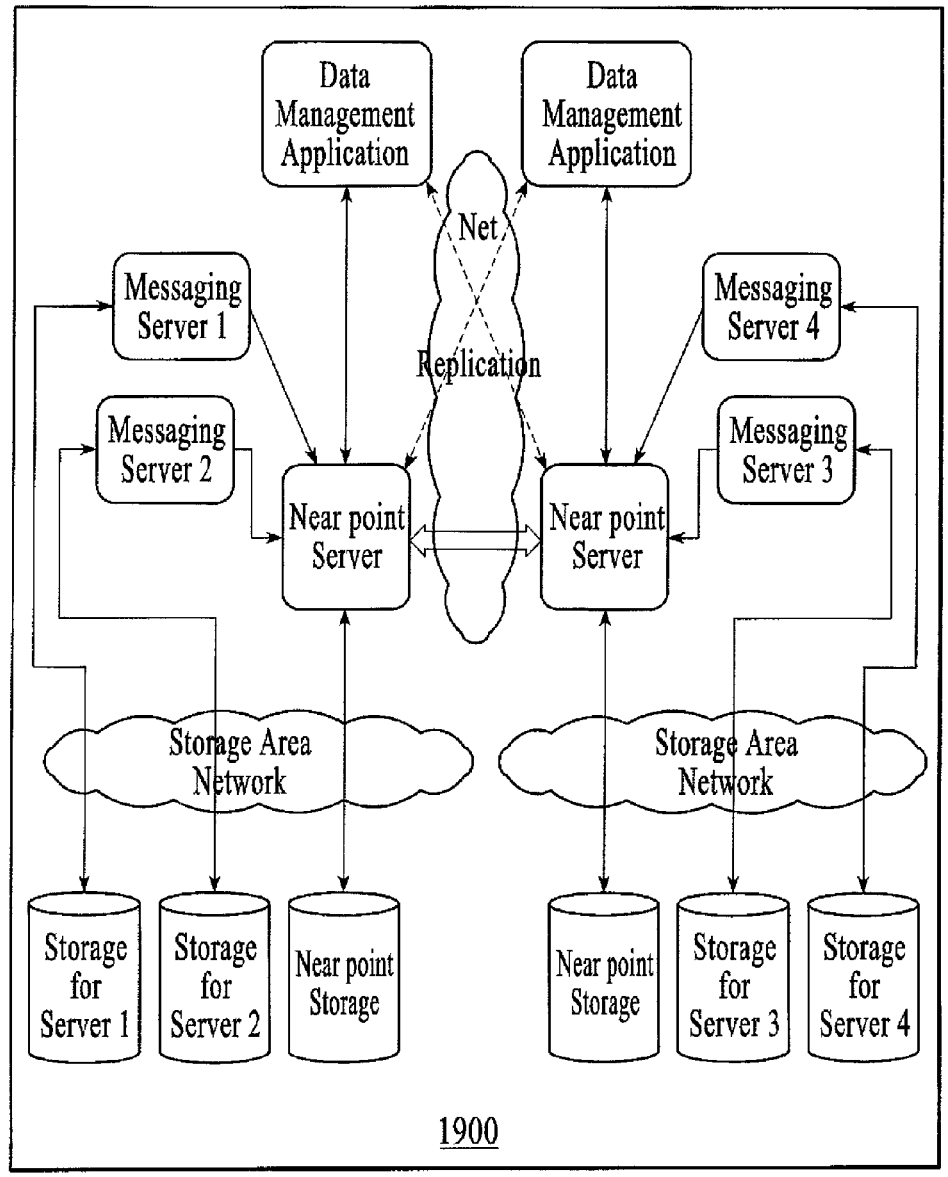
FIG. 19 is a system that includes remote data surrogation, under an embodiment.

A complementary method of replicating the embodiment of data surrogation places the targets of the replication in a remote location, connected through a metropolitan area network (MAN), a wide area network (WAN), or other type of network. The transports may range from T1 to ATM or SONET. The protocols may include TCP/IP and FCIP. FIG. 19 is a system 1900 that includes remote data surrogation, under an embodiment.

In the previous diagram the Storage Area Networks are optional and the exact number of messaging servers depends on customer need and proper capacity planning.

Other variations in implementations of near line servers are possible. They may be constructed out of real systems or virtual systems using software such as VMWare or Virtual Server or others. They may be centralized or distributed. One implementation of a near line server could leverage grid technology such as Globus.

Combine Log Shipping with Near Line Servers to Create a Data Surrogate:

The previous section described the underlying platform, and the possible variations of the implementation of the near line server. This section focuses on various techniques that are implemented in the form of protocols and algorithms to accomplish data surrogation. The example description provided herein focuses on conventional computation systems that might use Windows server software and Intel-based hardware platforms; however other variations are possible, that might include alternate choices of hardware and software platforms, and the implementation of some, or any of the protocols and algorithms in firmware or hardware.

The combination of near line servers to log shipping generates a data surrogate. This data surrogate is application consistent and can be directly operated upon in the original format of the application. It is still single dimensional since it only supports the original application data format at this point, without adding any multi-dimensional views, described below, that would facilitate application use of the data surrogate. Note that the description of implementation of data surrogation using near line servers or log shipping is just an example since data surrogation may be implemented using a variety of other techniques.

Figure 20:
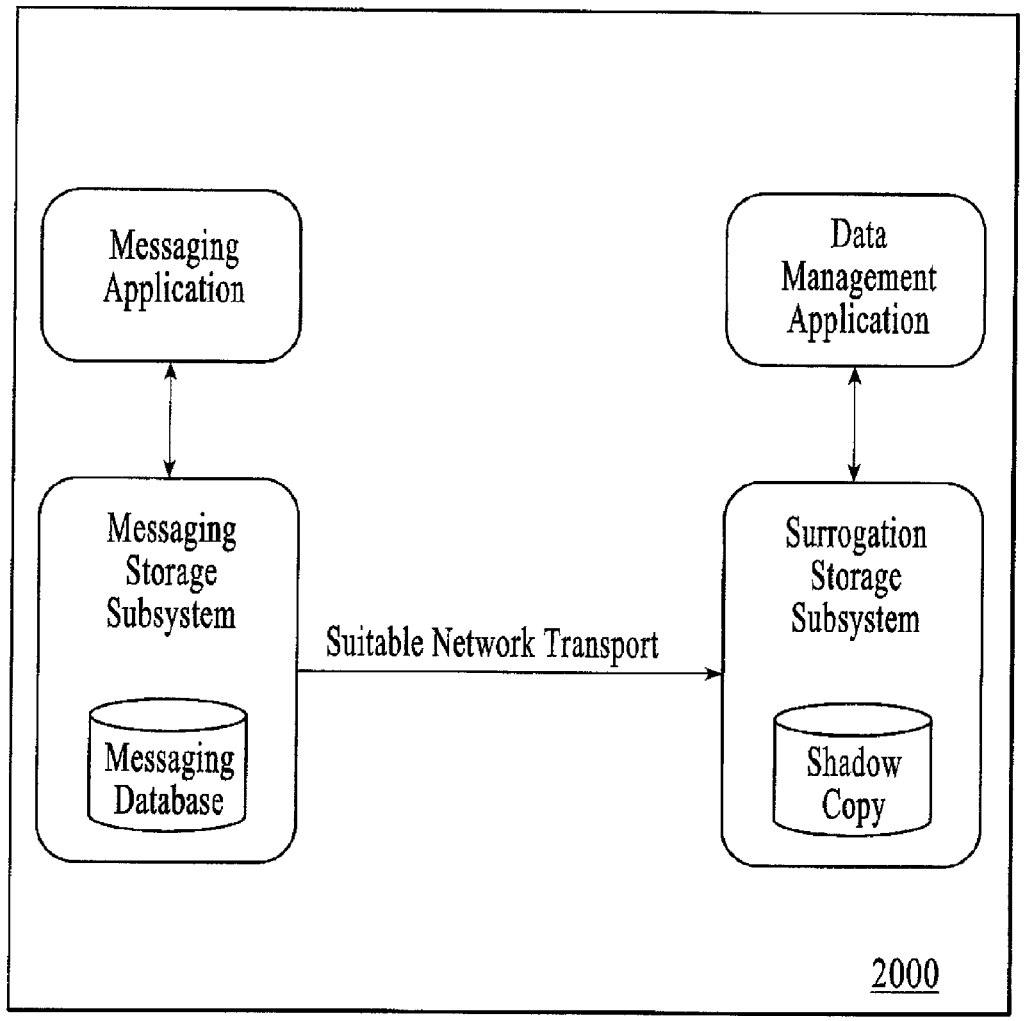
FIG. 20 is a system that includes a single-dimensional data surrogate, under an embodiment.

FIG. 20 is a system 2000 that includes a single-dimensional data surrogate, under an embodiment. While the example details a use with Microsoft Exchange server, uses can be extended to other messaging and collaboration servers through minor modifications. It is also applicable to the larger class of enterprise applications that have native formats that may be structured, semi-structured, or unstructured.

In the previous diagram, log shipping is utilized to create and maintain a shadow copy that is kept up-to-date based on some event or pre-defined schedule. Unlike some forms of traditional log shipping, the data management applications can operate concurrently on this shadow copy while it's being kept up-to-date. The suitable network transport in the diagram can be a LAN, SAN, MAN, WAN or other transport.

The remaining components of this diagram have been described previously in this document. Though this example shows a Messaging server, it is possible to provide equivalent services to multiple heterogeneous servers. Though this example shows a single near line server, it may in actuality be clustered, distributed, replicated, virtualized, and may straddle multiple machines or sites.

Figure 21:
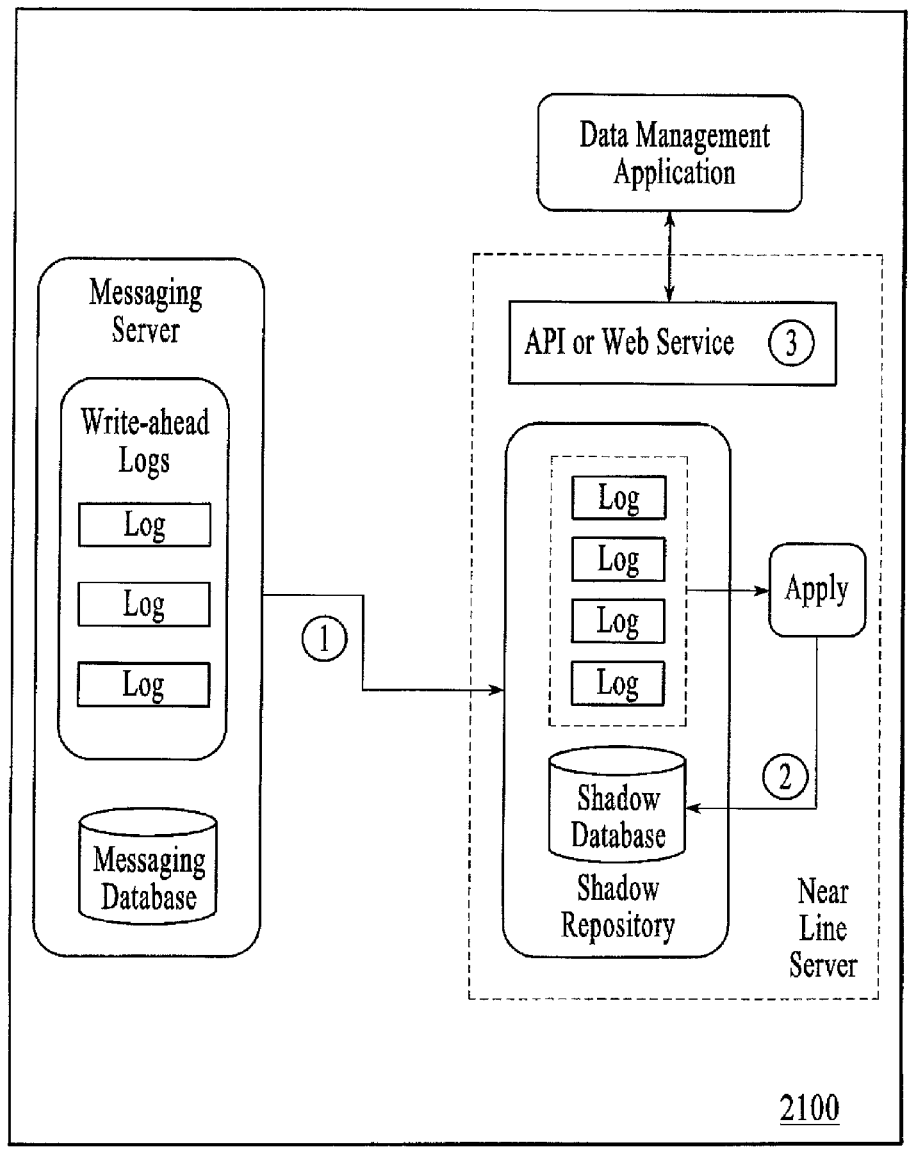
FIG. 21 is a system that includes messaging life-cycle management through one pass, under an embodiment.

FIG. 21 is a system 2100 that includes messaging life-cycle management through one pass, under an embodiment. The following diagram provides further insights into the creation of the data surrogate through log shipping to a near line server. The server on the left can be a messaging or collaboration server or some other enterprise server (e.g., Microsoft Exchange Server). It is generating write-ahead logs. The near line server on the right obtains a base line copy of the production messaging database. After that it is receiving logs and applying them to its copy of the database. The latest shadow database is available concurrently to a data management application.

In the previous diagram the following phases are described. Please note that this is an example; other variations are possible in order to accomplish similar objectives. Only one simple server is shown, whereas it is possible there may be more than one server, each of which may comprise of multiple systems and may be replicated, clustered, distributed, virtualized, part of a grid, or constituted in any other manner. Furthermore, it is possible that any number of homogenous or heterogeneous messaging servers (or other enterprise servers) may be managed in this manner by one or more near line servers in this manner.

The previous diagram shows the following phases:
1. Transfer of databases and logs: This could be a set of discrete events, it could be batched, or it could be continuous. If continuous it could be asynchronous or synchronous.

2. The application of the logs to the shadow database: This optional application could happen eagerly or lazily or in some other combination.
3. The optional concurrent availability of the shadow database to data management applications: This availability could be to the actual copy being operated upon or it could be to a replica.

The example and the implementation are oriented towards Microsoft Exchange Server. However the concepts and the implementation are easily extensible to provide equivalent capabilities to other messaging and collaboration servers and to any application that uses structured, semi-structured, or unstructured data.

In this example the log that has shipped over is immediately applied to the shadow database in order to bring it up-to-date. This reduces the near line window, or the lag between the change occurring on the messaging server and their becoming visible on the near line. Other alternatives exist that might include batching up these logs and making decisions on batching and lazy application, perhaps for performance optimization of the near line server. It is also possible to post-process the logs before they are applied in a manner that filters for relevance, or filters out undesirable content.

The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Extend Log Shipping to Work without Intrinsic Database Support:

The data surrogate maintenance mechanism can be further enhanced by the ability to implement log shipping for databases that do not intrinsically support this log shipping capability. Microsoft Exchange Server is an example of a system without this capability. Exchange leverages the Jet Blue database management system, which only supports single apply. This means that a set of logs can only be applied a single time to the target database. After that single application the target database reverts to a new state and is unable to accept any further log applications.

A data surrogate platform in an example embodiment can retro-fit log shipping capabilities onto Microsoft Exchange Server's underlying database management system. This can be accomplished by keeping the target database in an "open" state even after the first set of logs is applied. Therefore from the perspective of the target database management system, there is a single, endless log application process underway. The data surrogate is further able to provide concurrent access to data management applications while this continual log shipping process is underway. It is also possible to "complete" and return a fully functional database to an Exchange server if needed, without disrupting the continual log application process.

Figure 22:
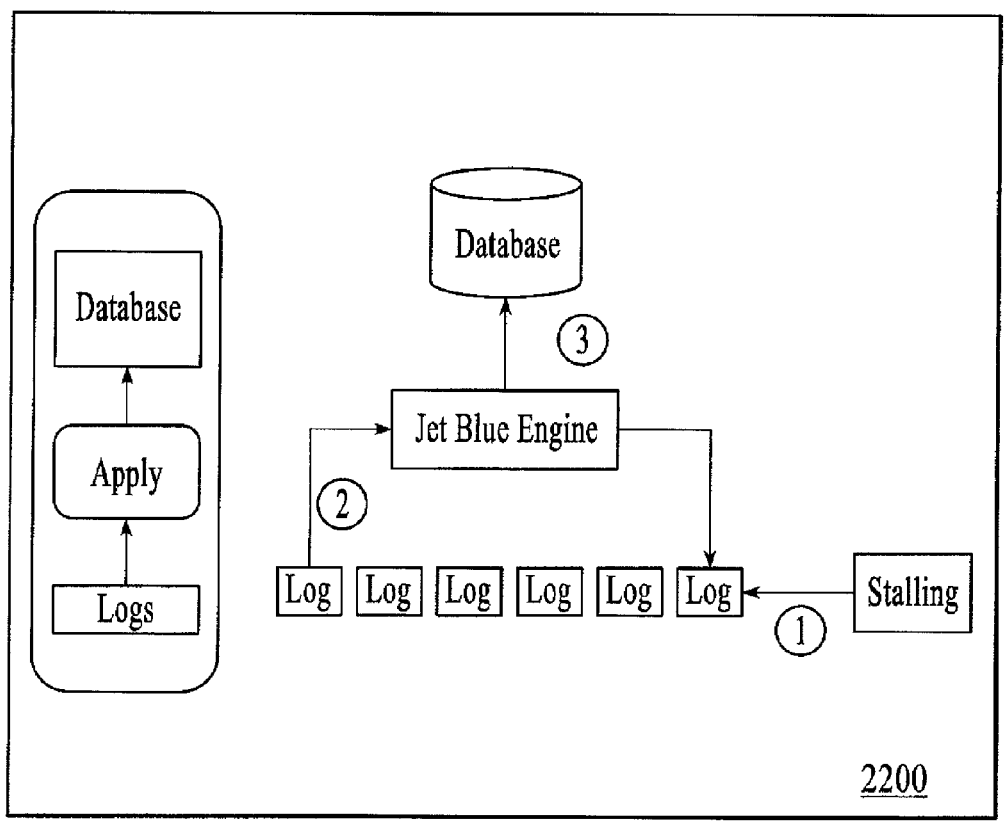
FIG. 22 is a system that includes a continuous log apply process, under an embodiment.

FIG. 22 is a system 2200 that includes a continuous log apply process, under an embodiment. Other techniques are possible. The left side is a logical view of the process. The logs are being shipped over to the near line server from a remote Exchange Server. The frequency of log shipping is pre-defined by a schedule. The Apply module is consuming the logs and applying them to the database to bring it up-to-date. The right hand side describes the Apply module and technique in more detail.

The previous diagram the following phases are described. Please note that this is an example; other variations are possible, in order to accomplish similar objectives. Only one system and one activity are shown. However in practice there may be multiple complex systems and several instances or variations of this activity may be occurring.

In the previous diagram three stages of the Apply process are described:
1. Introduce new Log Set and modify the most recent log in a manner to stall the log application. There may several possible mechanisms for stalling the log application. This example introduces an exception that occurs during access to the modified log file, which is caught and post-processed by the application process.
2. Direct the Jet Blue Engine to resume applying logs from the most recent log application cycle. The Jet Blue Engine may be running as part of a larger aggregate system, or it may be running on its own, or it may only have essential components reconstituted so that the effect of the Jet Blue Engine log application is achieved. In addition it may be possible to have a replacement system that might replicate the necessary capabilities of the Jet Blue Engine in order to accomplish the application process.
3. Jet Blue applies the logs to the database until it gets to the modified log, thus freezing the Jet Blue Engine. At this point the process is ready for a subsequent set of logs and a consequent log application cycle.

The process described above can be resumed and replayed every time a new set of logs is received from Exchange.

This technique is described in relationship to Microsoft Exchange. It can be applicable to other Messaging and Collaboration servers. It can also be extensible to generic applications that may be using structured, semi-structured, or unstructured data.

The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Extending Log Shipping to Dynamic Log Shipping:

Dynamic log shipping implements a further enhancement of log shipping to improve the Recovery Point Objective (RPO). In the previous description a conventional log shipping mechanism was utilized, but suitably modified for cases where log shipping is not supported. However the frequency of log shipping was pre-defined by a schedule.

In one embodiment the data surrogate may get a notification whenever a new log file is filled up in the enterprise Exchange server. It then orchestrates the transfer of this file to the near line server for subsequent application. The RPO is optimized because in case of a catastrophic failure in Exchange that results in all logs being lost on the production server, the window of data loss is bracketed by the content of a single or partial log file.

Figure 23:
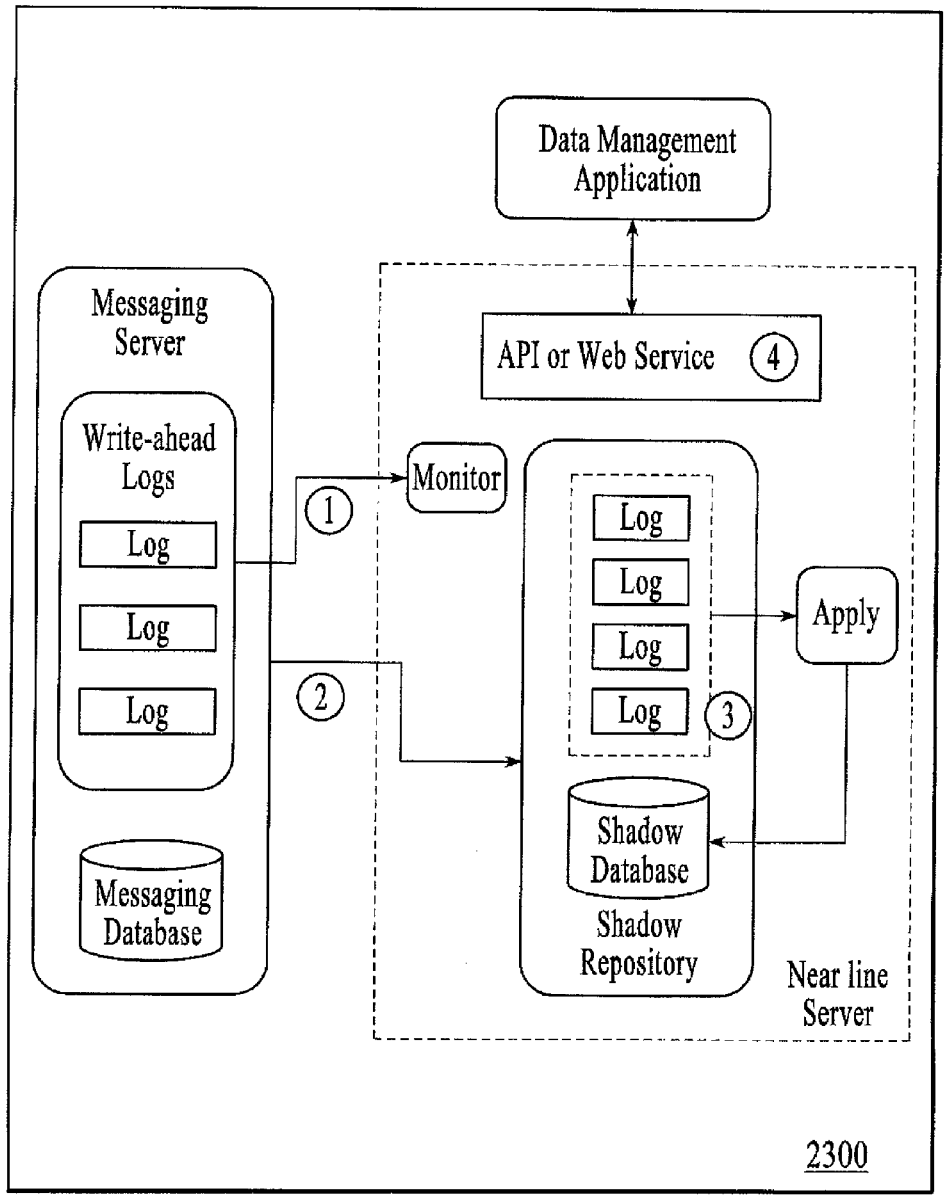
FIG. 23 is a system that includes dynamic log shipping, under an embodiment.

FIG. 23 is a system 2300 that includes dynamic log shipping, under an embodiment. Please note that this is an example; other variations are possible in order to accomplish similar objectives.
1. Change Notification: a monitor gets the change notification and initiates the next step. This may be accomplished in a manual manner through user intervention or more likely through automatic notification. This automatic notification may be event driven or it may be scheduled and batched in some manner.
2. Transfer of databases and logs: This transfer is optional in situations where the data surrogation mechanism may be co-resident on the production server, hence have direct access to the database and logs. This optional transfer may occur over some form of network or equivalent mechanism.

3. The application of the logs to the shadow database: This optional process may occur lazily or eagerly or in some batched combination.

4. The concurrent availability of the shadow database to data management applications: This availability may be to the actual data that is being modified by the process, or it may be to a copy of that data, or it may be some combination thereof. This may be available in the form of an API or web service or equivalent.

In this example the log that has shipped over is immediately applied to the shadow database in order to bring it up-to-date. This lowers the near line window since changes that occur on the messaging server become more immediately visible on the near line. Other alternatives exist that might include batching up these logs and making decisions on batching and lazy application, perhaps for performance optimization of the near line server. It is also possible to post-process the logs before they are applied in a manner that filters for relevance, or filters out undesirable content.

The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Figure 24:
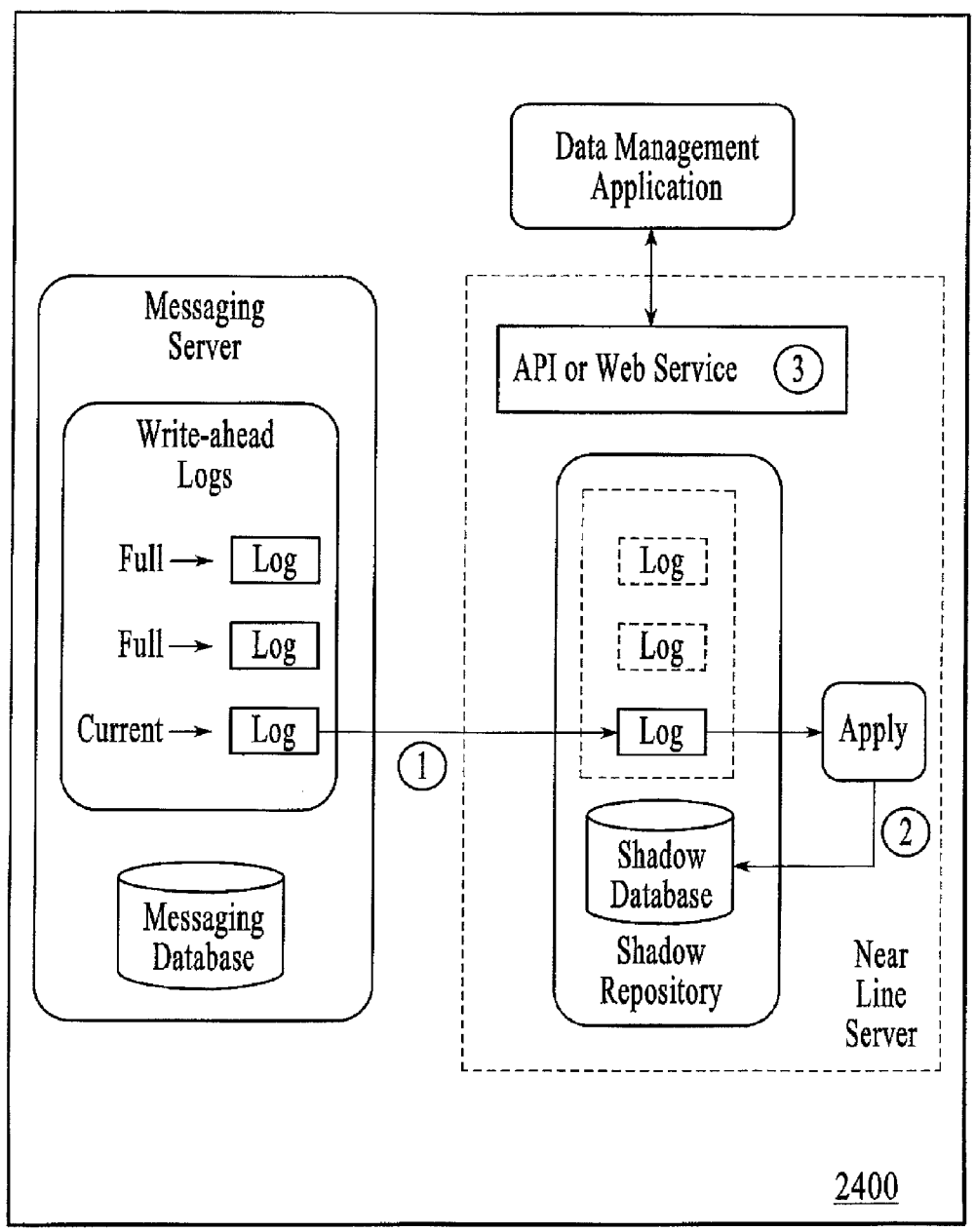
FIG. 24 is a system that includes log tailing, under an embodiment.

Extending Log Shipping to Log Tailing:

Dynamic log shipping brings down the RPO to the contents of a single log file, or less. Log Tailing may also be used to bring the RPO down further since the logs are being continually captured as they are written on the enterprise messaging server and then shipped over and applied on the near line server. FIG. 24 is a system 2400 that includes log tailing, under an embodiment. The modifications that are occurring to the current transaction log are being immediately captured and shipped over to the near line server for application. This could improve the maintenance of the data surrogate from near real-time to real-time. In this example the logs are propagated and applied asynchronously. Other alternatives are possible, such as synchronous application. In addition, rather than apply changes immediately on the near line, it is possible to batch and apply lazily.

In the previous diagram the following phases are described. Please note that this is an example; other variations are possible in order to accomplish similar objectives.

1. As individual transactions are being written to the write-ahead logs in the production server on the left, they may be captured and transferred over to the near line server on the right and optionally reconstituted 2. The Apply process may be either running on schedule, may be event driven, or may be running continuously, optionally applying the transactions or the re-constituted logs to the shadow database to bring it up-to-date 3. The Data Management Applications may be concurrently able to get access to a recent copy of the shadow data The remaining components of this diagram have been described previously in this document. Though this example shows a Messaging server, it is possible to provide equivalent services to multiple homogeneous or heterogeneous servers. Though this embodiment shows a single near line server as an example of a data surrogate, it may in actuality be clustered, distributed, replicated, virtualized, and may straddle multiple machines or sites.

Implementing Log Transfers with a Server-Based Agent:

Log shipping and its family of optimizations, that include dynamic log shipping and log tailing, can be implemented without an agent installed on the messaging server. End users view this very favorably since additional software on enterprise servers that originates from multiple vendors has a propensity to degrade performance, functionality or availability. Furthermore, installing agents on production servers can also impact the platform qualification and certification, and support/warranty from the system vendor, and may require additional qualification. However the alternative of an agent resident on the target server provides enhanced product capabilities. These enhanced capabilities include more proactive notification (since the agent is local) and better efficiency (since the agent can actively participate as the originating end point it can make intelligent decisions about the relevance of the data from a data management perspective and the optimal timing of the information to be shipped over.)

Dehydrate the Dense Application Data to Create Multi-Dimensional Surrogate Views (Extending the Data Presentation Format Dimension):

The following example describes an extract mechanism that transforms data in the dense application format of the originating application, into an alternate format that is more amenable to data management and consumption by Data Management Applications. Though only one transformation is shown, it is possible to have any number of concurrent and/or serialized transformations to meet the requirements of multiple data management applications. During the extraction process it is optionally possible for a Data Management Application to set extraction rules. Optionally these rules may be "self learning" based on their rule base, the input data set, and the resident data in the indexed object repository.

In the previous diagram the following phases are described. Please note that this is an example; other variations are possible in order to accomplish similar objectives.

Note that though the previous example describes a single machine that hosts both the Shadow Repository and the Indexed Object Repository, other configurations are possible. For example, it is possible to have these two repositories be distinct, but federated together for the purposes of the API or Web Service for serving applications that get the same view as if the two repositories were unified.

Figure 25:
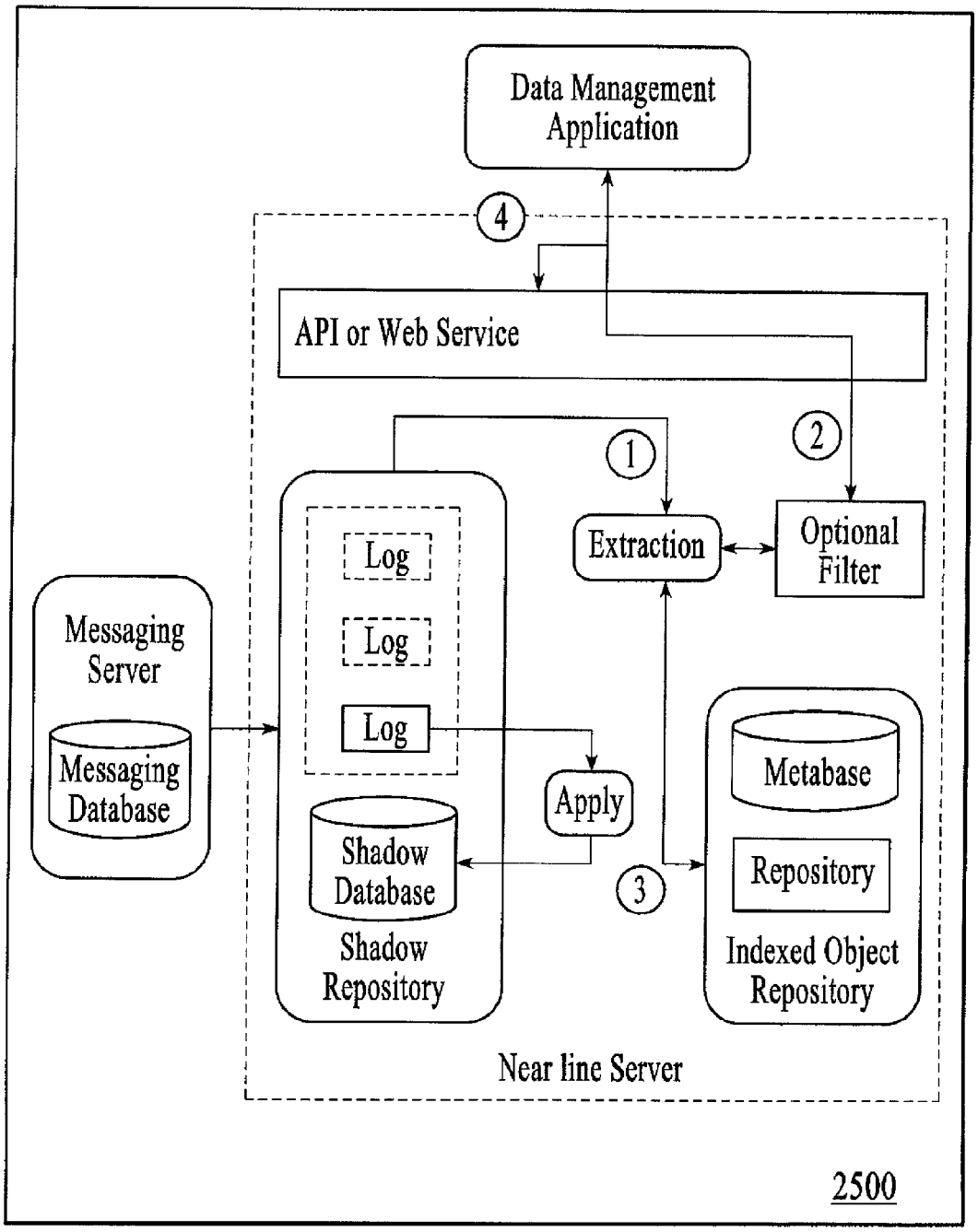
FIG. 25 is a system that includes multi-dimensional data presentation formats, under an embodiment.

FIG. 25 is a system 2500 that includes multi-dimensional data presentation formats, under an embodiment. Other alternatives and variations exist for accomplishing the same objective.

1. Extraction module from Shadow Repository: This module and/or process is either schedule driven, event driven or continuous. It has knowledge of the dense application data format of the data in the Shadow Repository. It extracts a copy of the data from the Shadow Repository and transforms it into one, or more, alternate formats in the Indexed Object Repository. During the extraction this process has knowledge of existing data in the Indexed Object Repository, and is able to make a number of optimizations that include duplicate elimination, efficient placement and higher-speed extraction. These are described as "Single Instance Optimization" and "Delta Change Detection Optimization" later in this document. A range of other optimizations are possible for the extraction module.

2. Optional Filtering: This may be equivalent to a rule-based engine that is implemented by the vendor, and is optionally programmable by the Data Management Application through the API or Web Service. In addition it may learn and optimize during operation. This is providing rules, guidance or hints to the Extract process so that it is able to further optimize its operation, or selectively filter the results in a manner that increase the efficiency of the near line server, or improve the relevance and speed of access to data by the Data Management Application. This component is optional; other implementations that are localized to the near line, or remote, or distributed, are possible. Multiple such optimization mechanisms may exist, serially or concurrently. This optional mechanism may either occur "in band" during Extract; or it may occur in batch mode after the Extract has placed the data.

3. Update of Indexed Object Repository: The Extract process is placing the relevant data in the Indexed Object Repository. This is in one, or more, formats as applicable to the subsequent Data Management. In this example, the repository is separated into data and metadata, though it is possible to combine both. The data resides in a file system and the metadata resides in a relational database. However it is possible to co-locate either in either the file system, or in the relational database. While the data is logically described to be hosted on the near line, it may be accessible to other servers, perhaps over a SAN or other type of network, or may be distributed across multiple near line servers.

4. Flexible Data Management Application Access: These are one, or more, Data Management Applications that are able to use the API or Web Service to concurrently operate on the data in either the Shadow Repository or in the Indexed Object Repository, or both. Optionally they may be able to use the API or Web Service to make certain selections of transformations, formats, placements, or post-processing.

The remaining components of this diagram have been described previously in this document. Though this example shows a Messaging server, it is possible to provide equivalent services to multiple heterogeneous servers. Though this example shows a single near line server, it may in actuality be clustered, distributed, replicated, virtualized, and may straddle multiple machines or sites.

Leverage the Multi-Dimensional Surrogation to Create Views Across Servers:

A production server stores its own production data. The enterprise may deploy multiple production servers. These servers may be either local in the same data center or in multiple distinct data centers. It is usually advantageous for a Data Management Application to obtain an aggregate view of all this data across a selection of production servers. The following diagram shows how the data surrogation mechanism is extended across multiple server "dimension" to ease the Data Management Application's needs to have seamless access across this dimension (and to facilitate new Data Management Applications.)

Figure 26:
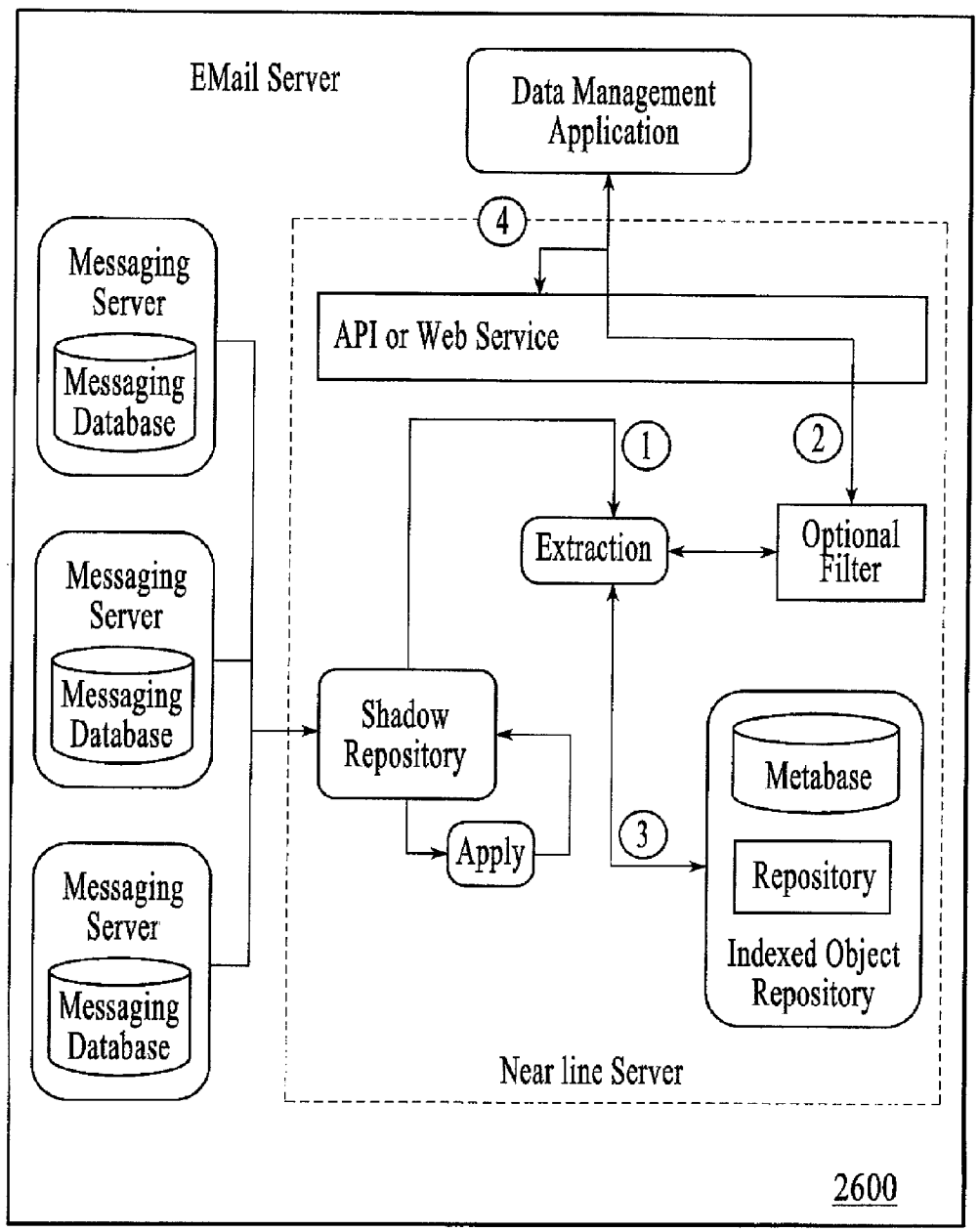
FIG. 26 is a system that includes multi-dimensional server aggregation, under an embodiment.

FIG. 26 is a system 2600 that includes multi-dimensional server aggregation, under an embodiment. Please note that this is an example; other variations are possible in order to accomplish similar objectives.

While the embodiment above includes three messaging servers, alternative embodiments may include any number of these servers, subject to adequate capacity planning. These may be other types of servers that operate on structured, semi-structured or unstructured data. Furthermore, these servers may be of multiple distinct types (in which case, each category of servers will feed into its own Shadow Repository, and multiple Extract processes will aggregate all this data into a possibly multi-format Indexed Object Repository, thereby optionally linking up the two dimensions of "multiple servers" and "multiple access formats".

The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Figure 27:
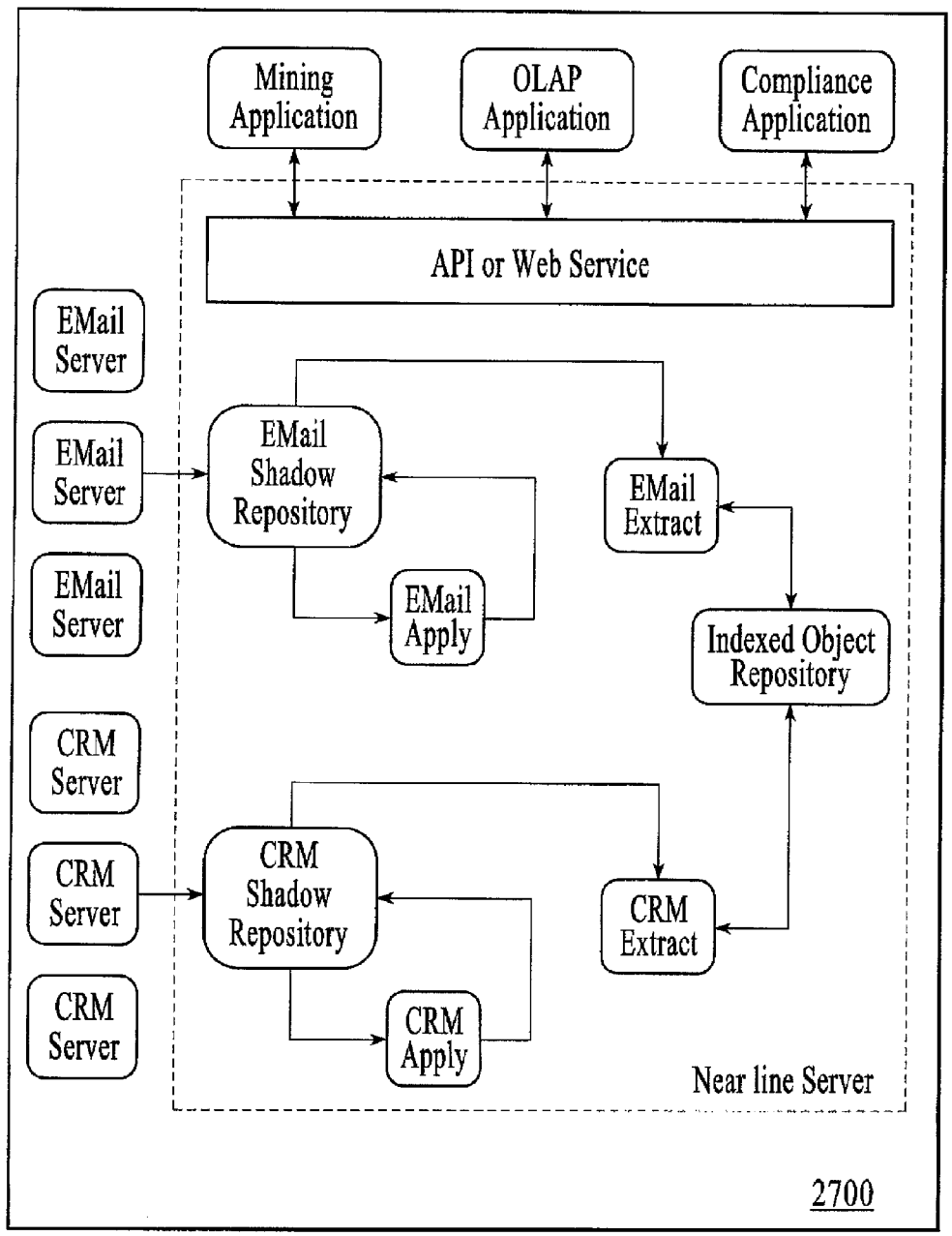
FIG. 27 is a system that integrates two types of production servers (e.g., email and CRM), under an embodiment.

FIG. 27 is a system 2700 that integrates two types of production servers (e.g., email and CRM), under an embodiment. The presentation dimension has three formats in the Indexed Object Repository that are able to concurrently facilitate a Mining, an OLAP, and a Compliance application.

In the previous example, a Mining application is looking for patterns among customers and employees and their interrelationships, perhaps for security or quality of service assessment purposes. The OLAP application is addressing accounting. The Compliance application is validating that the customer and messaging data is being retained and disposed in the specified manner. All these applications may access the same data and metadata in the Indexed Object Repository. Or they may have available to them their own application-relevant data and/or metadata.

The remaining components of this diagram have been described previously in this document. Though this example shows a small number of servers, it is possible to provide equivalent services to multiple homogeneous or heterogeneous servers. Though this example shows a single near line server, it may in actuality be clustered, distributed, replicated, virtualized, and may straddle multiple machines or sites.

Figure 28:
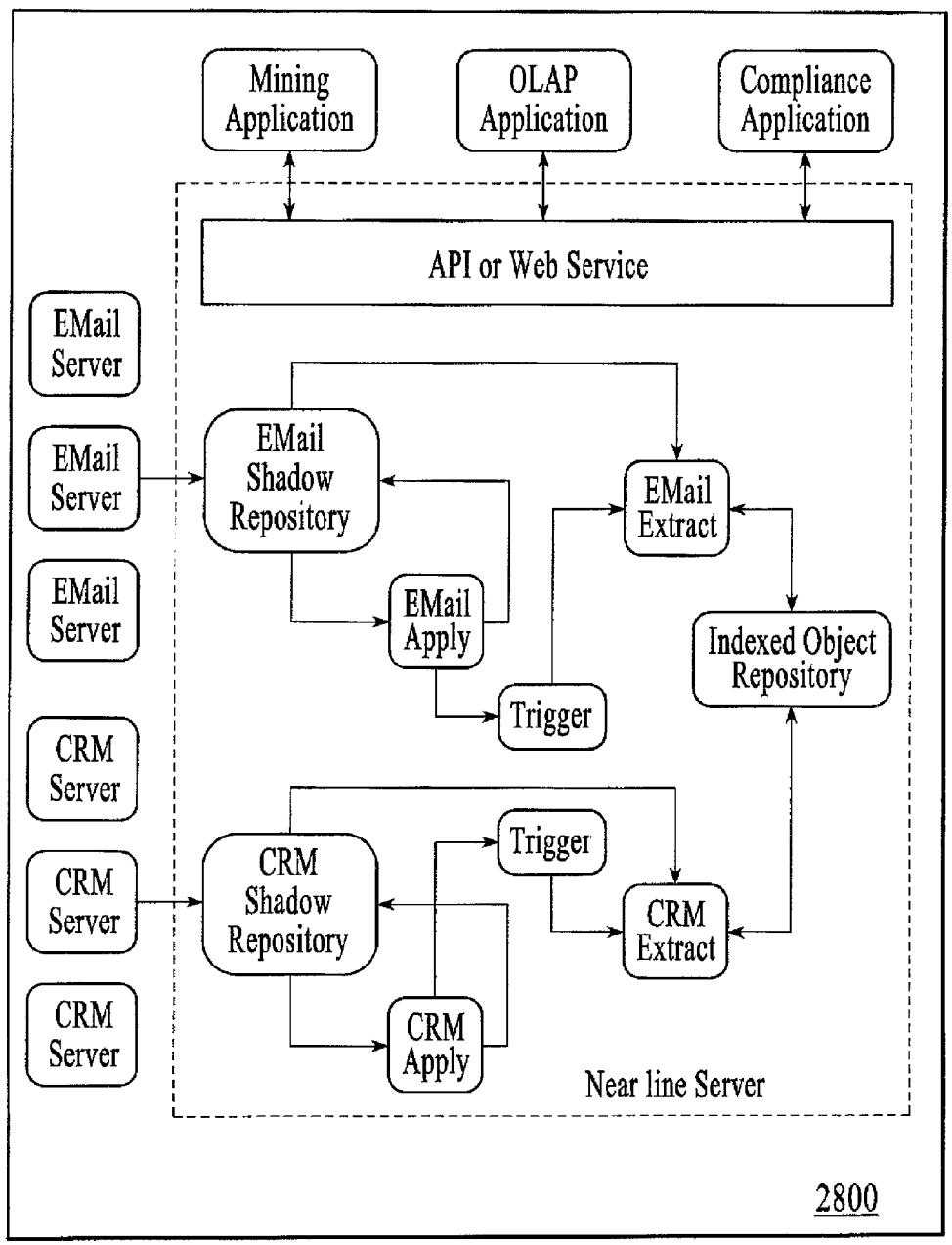
FIG. 28 is a system that integrates time, server, and presentation dimensions, under an embodiment.

Leverage the Multi-Dimensional Transformations to Create Views Across Time:

Production servers retain the most current copy of their production data in online storage. In some cases it may be possible for them to maintain a few additional copies of this data, perhaps using copy-on-write mechanisms. The Volume Shadow Copy Service available on some Microsoft Servers is an example of such a capability that will facilitate the server to maintain multiple historical copies. The number of such copies is limited. The amount of online storage also limits the amount of "copy-on-write stress" that it can take before it has to perhaps discard old copies. FIG. 28 is a system 2800 that integrates time, server, and presentation dimensions, under an embodiment. The system 2800 includes a near line server that uses the Apply and Extract mechanisms to capture multiple historical snapshots of production data and then store them in an efficient manner. Subsequent access of the Repository by Data Management Applications will facilitate a view across time. This "Time Dimension" can be arbitrarily combined with "Server Dimensions" and "Presentation Dimensions" that were described previously, so that an arbitrary set of points in time from an arbitrary number of production servers can be presented in an arbitrary number of formats to one or more, possibly concurrently operational Data Management Applications.

Please note that this is an example; other variations are possible in order to accomplish similar objectives. Though this example shows a small number of servers, it is possible to provide equivalent services to multiple heterogeneous servers. Though this example shows a single near line server, it may in actuality be clustered, distributed, replicated, virtualized, and may straddle multiple machines or sites.

In the previous embodiment there is a trigger that can be associated with any Extract process, which causes it to extract a copy out of the Shadow repository and overlay it efficiently in the Indexed Object Repository. These triggers may be independent or may work in concert with each other. These triggers may be either time driven or they may be event driven. If they are event driven they may be optionally signaled by the contents of the Shadow Repository, the Apply process, or even by the remote contents or health of the production servers. This last information may be obtained by an agent-based or agent-less mechanism that is not shown in the diagram. Other implementations, optimizations, alternatives or reductions are possible. The example shows a small number of Email and CRM servers, but arbitrary numbers of arbitrary types of servers are possible. Similarly, three categories of Data Management Applications are described, but an arbitrary combination is possible. The near line server is illustrated to be single and centralized. However multiple implementations of clustered, distributed, Grid or other combinations of near line servers are possible.

Figure 29:
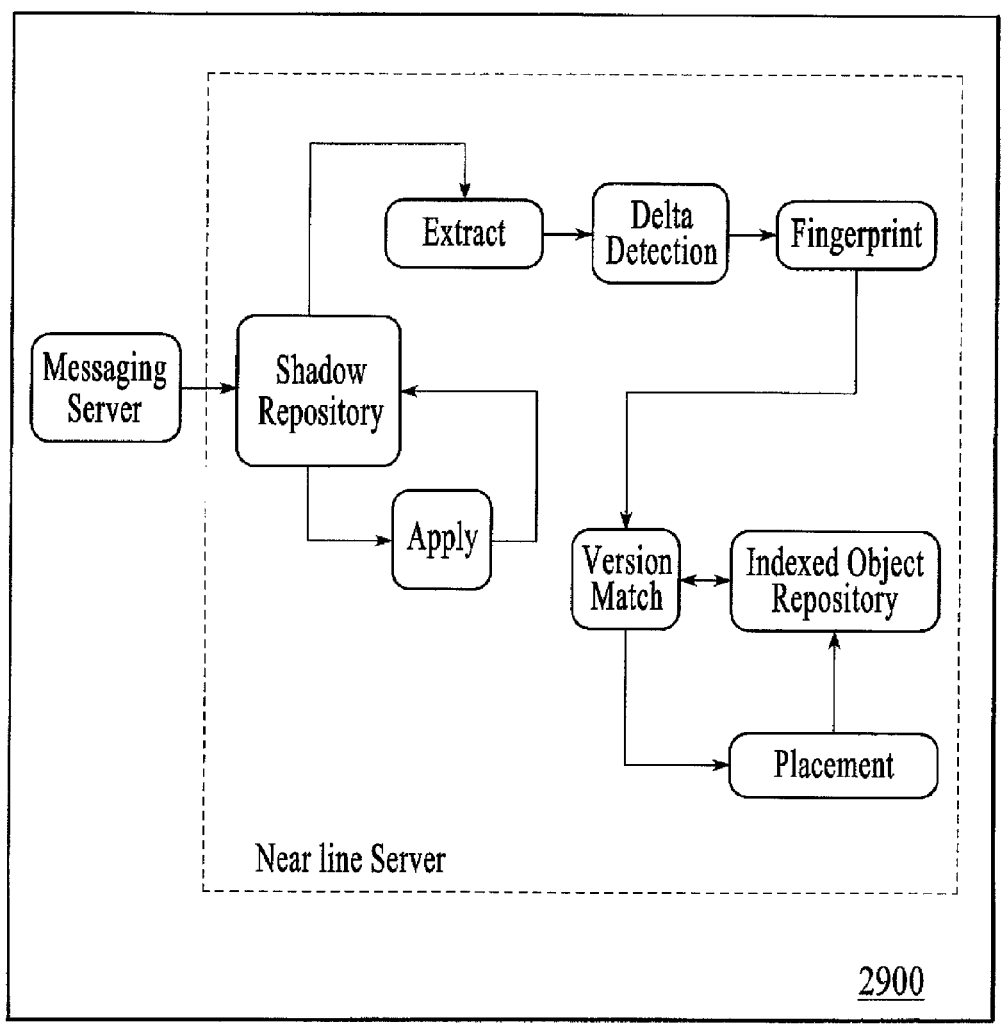
FIG. 29 is a system that integrates time, server, and presentation dimensions using storage optimizations, under an embodiment.

Optimize Storage of Multi-Dimensional Views by Single Instancing and Versioning:

The near line server can use lower-cost media such as Serial ATA or IDE drives. However when integrating multiple dimensions of servers, time and presentation into the Indexed Object Repository, the storage requirements may grow to a problematic size. The example of data surrogation can implement storage optimizations that leverage single instancing and versioning that leverage certain trends in enterprise data, in order to limit duplications and excess storage on the near line server. The various trends being leveraged are that (a) identical copies of data may concurrently be at rest at multiple locations of a server, or on multiple servers, and (b) an item may be a variation of another item on the same, or a different, server. FIG. 29 is a system 2900 that integrates time, server, and presentation dimensions using storage optimizations, under an embodiment. Other optimizations are possible, some of which may be specific to the class of enterprise production servers.

The previous diagram is an example of one method of storage optimization on the near line server through single instancing and versioning. To accomplish this, Extract is extended with a mechanism that generates a suitably unique fingerprint of the item being extracted. It may then leverage another mechanism that determines if this item has the same fingerprint of an existing item, or is a variation of an existing item in the Indexed Object Repository. If there is a hit then the Placement mechanism may either increment a reference count if there is an exact match, or it may compute and store just the delta of the new item with reference to the existing item in the Indexed Object Repository, or it may perform some combination or alternative. The new item can be stored separately as a whole, if the end user wishes this. Multiple alternative implementations are possible. For example, while this diagram shows this optimization to be occurring "in band" during the operation of the Extract module, it is also possible to have an offline batch process implementing this functionality "out of band". Other enhancements, alternatives, and reductions are possible. Though the diagram describes a single messaging server, an arbitrary number of homogeneous or heterogeneous enterprise servers can have this optimization applied to them during Extract. This storage optimization can be integrated with all the previous dimensions of data surrogation that are described in this document. The near line server itself may be singular, clustered, distributed, or part of a grid.

The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Dynamically Extend the Multi-Dimensional Views Through Indexing:

As the data surrogation is acquiring data on several dimensions that may include time and space (multiple points in time for multiple servers) it may have the ability to perform operations on this data that may include co-relation, classification, full-text indexing, adding digital signatures, and other operations. This would result in metadata that may be stored as part of the data surrogate and may optionally be made available to the eventual consumer. In addition this metadata may be optionally leveraged for achieving efficiencies in operation and storage that might include decisions about placement and eliminating redundancies, and decisions about what to store and what to discard, and decisions about frequencies of extraction and processing of incoming data, decisions on how to configure these operations for enterprise servers based on their observed data generation patterns, for search, for detecting tampering of data, and other optimizations. This may result in new data dimensions that are optionally used by the system and optionally made available to the consumer.

Figure 30:
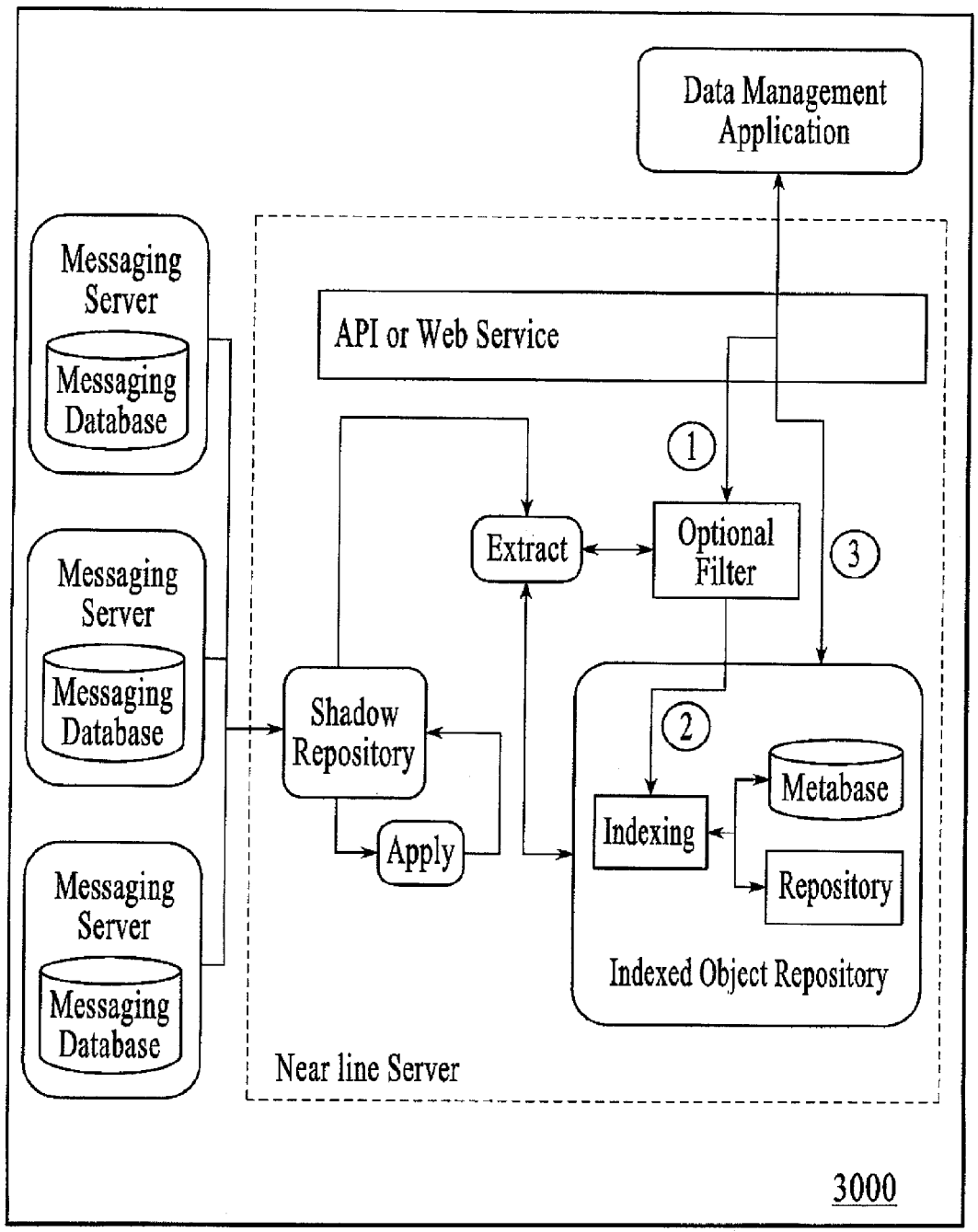
FIG. 30 is a system that includes multi-dimensional server aggregation, under an embodiment.

FIG. 30 is a system 3000 that includes multi-dimensional server aggregation, under an embodiment. Please note that this is an example; other variations are possible in order to accomplish similar objectives. In the previous example diagram the following three components are described:

1. Optional Filter: This is an optional mechanism that provides Data Management Applications with the API (or Web Service) capability for tuning or parameterizing the Extract Process.
2. Optional Indexing: This is an optional mechanism that operates on the data and metadata in the Indexed Object Repository looking for patterns and relationships. When it finds relevant information it enhances the metadata with this new information. Optionally it may be guided by a Data Management Application through the Filter.
3. Optional Data Management Access: This is an optional avenue for Data Management Applications to have API (or Web Service) access to the aggregate data as it is being semantically indexed. Optionally the Data Management Application could get proactive notifications and callbacks when relevant additional data or metadata has been added to the Indexed Object Repository. Optionally, the data surrogate can get actively involved in influencing, guiding, participating in, or extending the function of the production servers. These applications can become active or passive participants in the production server workflow through positive or negative feedback loops and augmentation of the production server function to solve existing pain points or improve productivity through value additions.

This example describes a simple configuration with three messaging servers and a simple near line server. Other deployment variations are possible, including a variable number of homogeneous or heterogeneous production servers, and a complex near line server that may be clustered, distributed, part of a grid, or virtualized.

The remaining components of this diagram have been described previously in this document. Though this example shows three Messaging servers, it is possible to provide equivalent services to multiple, arbitrary homogeneous heterogeneous servers. Though this example shows a single near line server, it may in actuality be clustered, distributed, replicated, virtualized, and may straddle multiple machines or sites.

Integrate with Standard Enterprise Authentication, Authorization and Access Control for Facilitating Seamless Access to Surrogate Data for the End User:

The data surrogation mechanism can operate in a manner such that the original access control information can be captured and co-located with the data. In addition, the access layer provided by the API or Web Service can implement an authentication and authorization check that is integrated with the enterprise data center. In the case of Windows environments as an example, the authentication and authorization could involve integrations with the Windows Domain authentication and authorization. In the case of Microsoft Exchange Server as an example, the access control information stored in the Exchange Databases or in Active Directory, can be captured and co-located with the data.

Figure 31:
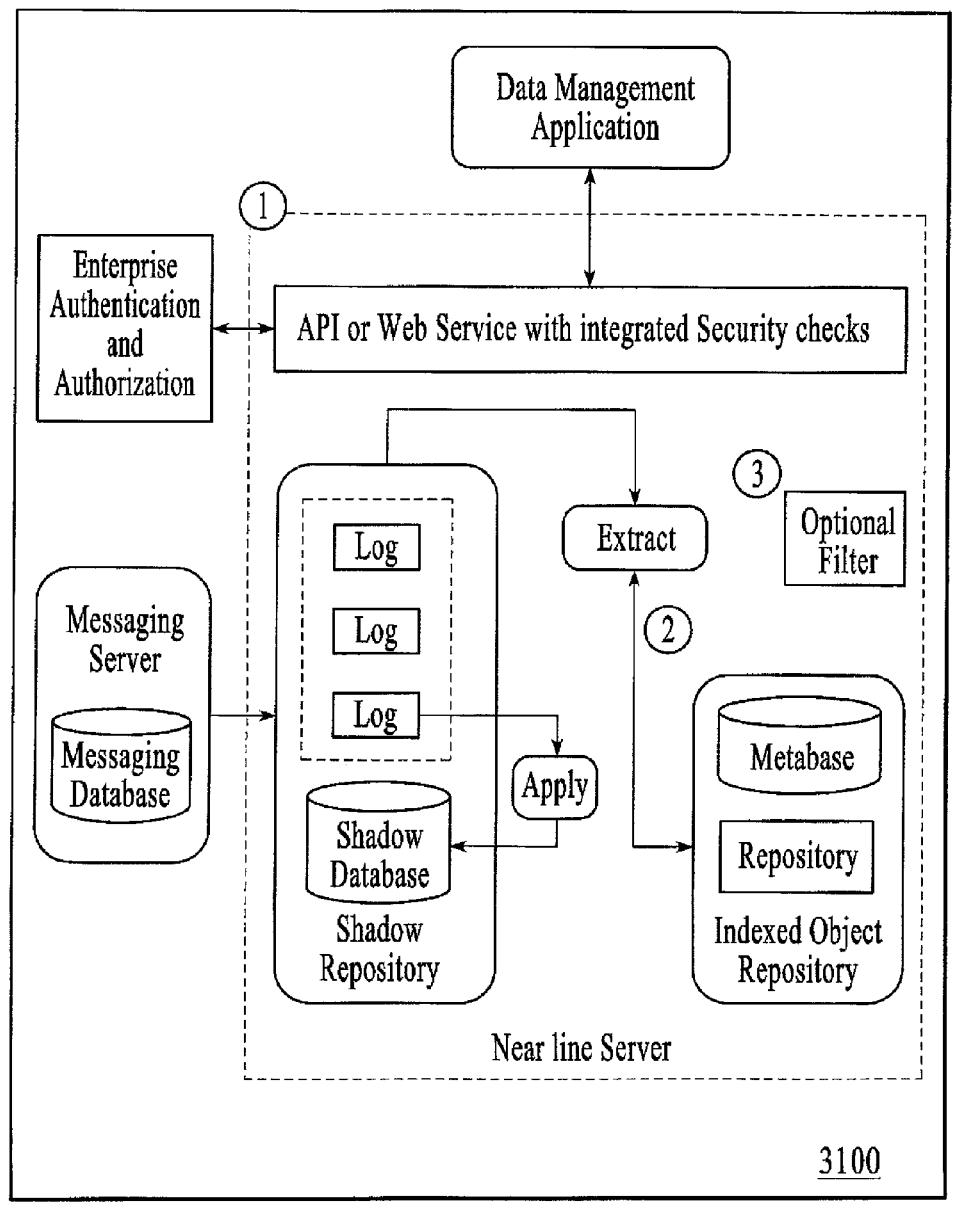
FIG. 31 is a system that integrates authentication, authorization, and audit, under an embodiment.

FIG. 31 is a system 3100 that integrates authentication, authorization, and audit, under an embodiment. This system 3100 includes an example of this integration with enterprise authentication and authorization, and with application access control. In this diagram the access control information is preserved across the Extract and populated in the Indexed Object Repository. The API or Web Services access layer is integrated with Windows authentication and authorization. Access to the dense application data generally involves checking that the credentials of the accessing user or application are equivalent to those of the administrator. In the case of Microsoft Exchange as an example, the credentials must match those of an Exchange Administrator in the Administrative Group of the EDB being accessed.

In the previous diagram the following phases are described. Please note that this is an example; other variations are possible in order to accomplish similar objectives.
1. The near line optionally communicates with the enterprise security subsystem to obtain and perhaps cache the latest security information
2. During Extract any relevant access control information is optionally extracted and co-located with the associated data in the Indexed Object Repository
3. During access the optional Filter checks for security credentials and authorization before making the requested data available for Data Management applications The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

In the previous diagram there is an example of how enhanced authentication, authorization, access control and non-repudiation can be layered over the basic integration with the enterprise. This involves layering an Optional Filter in the access path between the Data Management Application and the Indexed Object Repository. This layer can impose a higher level of roles, authorization, access control, and access logging. The access logging can even be extended to be an intrusion monitoring and detection system. This is just an example; other variations, enhancements, reductions and alternatives are possible.

The access control and authorization that is integrated into historical data and the enterprise can be configured to implement the access policies that were in effect when the data was created, or it can be configured to implement the policies that are in effect when the data is being accessed. Other variations, enhancements, and reductions are possible.

Provide Programmable Hierarchical Policy Management

The data surrogation can implement a CIM-based (or equivalent) hierarchical policy management mechanism that leverages Windows WMI on that platform. It can reflect the hierarchical assets and entities and the associated properties in this data surrogate-hosted object manager. This can be a natural way to capture and manage enterprise policies. This manageability hierarchy can also be exposed through the API or Web Service in order to facilitate after market programmable layers that implement specializations of policy that are specific to customer needs or optimized to the rules and guidelines of their federal enforcement organizations. In this manner the data surrogate can cope with incomplete or vague policy guidelines, since they can be specialized, or programmed in, after the near line system has been deployed.

Figure 32:
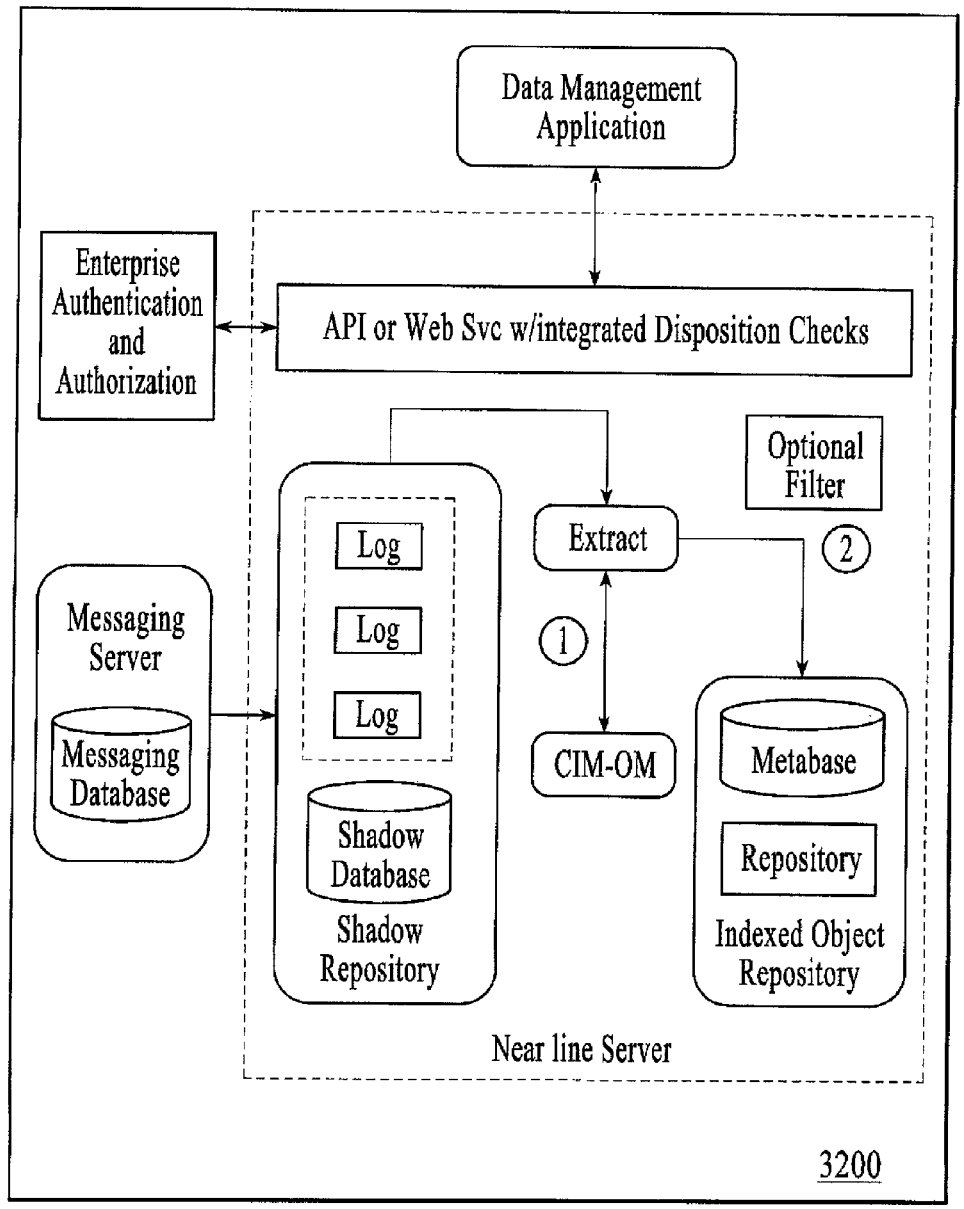
FIG. 32 is a system that includes programmable hierarchical policy management, under an embodiment.

FIG. 32 is a system 3200 that includes programmable hierarchical policy management, under an embodiment. In this diagram, the Extract process is driven by hierarchical policy that is stored in the CIM-OM. During Extract it is able to implement global folder exclusion policies. It is also able to implement specific user mailbox or folder exclusion policies. This is only an example, since this type of policy-based action occurs throughout the operation of data surrogation.

In the previous diagram the following phases are described. Please note that this is an example; other variations are possible in order to accomplish similar objectives.
1. The Policy determines what is captured: This policy is hierarchical and can be applied to assets at multiple grains (such as Organizations, Administrative Groups, Exchange Servers, Storage Groups, Mailbox Stores, Mailboxes, Folders, and Items, using Exchange as an example) or to entities at multiple grains (such as company, site, department, and individual, etc).
2. The Policy can filter out what is visible to the Data Management applications.

The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

In the previous diagram a single messaging server and a simple near line server are illustrated. This can be extended to multiple homogeneous or heterogeneous production servers and the near line server can be arbitrarily complex, clustered, distributed, part of a grid, or virtualized. In addition, it may have enhancements, alternatives, or reductions.

Figure 33:
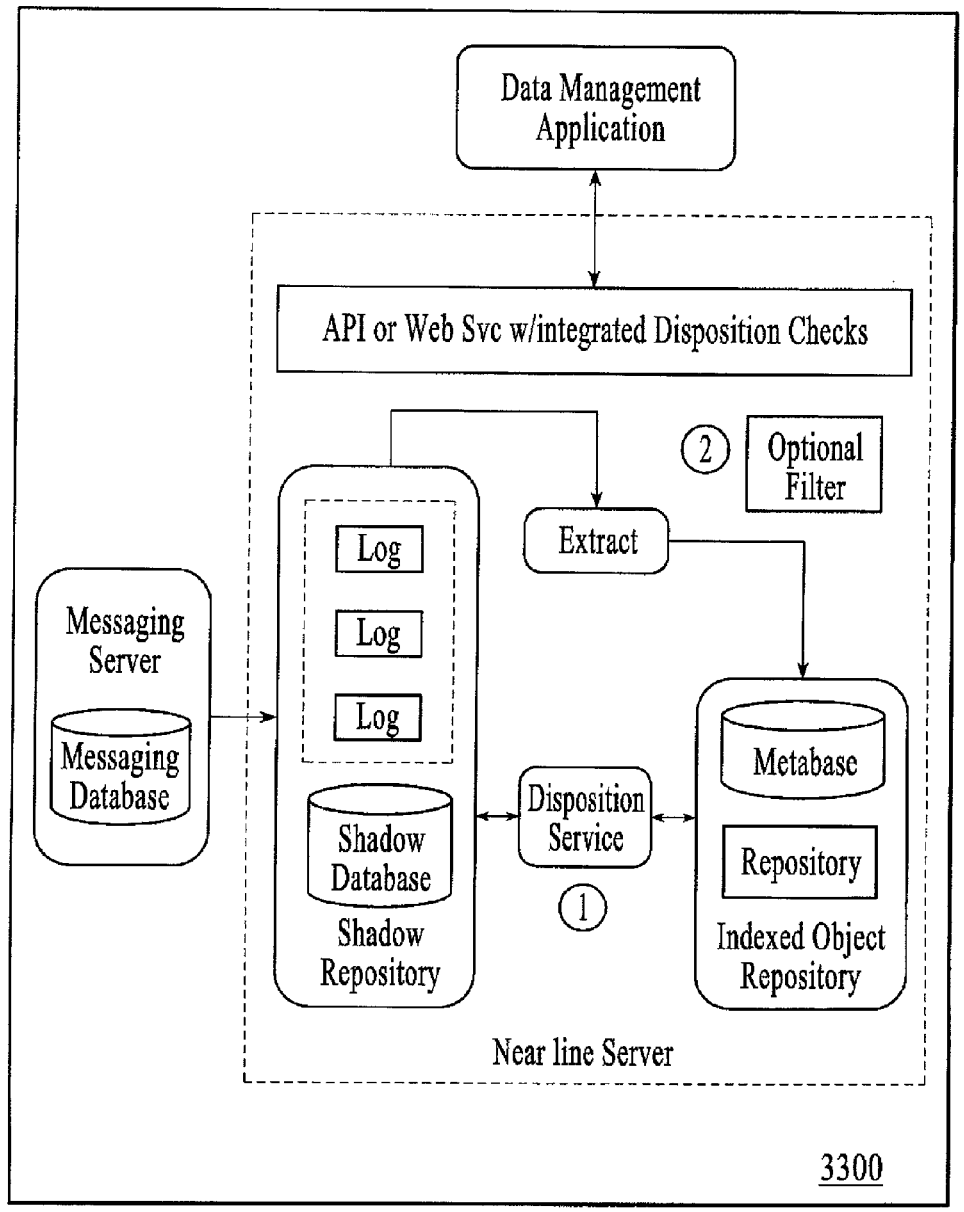
FIG. 33 is a system that includes guaranteed retention and disposition policy enforcement, under an embodiment.

Facilitate Guaranteed Retention and Disposition Policy Enforcement:

Due to the integrated and one-pass nature of the data surrogation, it is relatively easy to implement complex retention and disposition policies, and to subsequently enforce and monitor enforcement. This is because there is only one way in, one place to store, and one way out for the data. This is coupled with Administrative Non-repudiation, which is described elsewhere, that facilitates logging any changes in the retention and disposition policies. This is also coupled with tamper detection and tamper resistance, which is described elsewhere, which introduces additional safeguards against unauthorized retention or disposition of data that circumvents the policies. FIG. 33 is a system 3300 that includes guaranteed retention and disposition policy enforcement, under an embodiment. The system 3300 includes a service that runs periodically or continuously and keeps reaping the data in either the Shadow Repository or the Indexed Object Repository when it has become a candidate for disposition. In addition there is a secondary check in the Optional Filter that implements an optional check that the data being delivered has not expired.

In the previous diagram the following phases are described. Please note that this is an example; other variations are possible in order to accomplish similar objectives.
1. The optional Disposition Service works on schedule, or is event driven, or works continuously to look for data in all repositories on the near line in order to locate and dispose data that has exceeded its retention period.
2. The optional Filter mechanism is an adjunct, or a safety net, or a replacement, which validates that no data being made accessible to a Data Management application, has exceeded its specified retention period.

The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Integrate with Intrinsic RAID Server ILM Techniques:

Online storage systems may include functionality that partially overlaps with that being accomplished by the data surrogation. In this case it may be possible to integrate with and leverage and extend these capabilities. In such cases the online storage systems, which may include high-end RAID servers, may provide hints and cues and access to data. Alternately the data surrogation may infer these hints and cues and obtain access to that data of its own volition. This class of integrations may simplify some of the components of data surrogation that may include aspects of data movement and storage. It may be possible to seamlessly integrate the online storage with the near line storage and possibly with the offline storage in a manner that provides efficiencies of operation and simplicity of usage.

Implement or Integrate with Content Addressable Storage (CAS):

The data surrogation may intrinsically incorporate a CAS mechanism that facilitates the ability to insert any object and subsequently access it associatively by descriptor. This basic CAS mechanism may be further enhanced through storage optimizations such as single instancing or delta versioning, and security enhancements such as authentication, authorization, access control, privacy and non-repudiation. As an alternative to the incorporation of this intrinsic capability, it may also be possible for the data surrogation to leverage an external CAS capability through integration.

Implement "Application Clustering" for Near Line Resilience within Data Center:

It may be possible to implement portions of data surrogation by using clustering. For situations where the primary objective is surrogation it is possible that more efficient mechanisms may be available for achieving application clustering capabilities that may be lower cost and lower overhead. It is possible that this form of application clustering may obviate the need for traditional server clustering. However it is still the case that data is only available in the original format (without any of the multi-dimensional enhancements.) Furthermore, data corruptions on the primary copy could get propagated to the secondary copy.

Implement "Local or Remote Service Preservation":

An embodiment of data surrogation may have a recent application consistent copy of data and hence is able to restore service when there is a catastrophic server or site failure. If there is a server failure then those hosting the data surrogation can directly provide data access to a replacement server. Or it can impersonate a replacement server by directly providing a service to the failed over client applications. If there is a catastrophic site failure then the client applications can be failed-over to a replacement server (or directly to the data surrogation) that is located at the remote disaster recovery site.

Figure 34:
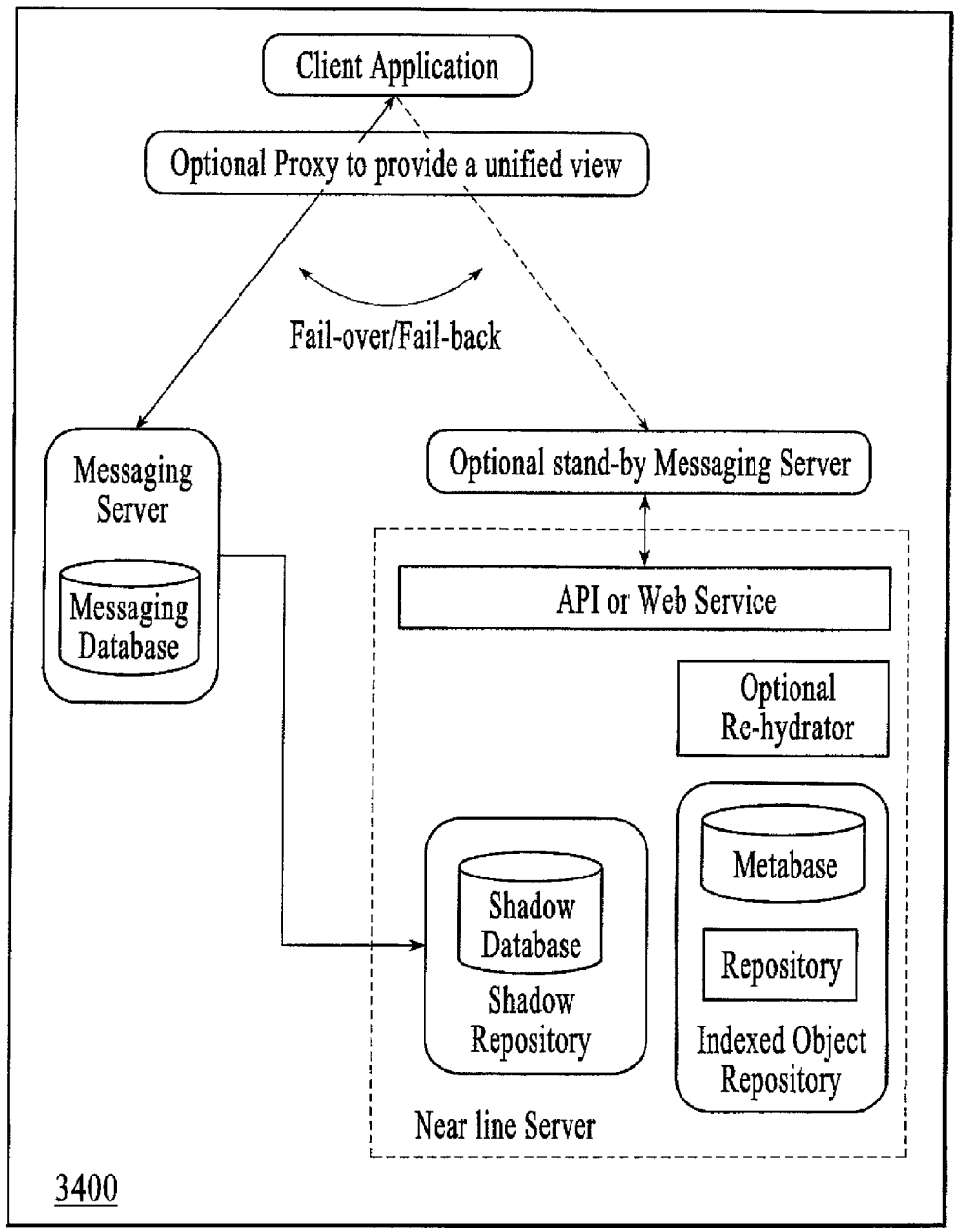
FIG. 34 is a system that includes local or remote service preservation, under an embodiment.

FIG. 34 is a system 3400 that includes local or remote service preservation, under an embodiment. In the following diagram the messaging server is used as an example of these fail-over/data restoration/service restoration/fail-back capabilities. It may be possible to provide equivalent capabilities to other types of enterprise servers. In this diagram the data surrogation detects (or is notified) that there has been a production failure. It may even proactively plan for such a failure. Upon failure, the data surrogation is able to materialize the most recent and usable copy of the application data. This can subsequently be copied over to a hot stand-by server that the client application can be failed over to. Optionally it is possible to directly serve the data to the stand-by server using a NAS or SAN data service protocol. The near line can also impersonate the stand-by server by directly serving the application protocol, which could include MAPI, IMAP4, or POP3 or others.

During failures it is possible for the data surrogation to also materialize a historical snapshot of the data through an optional re-hydrator module. This may be necessary in cases where the latest copy of the data may be infested by SPAM or viruses, or if it is not trusted for some reason. For audit purposes it is possible for the near line to simultaneously serve several snapshots in time to audit applications so that they can obtain a temporal or spatial view of the state of multiple production servers at multiple points in time. The snapshots in time can be served for any granularity of the data that matches specified pattern constituted with data and metadata. It can be possible to provide selective rollback and/or roll forward using sophisticated criteria for different portions of the data.

In the following example diagram the client and other enterprise components may be directly aware of the existence of the primary server(s) and the data surrogation as distinct entities. Other variations are possible, which may include the interposing of a proxy entity between the client and/or the other relevant enterprise components, so that they continue to get a single system view of the resource or service. This proxy aggregates one or more servers and one or more fail-over entities. When there is a failure the proxy is able to fail over the requests from the client and/or the enterprise to alternate resources. When the primary resources are restored then the proxy is able to fail the requests back to the primary resources. The proxy itself (and the enterprise servers and the data surrogate) may be clustered, replicated, virtualized, distributed, or part of a grid. It is possible for portions of the proxy to straddle the client, the enterprise servers, the data surrogate, other enterprise components, or some variation or combination.

Implement Application Geo-Clustering for Data Surrogation and Data Center Resilience Similar to the case of server clustering it is possible that for situations that require data surrogation it may be possible to implement variations of geo-clustering that may be more efficient through leverage of the data movement mechanisms that have been described in the previous sections. The effect is to create a distributed data surrogate that may be parsimonious in its use of storage and transfer bandwidth, possibly obviating the need to implement traditional geo-clustering in some situations.

Implement Non-Repudiation:

Non-repudiation has several aspects in the enterprise, which included "transmission non-repudiation", "administrative non-repudiation, modification non-repudiation, and "access non-repudiation". These are described below in the context of messaging servers being data surrogated on a near line server. However equivalents exist for other types of servers.

Transmission non-repudiation: The ability to prove that some entity was the originator of an item.

Administrative non-repudiation: The ability to prove that an administrator made some system or policy or other configuration change on the near line server.

Modification non-repudiation: The ability to prove that an item that was stored on the near line server has not been modified since then.

Access non-repudiation: The ability to prove that an entity accessed and viewed an item from the near line server through self-service.

Figure 35:
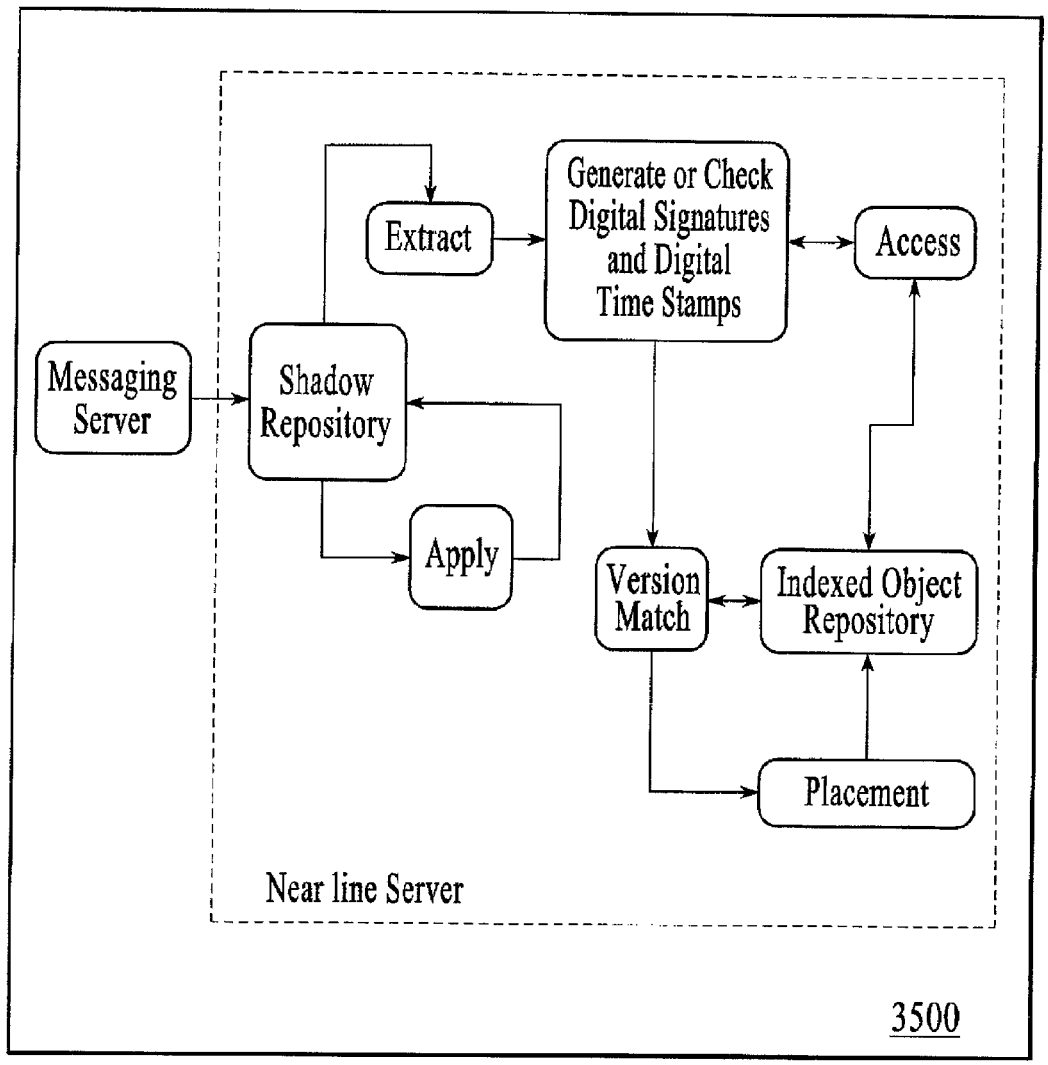
FIG. 35 is a system that includes non-repudiation on a near line server, under an embodiment.

FIG. 35 is a system 3500 that includes non-repudiation on a near line server, under an embodiment. This example relies on strong cryptographic techniques. Other cryptographic and non-cryptographic techniques are possible.

In this example the non-repudiation is introduced by enhancing the previously described fingerprinting mechanism to generate or check digital signatures and digital time stamps when the data is being inserted into the Indexed Object Repository. These signatures and time stamps are added to the metadata in the Indexed Object Repository. When the data is being accessed or modified, the digital signatures and time stamps resident in the Indexed Object Repository are cross-checked with the data in order to verify that these items have not been tampered with since they were received, in order to facilitate transmission non-repudiation and to implement modification non-repudiation.

The credentials of the accessing entity or applications can also be checked, and perhaps validated in the metadata of the Indexed Object Repository for checking authorization and for logging this access. Similarly when there is any administrative change that is initiated on the near line server, the digital credentials of the administrator can be checked and logged, perhaps along with a record of the changes, in order to implement administrative non-repudiation. A strong crypto scheme can rely on the existence of other security mechanisms such as trusted time servers and PKI. A variety of cryptographic and non-cryptographic mechanisms are possible for implementing equivalent functionality.

Figure 36:
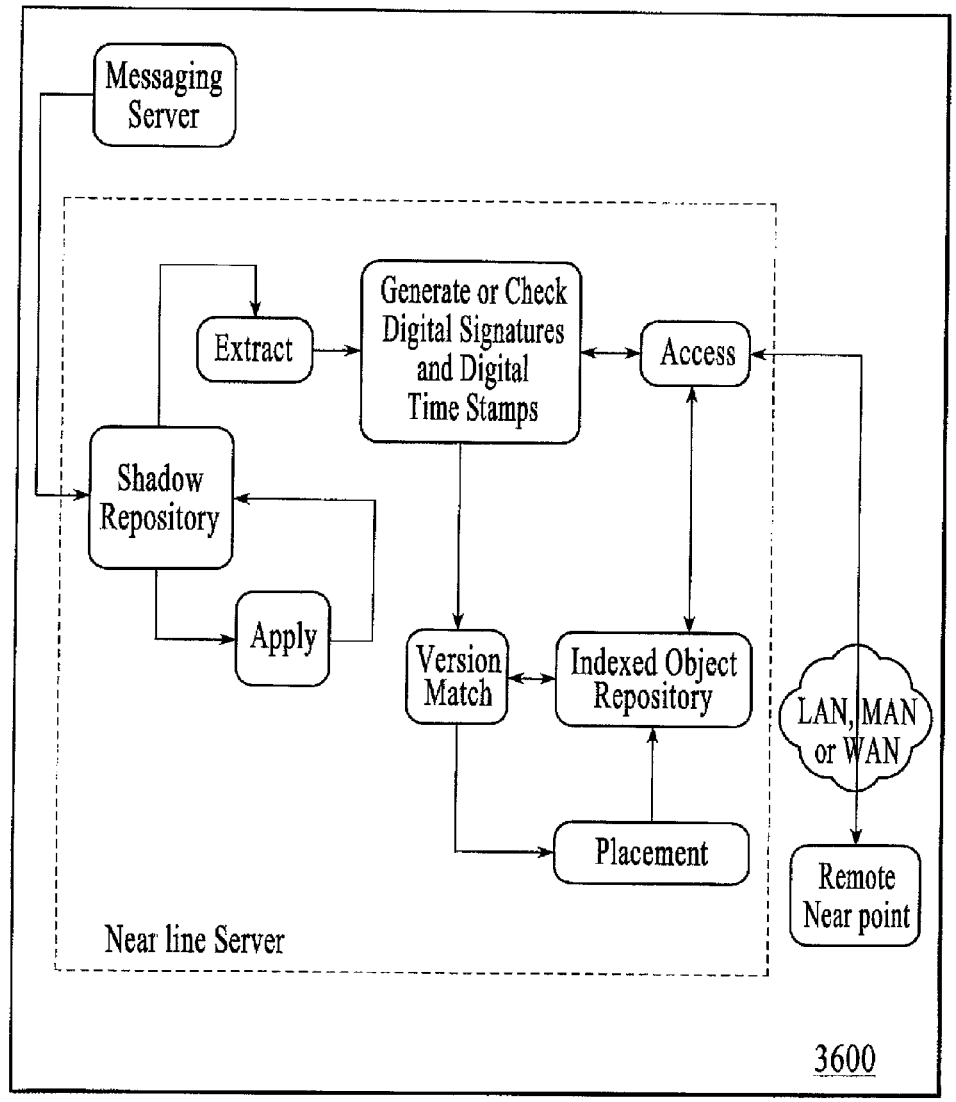
FIG. 36 is a system that includes non-repudiation, under an embodiment.

Implement Tamper Detection and Tamper Resistance:

Tamper detection and tamper resistance of near line servers is challenged by the fact that the administrator has full control over these servers, and they may themselves be the perpetrators of an accidental or malicious action that needs to be protected against. FIG. 36 is a system 3600 that includes non-repudiation, under an embodiment. This system 3600 is an example of how multiple near line servers, at least one local and one remote, can work in concert in a manner that protects against administrative tampering.

The assumption is that the remote server is out of the region of control of the local administrator.

This mechanism is introduced after all the standard server hardening, tamper resistance and tamper logging mechanisms have been implemented on the near line server. In the previous example the Access mechanism is enhanced so that it validates the data in the Indexed Object Repository before it is logged and replicated to a Remote near line server. The local and remote near line servers can use standard cryptographic techniques to build trust between each other and to enhance the trust and privacy of the communication medium. Though just a pair of local and remote near line servers is illustrated, an arbitrary number of local and remote near line servers, connected in any arbitrary topology, leveraging a variety of transports and protocols are possible.

Figure 37:
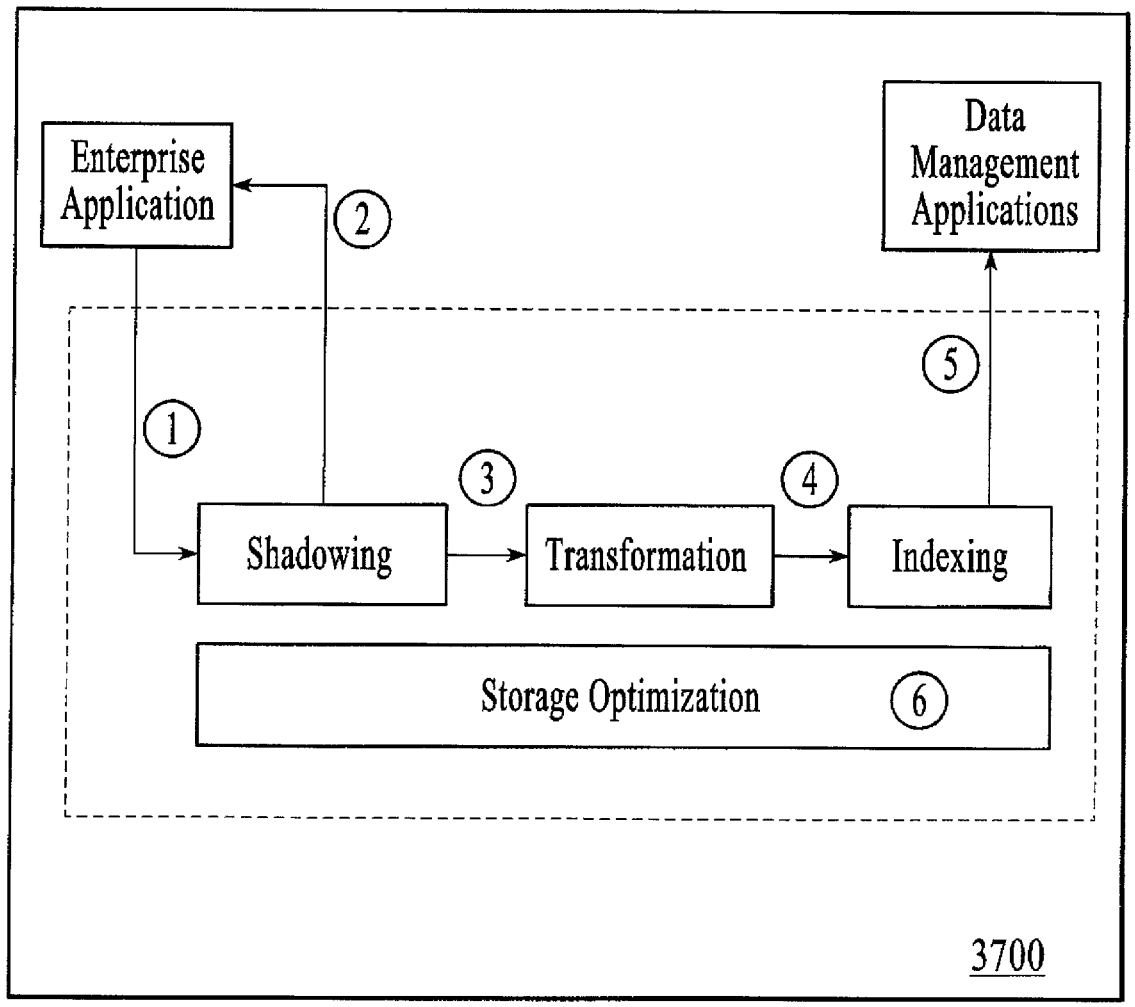
FIG. 37 is a system that includes a multi-dimensional one-pass surrogate, under an embodiment.

Creation of the Multi-Dimensional One-Pass Surrogate:

The data surrogation mechanism might employ mechanisms which may efficiently capture and shadow copies of the enterprise messaging server data, optionally in a single pass, and then processes it to make it available for data management. FIG. 37 is a system 3700 that includes a multi-dimensional one-pass surrogate, under an embodiment.

In the previous diagram the following phases are described. Please note that this is an example; other variations are possible in order to accomplish similar objectives.

The previous diagram shows the components of one pass data surrogation:

1. Shadowing: This is the underpinning of one pass protection and involves creating and maintaining a replica of enterprise application data in an application consistent manner. This is superior to, and far more efficient than, traditional replication. It is also far more efficient than traditional capture using mechanisms such as MAPI or SMTP. Application data that is being shadowed is being stored on the near line server in the format of the original application, and is available to the enterprise server (or to a replacement server) either immediately or in near real-time when there are data corruptions or unrecoverable media failures.

2. Transformation: This process involves the conversion of data from the dense application format of the application into a more flexible granular format that is more amenable to use in data management or processing by analysis servers. This transformation provides all the capabilities of traditional archiving without the associated limitations of lack of speed due to the archival window, and the limitation of excessive loads generated on the enterprise server. The new data format consists of data as well as metadata. The metadata is used for categorizing and classifying the data and creating internal relationships, making it easier to subsequently access and analyze.

3. Indexing: This process involves analyzing the transformed data and generating additional metadata that utilizes additional processing and more sophisticated algorithms. These algorithms include (without limitation), mining and semantic indexing. They may include addition of aspects of time, space, entity and individual hierarchy, etc. The transformed data is being continually indexed and co-related with new data as it arrives on the near line, or it can be indexed and co-related as a lazy process. The goals may include the attempt to make subsequent search and analysis more efficient or featurefull.

4. Storage Optimization: This involves utilizing application and metadata knowledge in order to organize and store the data on the near line in a manner that reduces the footprint (i.e., saves space) while also optimizing the access latencies.

The mechanism that has extracted, transformed, indexed and stored the application data can now facilitate a range of data management applications such as those described in the subsequent sections, among many others.

Enablement of Multiple Data Management Applications:

The enhanced data surrogate can implement a higher level framework that enables a range of data management applications.

These Data Management applications can have complex and value-added inter-relationships and feedback loops that compliment and/or augment the function of the production messaging systems (ex: monitoring, supervision, proactive data mining and pattern matching, and integrated workflow and extended collaboration.)

Figure 38:
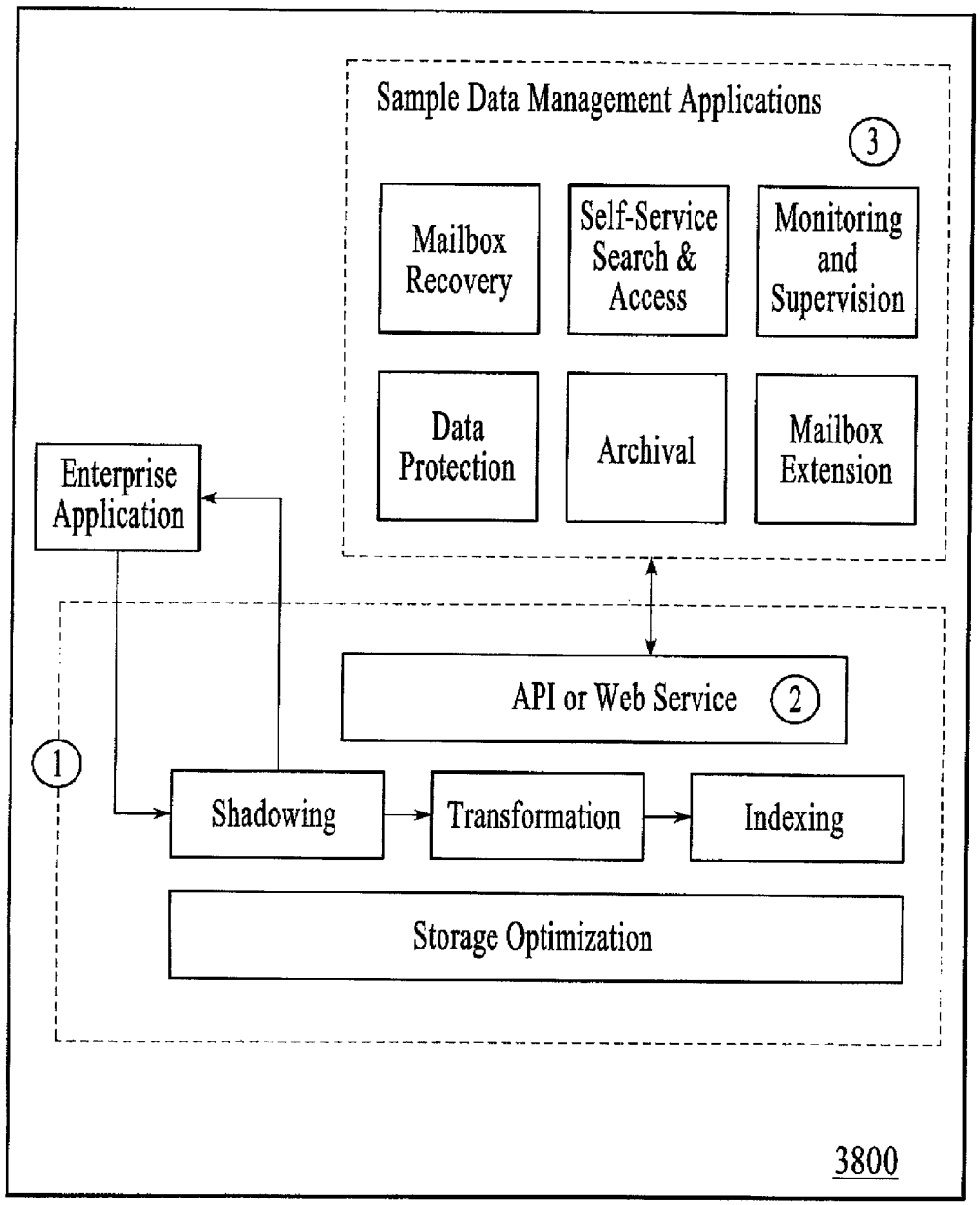
FIG. 38 is a system that includes multiple data management applications, under an embodiment.

FIG. 38 is a system 3800 that includes multiple data management applications, under an embodiment. This system 3800 includes an API (also substitutable by a Web Service) that facilitates access to the data by the implementers or third party applications in a secure and scalable manner to implement a range of applications.

In the previous diagram the following phases are described. Please note that this is an example; other variations are possible in order to accomplish similar objectives.

1. Relevant enterprise data, perhaps from multiple homogeneous or heterogeneous servers, is introduced into the near line and kept up-to-date
2. An API or Web Service or equivalent is provided so that modular applications can either reside directly on the near line or access it over a network in order to get access to views of this near line-hosted data
3. These Data Management Applications may be existing applications that assume they are directly accessing the production servers, but are actually accessing the near line through identical APIs and protocols. Alternately they may be new applications that are designed and implemented to use the implementation-provided APIs or Web Services.

The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Figure 39:
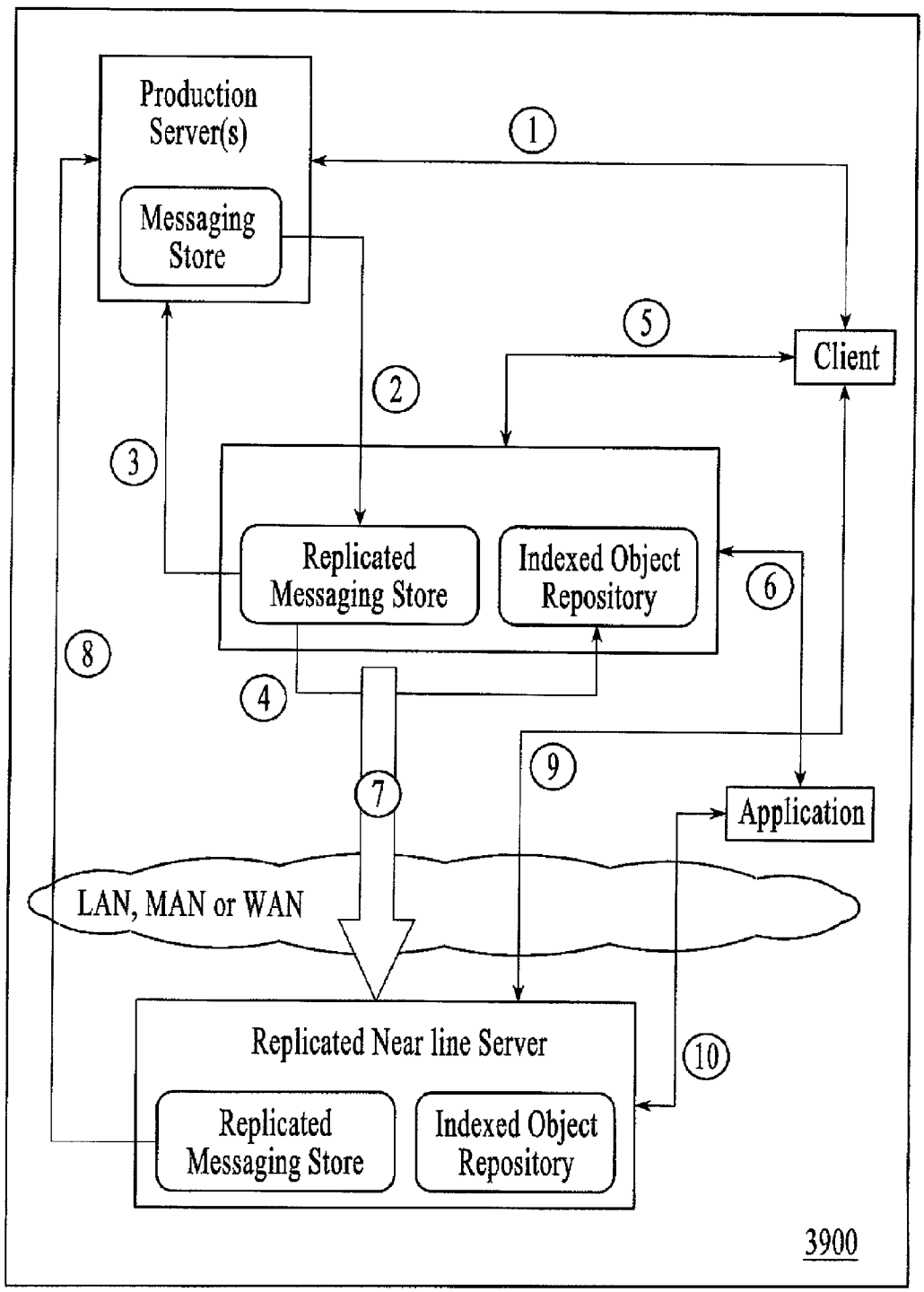
FIG. 39 is a system that includes an example deployment of an enhanced data surrogate in an enterprise setting, under an embodiment.

Deployment Architecture:

FIG. 39 is a system 3900 that includes an example deployment of an enhanced data surrogate in an enterprise setting, under an embodiment. It describes how the near line server works in relationship to enterprise servers, data management applications, and clients.

The previous diagram the following phases are described. Please note that this is an example; other variations are possible in order to accomplish similar objectives.

1. Normal Client Access to production server
2. Capture of Application Data Shadow onto near line server
3. Return of Application Data on Demand to original or replacement enterprise server
4. Transformation of dense application data into alternate formats, with aggregation in space and time and introduction of storage efficiencies
5. The client is provided with direct self-service access to latest or historical data on the near line in a trusted manner. The client is also provided with service preservation off the near line server when the primary enterprise server experiences a failure
6. Data Management Applications are provided with access to enterprise application data that is aggregated and optionally post-processed on the near line server
7. The data on the near line server is replicated to a copy that may be optionally located at a remote site for purposes of disaster protection
8. When there is a catastrophic failure at the primary data center, the replacement enterprise servers are able to obtain copies of the original data from the disaster protection site
9. When there is an outage in the primary data center, clients are able to obtain access to near line-hosted data, as well as to a replacement service, off the near line replica hosted at the disaster protection site
10. When there is an outage in the primary data center, Data Management Applications are able to obtain uninterrupted access to the copy of the data that is at the disaster protection site The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Figure 40:
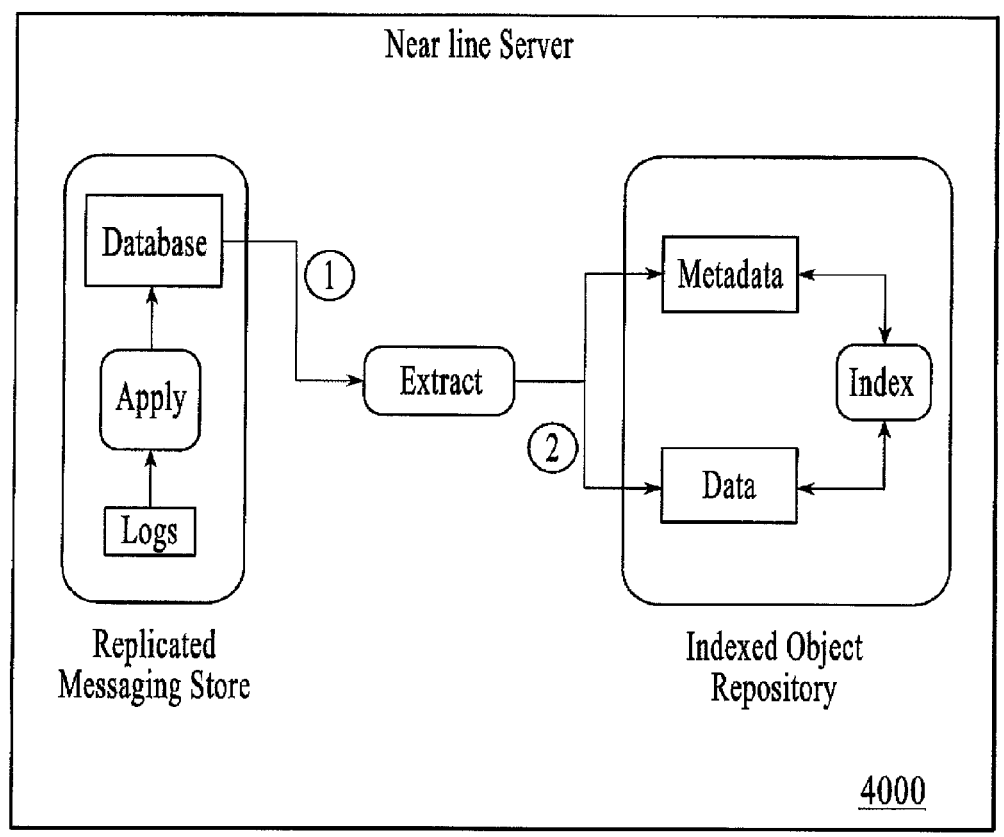
FIG. 40 is a system that includes a near line component architecture, under an embodiment.

Near Line Server Architecture and Implementation:

FIG. 40 is a system 4000 that includes a near line component architecture, under an embodiment. This system 4000 shows a component-level view of an example near line architecture and implementation as one embodiment of data surrogation.

In the previous diagram the following phases are described. Please note that this is an example; other variations are possible in order to accomplish similar objectives.

The remaining components of this diagram have been described previously in this document. Though this example shows a single near line server, it may in actuality be clustered, distributed, replicated, virtualized, and may straddle multiple machines or sites.

Figure 41:
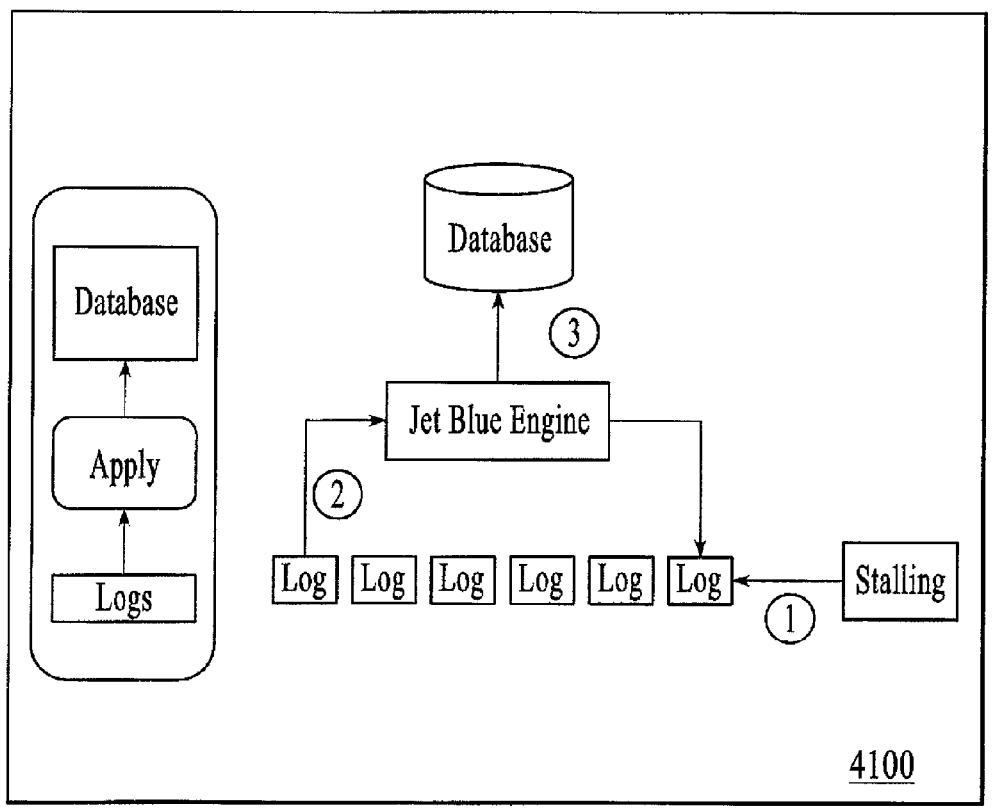
FIG. 41 is a system that includes the Apply architecture, under an embodiment.

Apply Architecture and Implementation:

FIG. 41 is a system 4100 that includes the Apply architecture, under an embodiment.

In the previous diagram the following phases are described. Please note that this is an example; other variations are possible in order to accomplish similar objectives.

Example Applications of Multi-Dimensional Data Surrogation

This section enumerates a few of the data management applications that can be facilitated by generating and maintaining a multi-dimensional data surrogate, among others. Some of these applications can be intrinsic (or built into the product); others can be extrinsic (or facilitated by the API or Web Service). Other applications are possible. These applications are described in the context of messaging and collaboration servers in general, and Microsoft Exchange Server is one example. However the concepts and the applications are extensible to the whole class of applications that create and consume structured, semi-structured or unstructured data.

Figure 42:
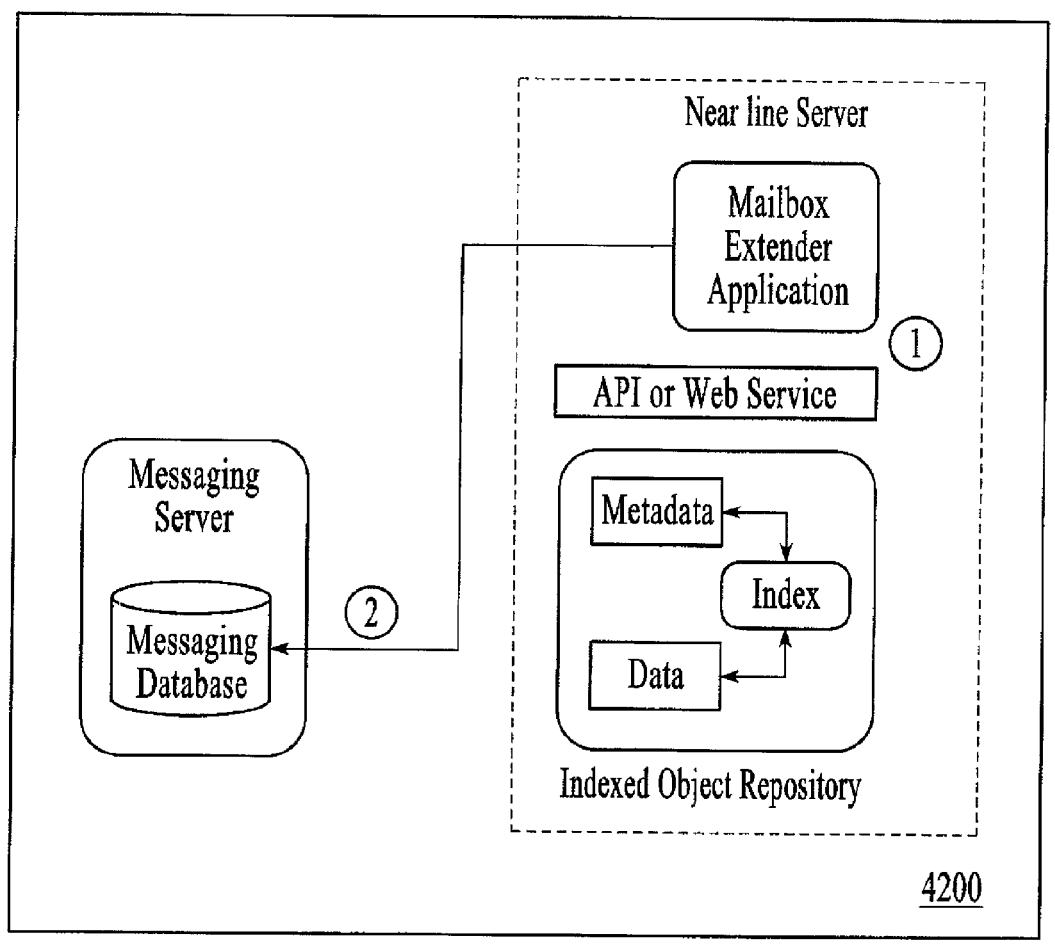
FIG. 42 is a system that includes messaging life-cycle management, under an embodiment.
Figure 43:
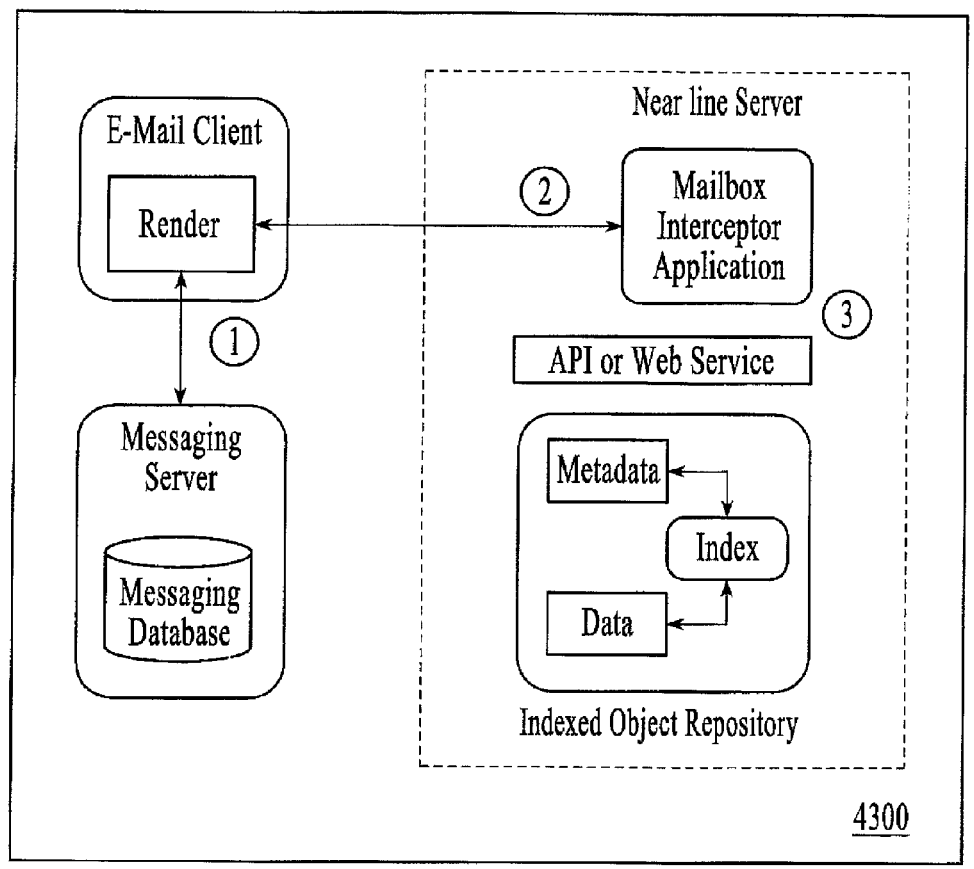
FIG. 43 is a system that includes intercepting of extended messages through one pass, under an embodiment.

Enabling Messaging Life-Cycle Management:

Mailbox extension is a mechanism for managing the life cycle of messages in a messaging server. Data that is less likely to be accessed, or data that is deemed difficult to store on the production server, is transferred to the data surrogate. FIG. 42 is a system 4200 that includes messaging life-cycle management, under an embodiment. FIG. 43 is a system 4300 that includes intercepting of extended messages through one pass, under an embodiment. These systems 4200 and 4300 show how very large and infrequently accessed items are seamlessly transported to the near line server, but are faulted back whenever they are accessed by the client. This faulting back process may be on demand or may be proactive based on an observed or pre-programmed pattern or access. This faulting back may be single or batch, which may attempt to leverage patterns of locality of reference of some form.

The previous diagram the following phases are described. Please note that this is an example; other variations are possible in order to accomplish similar objectives.
1. The Mailbox Extender Application accesses the data surrogate to determine candidates for extension.
2. The Application then accesses the remote server and replaces the items that have been identified in the previous step with stubs that may be light-weight representations of the copy of that item that resides in the data surrogate.

Though the reference is to messaging servers and e-mail clients, the concepts may extend to any arbitrary type of enterprise application. Though this example demonstrates operation for a single enterprise server, it may be possible to provide simultaneous capabilities to multiple homogeneous or heterogeneous enterprise servers. These servers themselves may be cascaded, clustered, replicated, virtualized, part of a grid, or some other combination or variation thereof. The remaining components of this diagram have been described previously in this document.

The previous diagram the following phases are described. Please note that this is an example; other variations are possible in order to accomplish similar objectives. Though the reference is to messaging servers and e-mail clients, the concepts may extend to any arbitrary type of enterprise application. Though this example demonstrates operation for a single enterprise server, it may be possible to provide simultaneous capabilities to multiple homogeneous or heterogeneous enterprise servers. These servers themselves may be cascaded, clustered, replicated, virtualized, part of a grid, or some other combination or variation thereof
1. The user attempts to access an item that has been previously extended.
2. The Mailbox Interception Application may intercept this access and may splice in the required item from the data surrogate.

The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Figure 44:
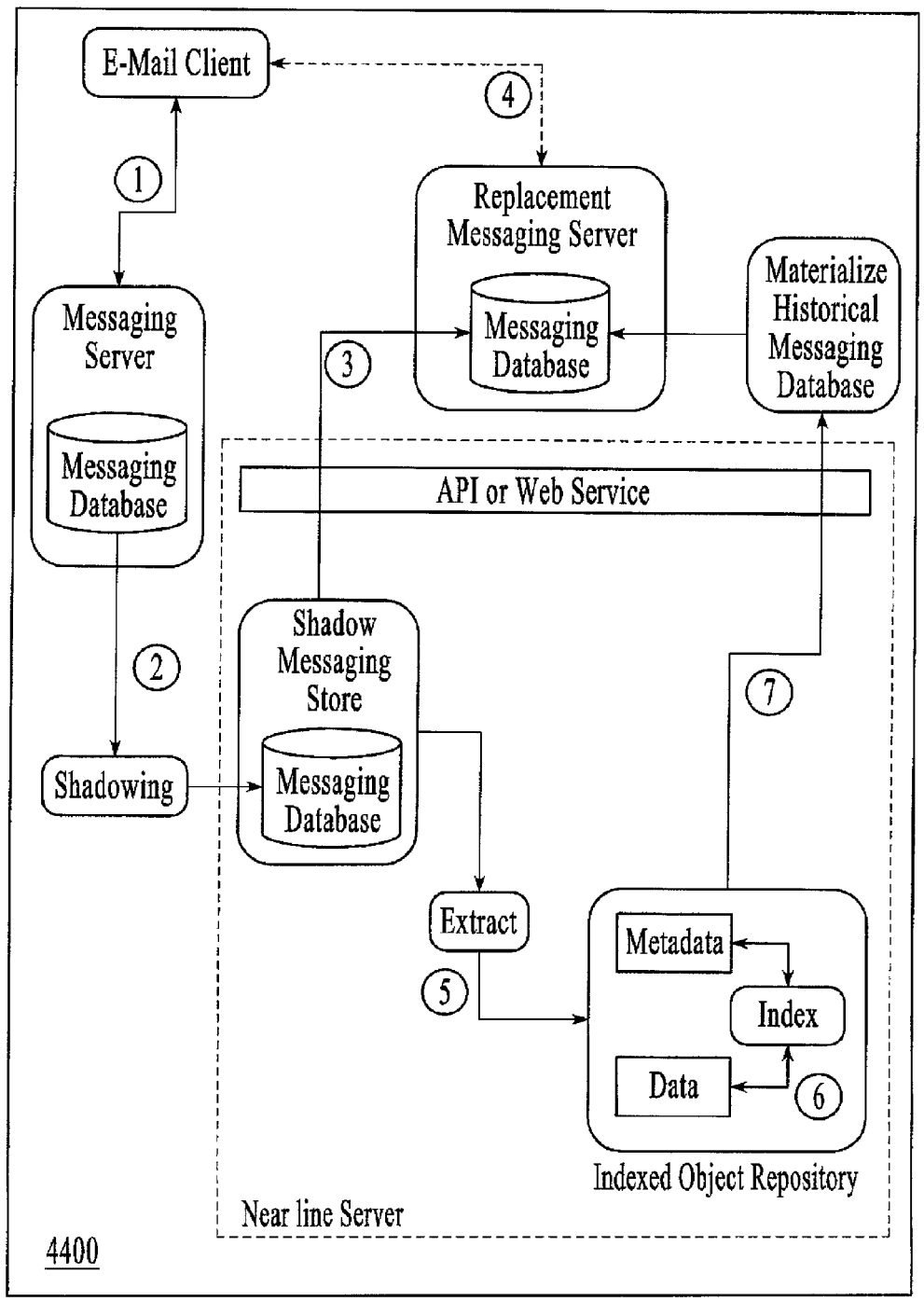
FIG. 44 is a system that provides data protection through one pass, under an embodiment.

Enabling Data Protection:

FIG. 44 is a system 4400 that provides data protection through one pass, under an embodiment. The system 4400 leverages enhanced data surrogation and implements Data Protection that provides RPO and RTO capabilities superior to existing Data Protection solutions.

The previous diagram the following phases are described. Please note that this is an example; other variations are possible in order to accomplish similar objectives.
1. Normal Email client interaction (or SMTP relay) is populating, modifying, or extending the messaging database.
2. The Shadowing mechanism is maintaining a copy of this messaging database on the near line server in the original Application format
3. The Shadowed databases are available to the original messaging server, or to a replacement, when there is catastrophic data or server loss
4. The replacement service is directly available to the client from the near line server when there is catastrophic data or server loss
5. The Extract mechanism is translating from application format to alternate format that is amenable to post-processing and disparate data management application access needs
6. The Index mechanism runs by schedule, demand, or continuously to add successively higher levels of metadata to ease data classification and retrieval
7. The retrieval process is able to reconstitute a historical database in time (or portions thereof), or with specific properties as required for analysis, data restoration, service restoration, or other purposes The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Enabling Disaster Protection

The data surrogation can straddle multiple geographically disparate sites. This may incorporate multiple mechanisms such as near line servers and incorporate and extend mechanisms that are used for transporting, storing and post-processing data in the data protection application. As a consequence of the distribution of the data surrogation, the data surrogate is resilient to catastrophic failures that might include server, data center and site failures. In the presence of such failures it may be possible for the data surrogate to return recent copies of data, or to facilitate the deployment of replacement servers, or even facilitate service preservation directly to clients and applications. This service preservation may involve the co-operation of other enterprise components, or it may involve the introduction of proxies that render these fail-over and fail-back operations transparent, or some variation or combination.

Figure 45:
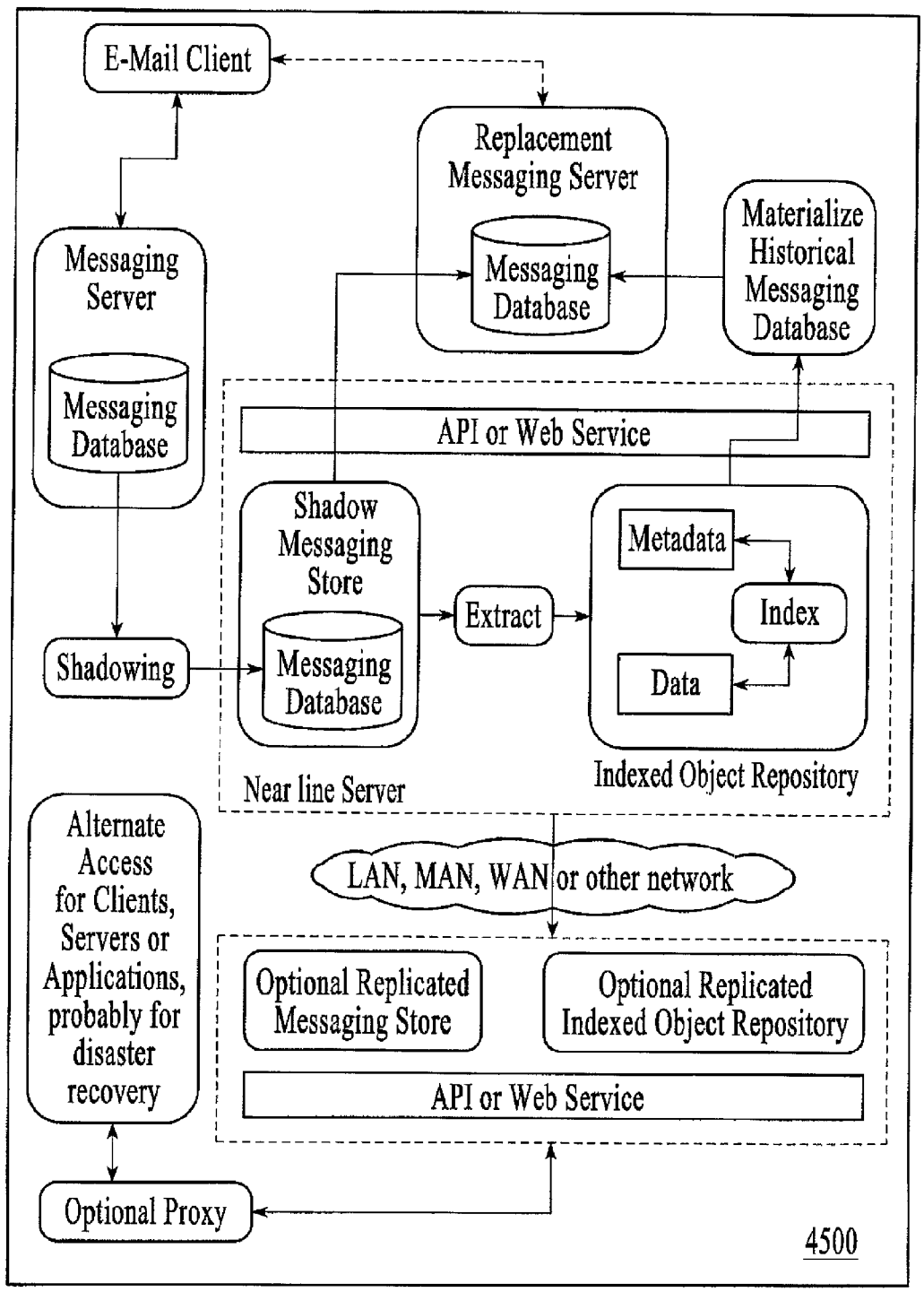
FIG. 45 is a system that includes disaster protection, under an embodiment.

FIG. 45 is a system 4500 that includes disaster protection, under an embodiment. Messaging servers are used as an example however the concepts may be extended to other types of application servers. Only a single client and a single messaging server are shown. However it may be possible to extend this facility to a larger number of clients and servers. The data surrogation is being extended to straddle an alternate site. In this diagram it is shown to be implemented through replication over a suitable network as an example. It may also be possible to implement 2-way replication so that two peer data surrogate servers are leveraging each other for disaster protection. This may be further extended to n-way where 'n' is any arbitrary number, and the interconnectivity may utilize some suitable topology that might include any arbitrary combinations of meshes, trees, graphs, and other variations and combinations.

There may be an optional proxy that might render the fail-over and the fail-back transparent to the client, the server, other relevant enterprise components, or some variation or combination. Either just the shadow repositories may be replicated and then subsequently dehydrated. Or just the indexed object repositories may be replicated and then the shadows may be re-hydrated. Or there may be some variation or combination of these.

Figure 46:
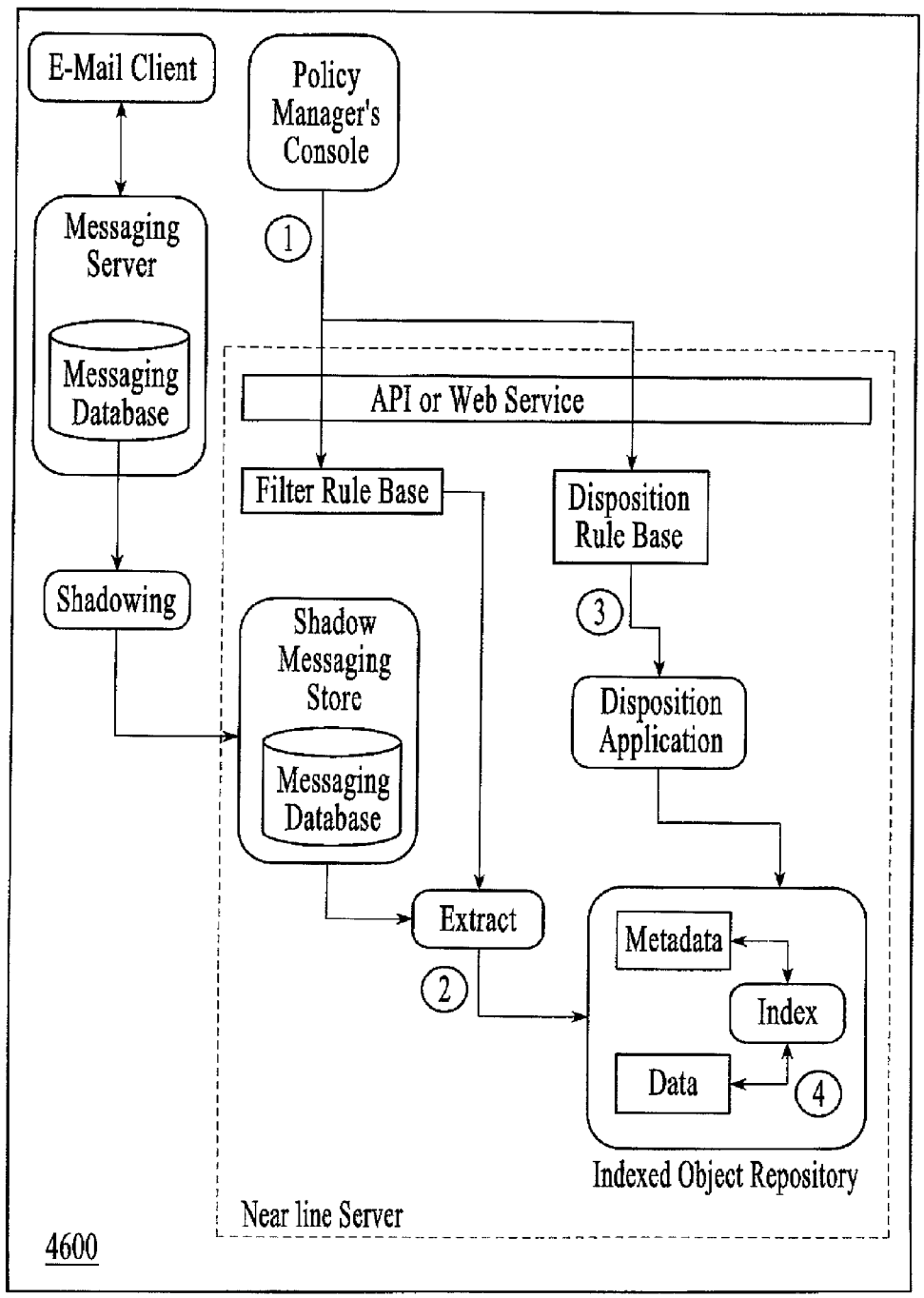
FIG. 46 is a system that includes Archival, under an embodiment.

Enabling Archival Through Optional One Pass:

FIG. 46 is a system 4600 that includes Archival, under an embodiment. The system 4600 includes a data management application that leverages an enhanced data surrogation to implement an archival application that exceeds the capabilities of traditional archiving without suffering from any of the shortcomings of traditional archiving.

In the previous diagram the following phases are described. Please note that this is an example; other variations are possible in order to accomplish similar objectives.

1. Policy Manager can optionally define archival filtering rules
2. The in-band Extract process can optionally act directly on these rules
3. The Policy Manager can optionally set retention and disposition rules
4. The out-of-band Index process can apply the retention and disposition rules, and optionally apply the archival filtering rules The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Figure 47:
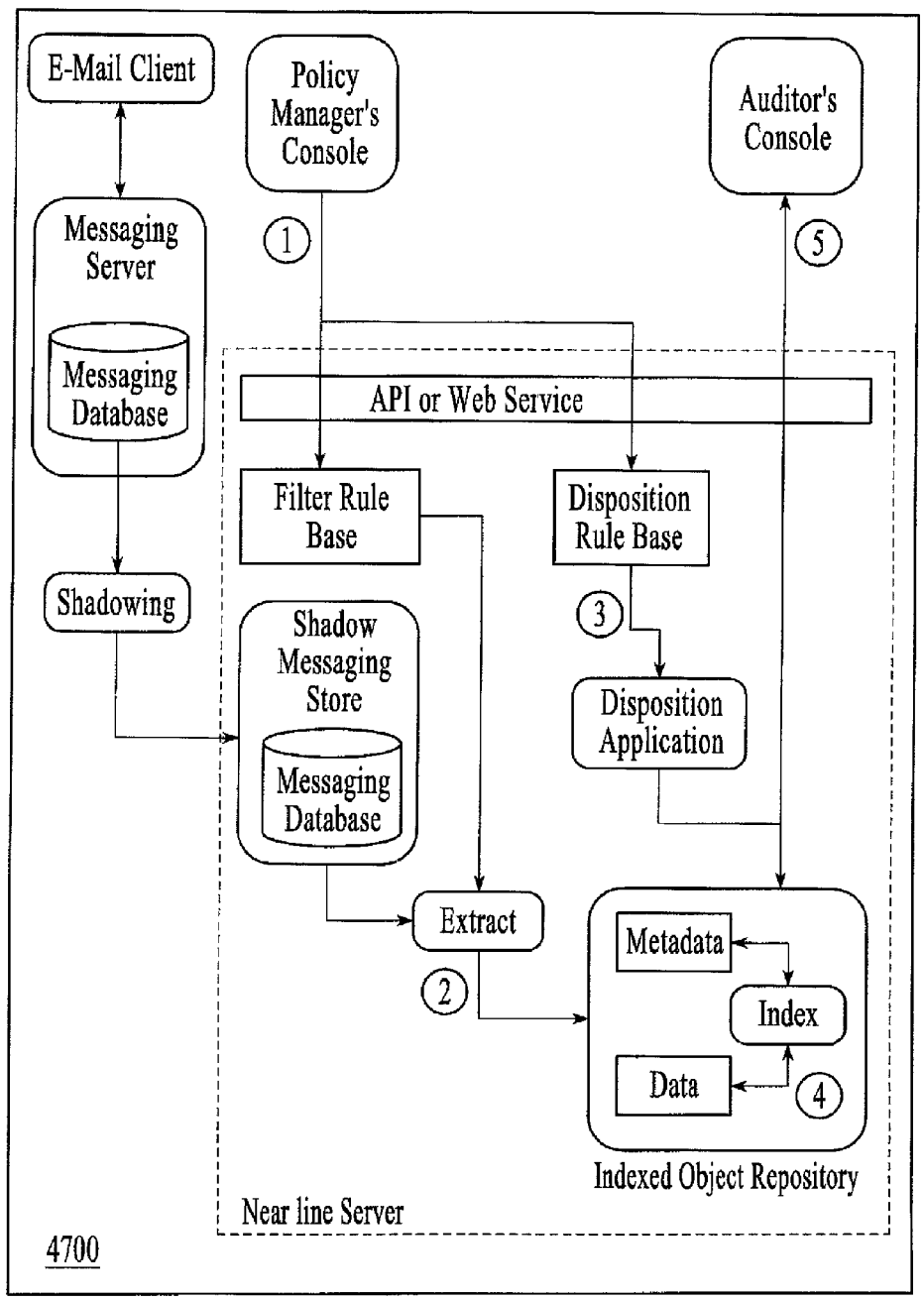
FIG. 47 is a system that includes audit and legal discovery mechanisms, under an embodiment.

Enabling Audits and Legal Discovery with an Enhanced Data Surrogate:

FIG. 47 is a system 4700 that includes audit and legal discovery mechanisms, under an embodiment. The audit and legal discovery mechanisms, which are generally facilitated by traditional archival systems, can be implemented as an application that resides over the enhanced data surrogation API.

In the previous diagram the following phases are described. Please note that this is an example; other variations are possible in order to accomplish similar objectives.

1. The optional ability for the Policy Manager to define inclusions, exclusions, capture rules, etc that would augment the optional ability of the system to selectively match data patterns.
2. The optional ability for the in-band Extract process to apply these rules
3. The optional ability for the Policy Manager to define post-processing rules
4. The optional ability for the Index process to apply either the inclusion, exclusion and capture rules, or the post-processing rules out-of-band
5. The optional ability for the Auditor to either proactively query, or be notified when rules are triggered The remaining components of this diagram have been described previously in this document. Though this example shows a Messaging server, it is possible to provide equivalent services to multiple homogeneous or heterogeneous servers. Though this example shows a single near line server, it may in actuality be clustered, distributed, replicated, virtualized, and may straddle multiple machines or sites.

Figure 48:
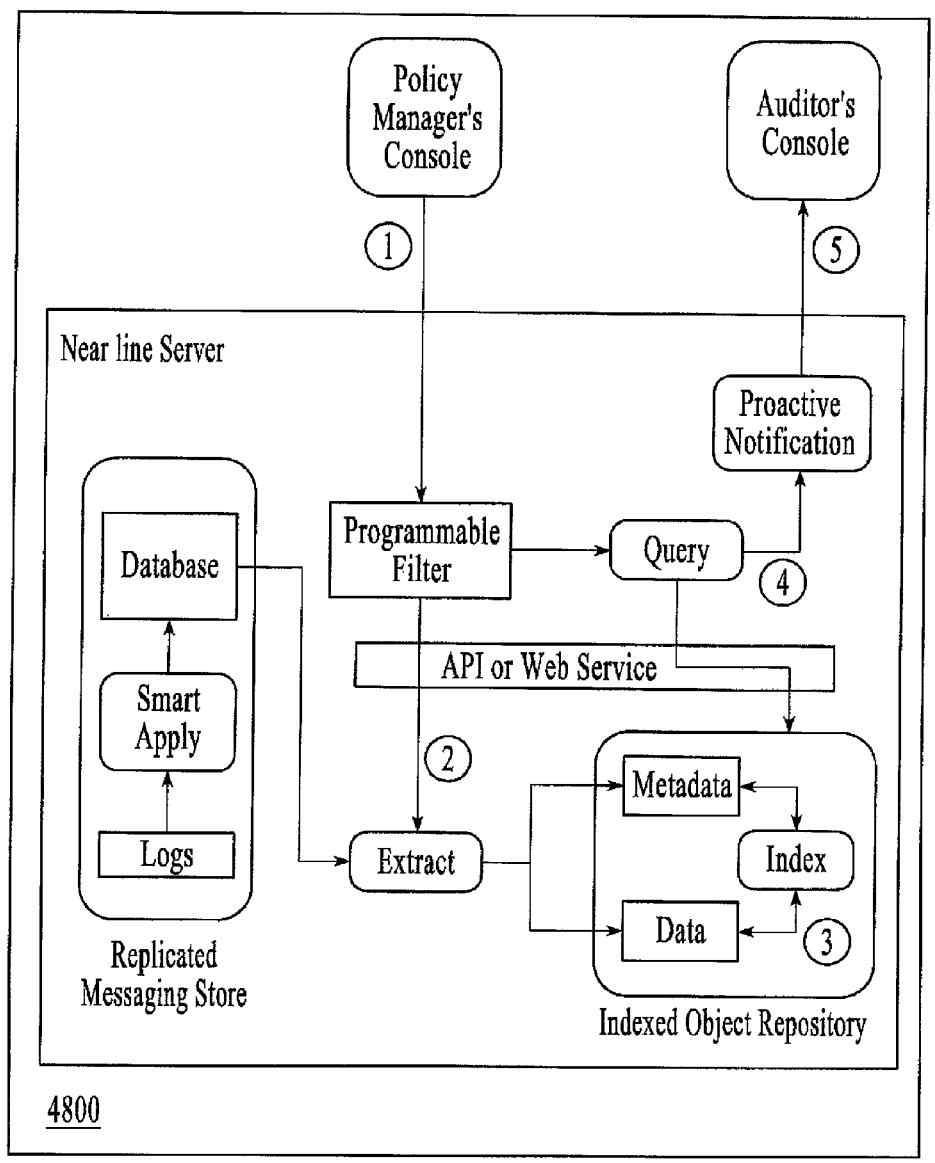
FIG. 48 is a system that includes monitoring and supervision through one pass, under an embodiment.

Enabling Monitoring and Supervision Through One Pass:

FIG. 48 is a system 4800 that includes monitoring and supervision through one pass, under an embodiment. The system 4800 shows a monitoring and supervision application that is generally facilitated by traditional archiving, except that this is implemented as an application over enhanced data surrogation and does not suffer from any of the deficiencies of traditional archival.

In the previous diagram the following phases are described. Please note that this is an example; other variations are possible in order to accomplish similar objectives.

1. Optional Update of Rule Base using the API or Web Service
2. Optional Optimization of the in-band Extract process based on these rules
3. Optional out-of-band Batch Processing to look for matching rules
4. The optional ability to proactively query and look for matches
5. The optional ability for the near line to proactively notify an entity of matches The remaining components of this diagram have been described previously in this document. Though this example shows a single near line server, it may in actuality be clustered, distributed, replicated, virtualized, and may straddle multiple machines or sites.

Figure 49:
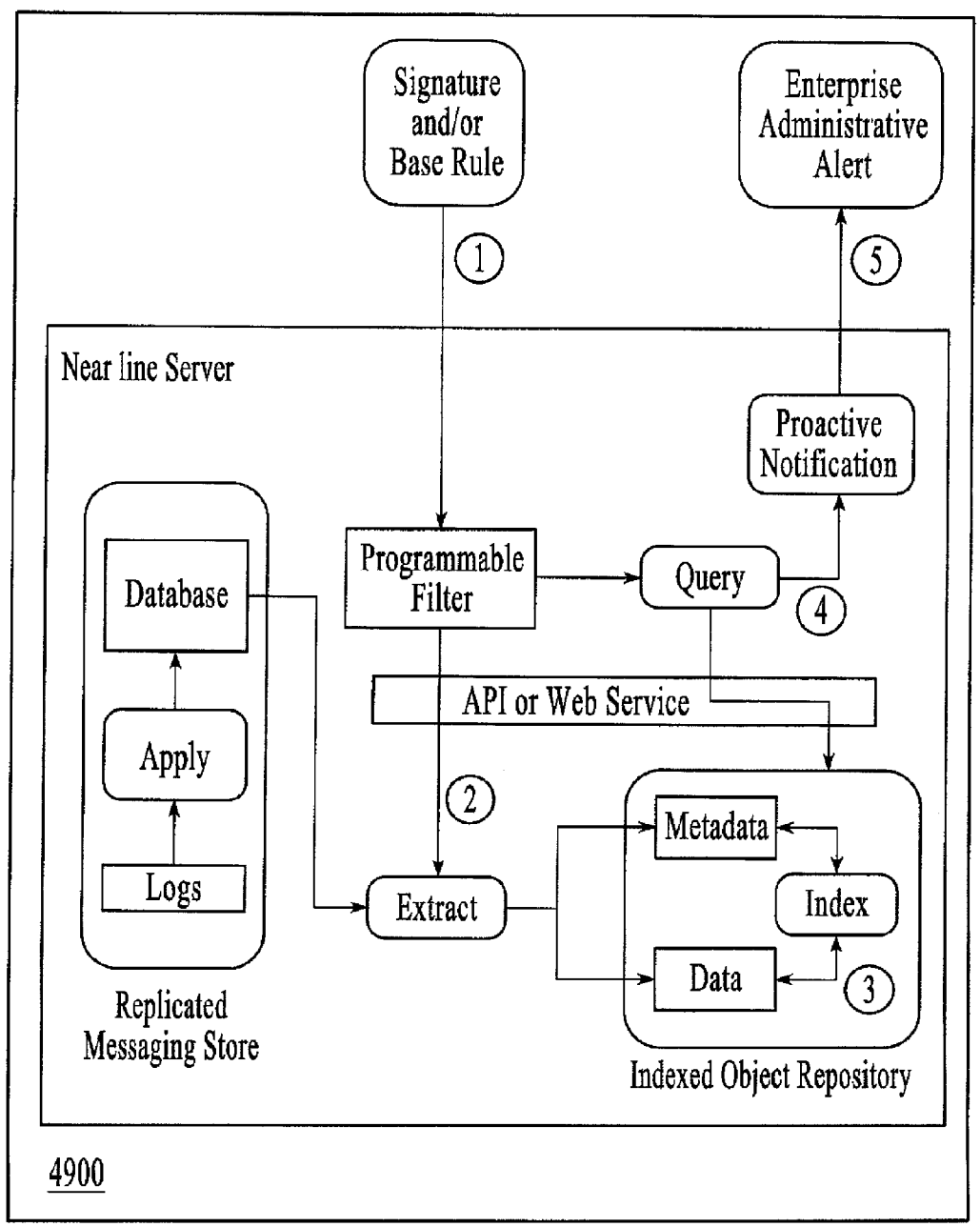
FIG. 49 is a system that includes virus, SPAM, and intrusion protection, under an embodiment.

Enabling Virus, SPAM and Intrusion Protection Through One Pass:

FIG. 49 is a system 4900 that includes virus, SPAM, and intrusion protection, under an embodiment. The system 4900 includes a class of security applications that can operate on the data that has been efficiently transported, stored and post-processed by the enhanced data surrogation. This class of applications can reside at the gateway, and/or directly on the enterprise server. The One Pass data surrogation mechanism provides a tertiary location for implementing this "defense in depth." The benefit of being run on a near line server is that considerable computational power can be brought to bear on solving the problem (detecting intrusions in this case) without negatively impacting the production server (due to host-based systems) or excessively delaying mail throughput (due to gateway-based systems.)

The previous diagram the following phases are described. Please note that this is an example; other variations are possible in order to accomplish similar objectives.

1. Optional Update of Signature and/or Rule Base using the API or Web Service. These might include updating virus or SPAM signatures, or intrusion prevention rules.
2. Optional Optimization of the in-band Extract process based on these rules or signatures
3. Optional out-of-band Batch Processing to look for matching rules and signatures
4. The optional ability to proactively query and look for matches
5. The optional ability for the near line to proactively notify an entity of matches The remaining components of this diagram have been described previously in this document. Though this example shows a single near line server, alternative embodiments may include clustered, distributed, replicated, and virtualized processor-based devices, including but not limited to multiple devices and/or multiple sites.

The multi-dimensional surrogation of an embodiment includes a method comprising at least one of generating at least one data surrogate using information of received data and a plurality of data changes received from at least one data source, extracting original metadata of each data surrogate, generating an extended data surrogate comprising at least one of the data surrogate and the original metadata, and controlling access to data of at least one of the data surrogate and the extended data surrogate by at least one of applications and servers.

The method of an embodiment further comprises updating the at least one data surrogate using information of at least one additional data change received from at least one data source. The updating of an embodiment is performed at least one of upon receipt of the at least one additional data change, subsequent to receipt of a plurality of additional data changes, and following processing operations on the at least one additional data change.

The method of an embodiment further comprises transforming data of at least one of the data surrogate and the extended data surrogate among a plurality of density formats.

The method of an embodiment further comprises generating new metadata by combining portions of the original metadata and components of each data surrogate. The extended data surrogate of an embodiment includes the new metadata.

The method of an embodiment further comprises at least one of detecting a data format of at least one of the applications, and transforming data of at least one of the data surrogate and the extended data surrogate in accordance with detected data format.

The method of an embodiment further comprises at least one of detecting a data content of at least one of the applications, and transforming data of at least one of the data surrogate and the extended data surrogate in accordance with detected data content.

The method of an embodiment further comprises archiving at least one instance of at least one of the data surrogate and the extended data surrogate in at least one storage site. The storage site of an embodiment includes a plurality of storage sites. The method of an embodiment further comprises archiving difference information of changes made in at least one of the data surrogate and the extended data surrogate. The archiving of an embodiment includes active archiving, wherein active archiving includes at least one of performing at least one operation on the data surrogate and placing at least one of the data surrogate and the extended data surrogate in at least one storage site as appropriate to a corresponding application. The archiving of an embodiment includes passive archiving, wherein passive archiving includes archiving as reference data at least one instance of at least one of the data surrogate and the extended data surrogate in at least one storage site. The archiving of an embodiment includes deep archiving, wherein deep archiving includes archiving a plurality of instances of at least one of the data surrogate and the extended data surrogate in at least one storage site, wherein data archived by deep archiving is accessed in accordance with at least one privilege.

The method of an embodiment further comprises integrating at least one of the data surrogate and the extended data surrogate with at least one of the applications. The applications of an embodiment include authentication applications, authorization applications, access control applications, tamper detection applications, tamper prevention applications, and audit applications. At least one of the applications of an embodiment regulate access to the data surrogate by at least one of users, administrators, auditors, and policy managers.

The method of an embodiment further comprises transferring a portion of data of at least one of the data surrogate and the extended data surrogate to at least one server. The transferring of an embodiment includes at least one of quality of service mechanisms, remote change detection mechanisms, batching of data transfers, and optimizing of transfer schedules, wherein the transferring preserves bandwidth and optimizes latency. The transferring of an embodiment includes at least one of applying privacy mechanisms and tamper resistance mechanisms. The transferring of an embodiment complies with at least one of legal requirements and compliance requirements of retention, disposition, monitoring and supervision when multiple copies of at least one of the data surrogate and the extended data surrogate result from the transferring. At least one server of an embodiment includes at least one of local servers, remote servers, messaging servers, electronic mail servers, instant messaging servers, voice-over-Internet Protocol servers, collaboration servers, portals, customer relationship management (CRM) servers, enterprise resource planning (ERP) servers, business-to-business servers, content management servers, and database servers.

The method of an embodiment further comprises transferring a portion of data of at least one of the data surrogate and the extended data surrogate to at least one client application, wherein the at least one client application includes local client applications and remote client applications. The method of an embodiment further comprises enforcing access to at least one of the data surrogates and extended data surrogates through at least one of authentication, authorization, access control and non-repudiation in a manner that is integrated with at least one coupled enterprise. The method of an embodiment further comprises controlling access to at least one of the data surrogates and the extended data surrogates and maintaining privacy and tamper resistance of the data during the transferring and at rest.

The method of an embodiment further comprises storing at least one of the data surrogate and the extended data surrogate in at least one storage site in accordance with at least one application with which the data surrogate and the extended data surrogate is associated.

The method of an embodiment further comprises controlling access by at least one user to at least one of the data surrogate and the extended data surrogate.

The method of an embodiment further comprises moving at least one of the data surrogate and the extended data surrogate across a plurality of storage devices in accordance with at least one parameter including source, content, key words, age, size, user, policies, and frequency of access.

The method of an embodiment further comprises restoring data of the data surrogate on a target server, wherein the target server is a source server of the received data.

The method of an embodiment further comprises redirecting data of the data surrogate to a target server, wherein the target server is restored is a different server than the source server of the received data. The target server of an embodiment is at least one of on a different network and located at a different site from the source server.

Generating at least one of the data surrogate and the extended data surrogate of an embodiment is in response to at least one of an automatic trigger, a timer notification, an event notification, a poll, and a request. The automatic trigger of an embodiment includes a trigger automatically initiated in response to at least one pre-specified parameter. The automatic trigger of an embodiment includes content of at least one of the data surrogate and the extended data surrogate. The timer notification of an embodiment includes notifications corresponding to scheduled events including at least one of maintenance operations, user activities, server activities, and data population operations. The event notification of an embodiment includes notifications corresponding to changes to data of the data source. The request of an embodiment includes at least one of access attempts and configuration attempts by the users, servers or applications.

The method of an embodiment further comprises at least one of determining at least one parameter of the received data, the at least one parameter including at least one of size, age, frequency of access, and time of last access of the received data, and replacing the received data with at least one pointer to at least one copy of the received data in the data surrogate in accordance with the parameter. The method of an embodiment further comprises at least one of intercepting subsequent access to received data by at least one of applications, servers, and users using the at least one pointer, and providing the subsequent access by splicing data from at least one of the data surrogate and the extended data surrogate.

The multi-dimensional surrogation of an embodiment includes a data surrogate system (DSS) comprising at least one of a DSS server that receives data and a plurality of data changes, an engine coupled to the DSS server that generates at least one data surrogate using information of the data and data changes, and an extractor coupled to the engine that extracts original metadata of each data surrogate and generates an extended data surrogate that includes at least one of the data surrogate and the original metadata, wherein the DSS server controls access to data of at least one of the data surrogate and the extended data surrogate by at least one of applications and servers.

The system of an embodiment further comprises a transformer coupled to the DSS server, the transformer transforming data of at least one of the data surrogate and the extended data surrogate from a format of the data to at least one alternative format.

The system of an embodiment further comprises at least one repository coupled to the DSS server, the repository storing at least one of the data, data change files, the data surrogate, the extended data surrogate, the original metadata, and new metadata.

The DSS server of an embodiment updates the at least one data surrogate using information of at least one additional data change received from at least one data source.

The DSS server of an embodiment generates new metadata by combining portions of the original metadata and components of each data surrogate.

The DSS server of an embodiment detects at least one of a data format and a content of at least one of the applications and transforms data of at least one of the data surrogate and the extended data surrogate in accordance with at least one of the detected data format and detected content.

The DSS server of an embodiment transfers a portion of data of at least one of the data surrogate and the extended data surrogate to at least one other server.

The DSS server of an embodiment transfers a portion of data of at least one of the data surrogate and the extended data surrogate to at least one client application, wherein the at least one client application includes local client applications and remote client applications.

The DSS server of an embodiment controls access by at least one user to at least one of the data surrogate and the extended data surrogate.

The DSS server of an embodiment moves at least one of the data surrogate and the extended data surrogate across a plurality of storage devices in accordance with at least one parameter including source, content, key words, age, size, user, policies, and frequency of access.

The DSS server of an embodiment restores data of the data surrogate on a target server, wherein the target server is a source server of the received data.

The DSS server of an embodiment redirects data of the data surrogate to a target server, wherein the target server is restored is a different server than the source server of the received data.

The system of an embodiment further comprises at least one enterprise server coupled to the DSS server. The enterprise server of an embodiment includes at least one of local servers, remote servers, messaging servers, electronic mail servers, instant messaging servers, voice-over-Internet Protocol servers, collaboration servers, portals, customer relationship management (CRM) servers, enterprise resource planning (ERP) servers, business-to-business servers, content management servers, and database servers.

The system of an embodiment further comprises at least one network coupled to the DSS server. The network of an embodiment includes local area networks (LANs), metropolitan area networks (MANs wide area networks (WANs), and storage area networks (SANs).

The system of an embodiment further comprises at least one filter coupled to the extractor for filtering the original metadata.

The extractor of an embodiment identifies relationships among portions of the original metadata and components of each data surrogate.

The extractor of an embodiment generates new metadata by selectively combining portions of the original metadata and the components of each data surrogate according to the relationships. The extended data surrogate of an embodiment includes the new metadata.

The components of the multi-dimensional surrogation described above may include any collection of computing components and devices operating together. The components of the multi-dimensional surrogation can also be components or subsystems within a larger computer system or network. Components of the multi-dimensional surrogation can also be coupled among any number of components (not shown), for example other buses, controllers, memory devices, and data input/output (I/O) devices, in any number of combinations. Further, functions of the multi-dimensional surrogation can be distributed among any number/combination of other processor-based components.

Aspects of the multi-dimensional surrogation described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the multi-dimensional surrogation include: microcontrollers with memory (such as electronically erasable programmable read only memory (EEPROM)), embedded microprocessors, firmware, software, etc. Furthermore, aspects of the multi-dimensional surrogation may be embodied in microprocessors having software-based circuit emulation, discrete logic (sequential and combinatorial), custom devices, fuzzy (neural) logic, quantum devices, and hybrids of any of the above device types. Any underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components of multi-dimensional surrogation disclosed herein may be described using data and/or instructions embodied in various computer-readable media. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the multi-dimensional surrogation may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the multi-dimensional surrogation is not intended to be exhaustive or to limit the multi-dimensional surrogation to the precise form disclosed. While specific embodiments of, and examples for, the multi-dimensional surrogation are described herein for illustrative purposes, various equivalent modifications are possible within the scope of the multi-dimensional surrogation, as those skilled in the relevant art will recognize. The teachings of the multi-dimensional surrogation provided herein can be applied to other processing systems and methods, not only for the systems and methods described above.

The elements and acts of the various embodiments described above can be combined to provide further embodiments. These and other changes can be made to the multi-dimensional surrogation and methods in light of the above detailed description.

In general, in the following claims, the terms used should not be construed to limit the multi-dimensional surrogation and methods to the specific embodiments disclosed in the specification and the claims, but should be construed to include all processing systems that operate under the claims. Accordingly, the multi-dimensional surrogation is not limited by the disclosure, but instead the scope of the multi-dimensional surrogation is to be determined entirely by the claims.

While certain aspects of the multi-dimensional surrogation are presented below in certain claim forms, the inventors contemplate the various aspects of the multi-dimensional surrogation in any number of claim forms. For example, while only one aspect of the multi-dimensional surrogation is recited as embodied in machine-readable media, other aspects may likewise be embodied in machine-readable media. Accordingly, the inventors reserve the right to add additional claims after filing the application to pursue such additional claim forms for other aspects of the multi-dimensional surrogation.

What is claimed is:

1. A computer-implemented method comprising:
   generating at least one data surrogate using information of received data and a plurality of data changes received from at least one data source;
   identifying relationships among portions of original metadata and components of each data surrogate and generating new metadata using information of the relationships;
   generating an extended data surrogate comprising the data surrogate and one of the original metadata and new metadata; and
   automatically controlling moving of at least one of the data surrogate and the extended data surrogate across a plurality of storage devices using a plurality of policies, wherein the plurality of policies comprise a placement policy that controls a location among the plurality of storage devices for storing the at least one of the data surrogate and the extended data surrogate, wherein the moving comprises archiving at least one instance of the data surrogate and the extended data surrogate in a storage device.

2. The computer-implemented method of claim 1, wherein the plurality of policies comprise a retention policy that controls a time for retaining the at least one of the data surrogate and the extended data surrogate.

3. The computer-implemented method of claim 1, wherein the plurality of policies comprise a disposition policy that controls at least one of time, event and method for disposing of the at least one of the data surrogate and the extended data surrogate.

4. The computer-implemented method of claim 1, wherein the plurality of policies comprise a filtering policy that controls filtering of the at least one of the data surrogate and the extended data surrogate.

5. The computer-implemented method of claim 1, wherein the plurality of policies define at least one parameter that controls the moving, the at least one parameter comprising at least one of source, content, key word, age, size, user, policies, frequency of access, inclusions, exclusions, and capture rules.

6. The computer-implemented method of claim 1, wherein the archiving includes placing at least one of the data surrogate and the extended data surrogate in a storage device as appropriate to an application to which the at least one of the data surrogate and the extended data surrogate corresponds.

7. The computer-implemented method of claim 1, comprising automatically controlling access to at least one of the data surrogate and the extended data surrogate using the plurality of policies.

8. The computer-implemented method of claim 1, wherein the plurality of policies complies with at least one of legal requirements and compliance requirements of retention, disposition, monitoring and supervision when multiple copies of at least one of the data surrogate and the extended data surrogate result from the moving.

9. The computer-implemented method of claim 1, comprising automatically controlling at least one of the generating at least one data surrogate and the generating an extended data surrogate using the plurality of policies.

10. The computer-implemented method of claim 1, comprising extracting the original metadata of each data surrogate according to the plurality of policies.

11. The computer-implemented method of claim 1, comprising enforcing access to at least one of the data surrogates and extended data surrogates through use of the plurality of policies.

12. The computer-implemented method of claim 1, wherein the generating at least one data surrogate includes generating additional data surrogates corresponding in part to data changes received from additional data sources.

13. The computer-implemented method of claim 1, wherein the at least one data surrogate is application-aware relative to an application corresponding to the received data and the plurality of data changes.

14. The computer-implemented method of claim 1, wherein the generating of the new metadata comprises combining the portions of the original metadata and the components of each data surrogate.

15. A data surrogate system (DSS) including:
a computer-readable medium encoded with a program, the program running on a processor and comprising,
a DSS server that receives data and a plurality of data changes;
an engine coupled to the DSS server that generates at least one data surrogate using information of the data and the plurality of data changes received from at least one data source;
an extractor coupled to the engine that identifies relationships among portions of original metadata and components of each data surrogate and generates new metadata using information of the relationships, wherein the extractor generates an extended data surrogate comprising the data surrogate and one of the original metadata and new metadata; and
a policy database coupled to the DSS server and comprising a plurality of policies, wherein the DSS server automatically controls moving of at least one of the data surrogate and the extended data surrogate across a plurality of storage devices using the plurality of policies, wherein the plurality of policies comprise a placement policy that controls a location among the plurality of storage devices for storing the at least one of the data surrogate and the extended data surrogate, wherein the moving comprises archiving at least one instance of the data surrogate and the extended data surrogate in a storage device.

16. The DSS of claim 15, comprising a policy console coupled to the policy database, wherein the policy console includes an interface by which the plurality of policies is generated and revised.

17. The DSS of claim 15, wherein the plurality of policies comprise a retention policy that controls a time for retaining the at least one of the data surrogate and the extended data surrogate.

18. The DSS of claim 15, wherein the plurality of policies comprise a disposition policy that controls at least one of time, event and method for disposing of the at least one of the data surrogate and the extended data surrogate.

19. The DSS of claim 15, wherein the plurality of policies comprise a filtering policy that controls filtering of the at least one of the data surrogate and the extended data surrogate.

20. The DSS of claim 15, wherein the plurality of policies define at least one parameter that controls the moving, the at least one parameter comprising at least one of source, content, key word, age, size, user, policies, frequency of access, inclusions, exclusions, and capture rules.

21. The DSS of claim 15, wherein the archiving includes placing at least one of the data surrogate and the extended data surrogate in a storage device as appropriate to an application to which the at least one of the data surrogate and the extended data surrogate corresponds.

22. The DSS of claim 15, wherein the DSS server via the plurality of policies automatically controls access to at least one of the data surrogate and the extended data surrogate.

23. The DSS of claim 15, wherein the plurality of policies complies with at least one of legal requirements and compliance requirements of retention, disposition, monitoring and supervision when multiple copies of at least one of the data surrogate and the extended data surrogate result from the moving.

24. The DSS of claim 15, wherein the DSS server via the plurality of policies automatically controls at least one of the generating at least one data surrogate and the generating an extended data surrogate.

25. The DSS of claim 15, wherein the DSS server extracts the original metadata of each data surrogate according to the plurality of policies.

26. The DSS of claim 15, wherein the DSS server uses the plurality of policies to enforce access to at least one of the data surrogates and extended data surrogates.

27. The DSS of claim 15, wherein the generating at least one data surrogate includes generating additional data surrogates corresponding in part to data changes received from additional data sources.

28. The DSS of claim 15, wherein the at least one data surrogate is application-aware relative to an application corresponding to the received data and the plurality of data changes.

29. The DSS of claim 15, wherein the generating of the new metadata comprises combining the portions of the original metadata and the components of each data surrogate.

* * * * *